US011979257B2

(12) United States Patent
Linder et al.

(10) Patent No.: US 11,979,257 B2
(45) Date of Patent: *May 7, 2024

(54) NETWORKING MODULE FOR INSTRUMENTATION AND CONTROL DEVICES

(71) Applicant: Airmar Technology Corporation, Milford, NH (US)

(72) Inventors: Marshal W. Linder, New Kensington, PA (US); Alan J. Testani, Boca Raton, FL (US)

(73) Assignee: Airmar Technology Corporation, Milford, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,563

(22) Filed: Jun. 2, 2023

(65) Prior Publication Data
US 2023/0318878 A1  Oct. 5, 2023

Related U.S. Application Data

(63) Continuation of application No. 17/317,666, filed on May 11, 2021, now Pat. No. 11,716,224.

(51) Int. Cl.
*H04L 12/66* (2006.01)
*G06F 13/40* (2006.01)
(Continued)

(52) U.S. Cl.
CPC .......... *H04L 12/66* (2013.01); *G06F 13/4027* (2013.01); *H04L 69/08* (2013.01); *H04W 84/12* (2013.01); *H04W 88/16* (2013.01)

(58) Field of Classification Search
CPC ......... G06F 13/40; H04L 12/66; H04L 69/08; H04W 84/12; H04W 88/16
See application file for complete search history.

(56) References Cited

U.S. PATENT DOCUMENTS 10,476,514 B1 * 11/2019 Vaz ..................... H04L 12/4625
10,972,160 B1    4/2021 Marupaduga
(Continued)

FOREIGN PATENT DOCUMENTS

WO    2022/241440 A1    11/2022

OTHER PUBLICATIONS

PCT Invitation to Pay Additional Fees for International Application No. PCT/US2022/072259, entitled "Networking Module for Instrumentation and Control Devices," mailed on Aug. 29, 2022.
(Continued)

*Primary Examiner* — Henry Tsai
*Assistant Examiner* — Christopher A Daley
(74) *Attorney, Agent, or Firm* — Hamilton, Brook, Smith & Reynolds, P.C.

(57) ABSTRACT

A module for managing communication among instrumentation and control devices associated with a system, and a method for using the module, enable interconnection of various devices across multiple network buses, and filtering of messages travelling between devices on disparate buses. Buses may be established wirelessly in addition to via wired connections. Additional devices may connect to a pluggable terminal interface integrated with the module. The terminal interface may connect to a configurable variety of interconnecting circuits appropriate for various types of terminal devices. An associated user interface may enable a user to configure various parameters pertaining to connected devices, including alerts to be issued when certain parameters exceed thresholds, and actions to be taken upon issuance of such alerts.

43 Claims, 50 Drawing Sheets

(51) Int. Cl.
*H04L 69/08* (2022.01)
*H04W 84/12* (2009.01)
*H04W 88/16* (2009.01)

(56) References Cited

U.S. PATENT DOCUMENTS

| | | |
|---|---|---|
| 11,129,237 B1 | 9/2021 | Neber |
| 11,716,224 B2 * | 8/2023 | Linder .................... H04L 12/66 |
| | | 710/315 |
| 2010/0165878 A1 | 7/2010 | Soni |
| 2017/0006421 A1 | 1/2017 | Jerez et al. |
| 2019/0068491 A1 | 2/2019 | Tsirkin |
| 2019/0342179 A1 | 11/2019 | Barnard et al. |
| 2020/0336386 A1 * | 10/2020 | Wong .................. H04L 12/4625 |
| 2021/0227000 A1 | 7/2021 | Wang et al. |
| 2022/0109731 A1 * | 4/2022 | Morrison .............. H04L 67/141 |
| 2022/0368566 A1 | 11/2022 | Linder et al. |

OTHER PUBLICATIONS

PCT International Search Report and Written Opinion for International Application No. PCT/US2022/072259, entitled "Networking Module for Instrumentation and Control Devices," mailed on Oct. 25, 2022.

* cited by examiner

Application Example - Engine Room

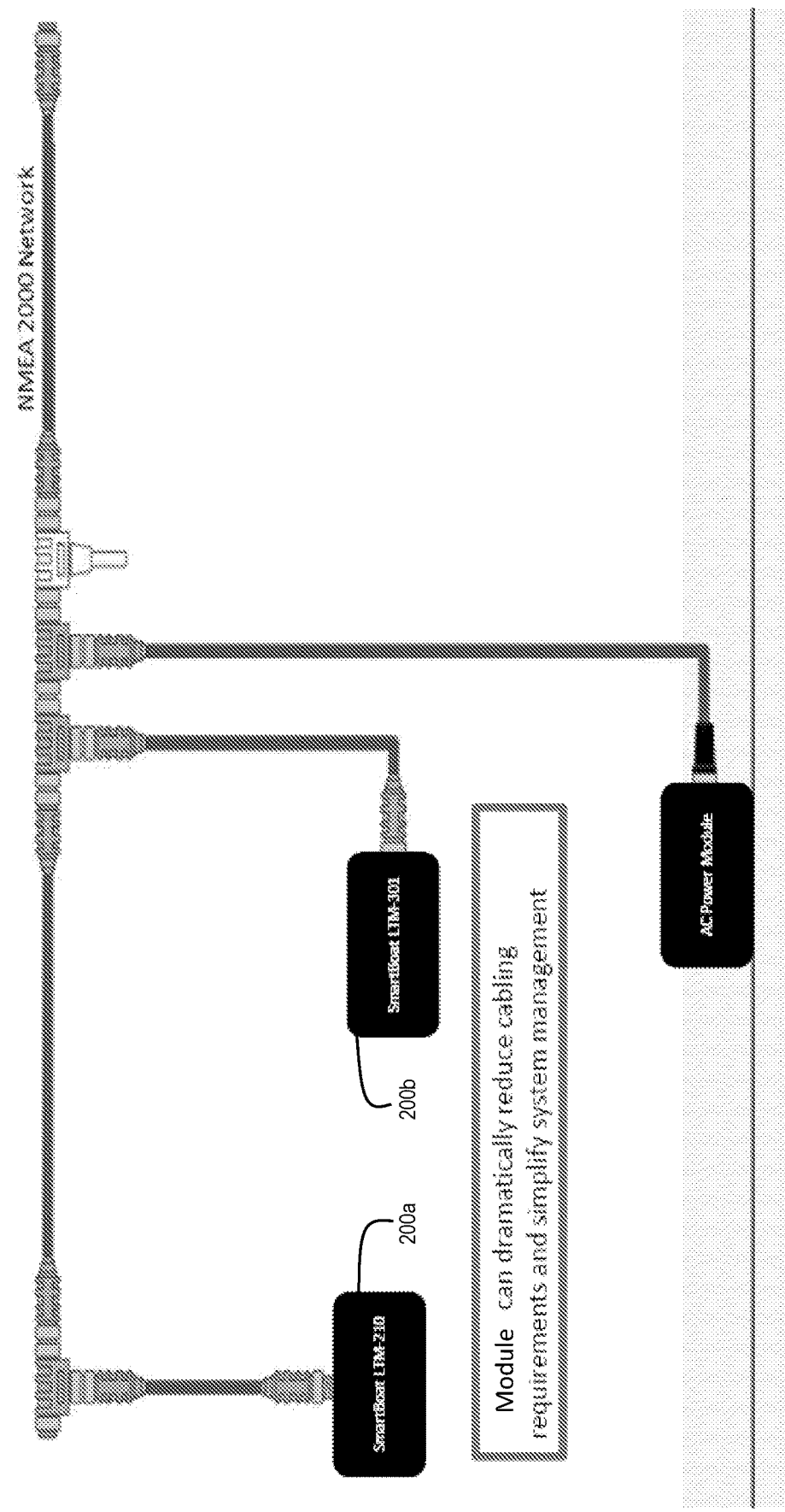

Application Example - Sailboat without networking modules

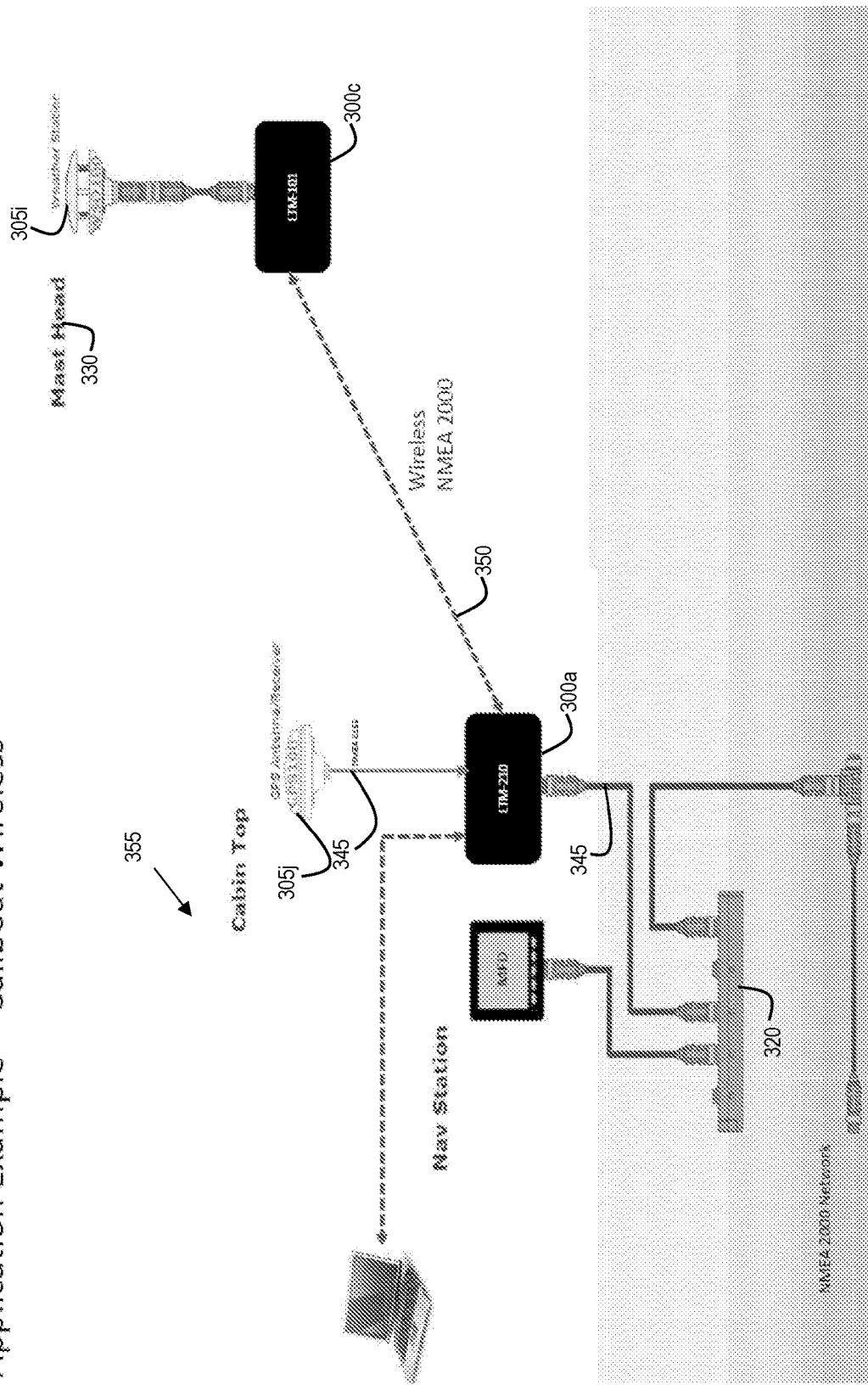
FIG. 3B  Application Example - Sailboat Wireless

J1939 Engine Information 1197

Display units: U.S.

Engine 1     Status: Healthy

| SPN | | |
|---|---|---|
| SPN 190 | Engine Speed | 4016.0 RPM |
| SPN 102 | Engine Turbocharger Boost Pressure | 36.26 PSI |
| SPN 513 | Actual Engine -- Percent Torque | 0.0 % |
| SPN 168 | Electrical Potential (Voltage) | 24.00 Volts |
| SPN 109 | Engine Coolant Pressure | 36.26 PSI |
| SPN 110 | Engine Coolant Temperature | 184.7 Fahrenheit |
| SPN 94 | Engine Fuel Delivery Pressure | 72.52 PSI |
| SPN 183 | Engine Fuel Rate | 424.37 Gal/hour (US) |
| SPN 100 | Engine Oil Pressure | 72.52 PSI |
| SPN 175 | Engine Oil Temperature | 1347.5 Fahrenheit |
| SPN 92 | Engine Percent Load at Current Speed | 62.0 % |
| SPN 247 | Engine Total Hours of Operation | 0.05 Hours |
| SPN 189 | Engine Rated Speed | 3000.0 RPM |
| SPN 237 | Vehicle Identification Number | IntestSystemsVIN |

J1939 Engine Information

Display units: US

Engine 1

| | | | Status: DTC Alert |
|---|---|---|---|
| DTC 1 | SPN 1208 | FMI 3 | OC 10 |

Engine Pre-filter Oil Pressure (Voltage Above Normal)

[Clear DTC]

| SPN 190 | Engine Speed | 4016.0 RPM |
|---|---|---|
| SPN 102 | Engine Turbocharger Boost Pressure | 36.39 PSI |
| SPN 513 | Actual Engine – Percent Torque | 0.0 % |
| SPN 168 | Electrical Potential (Voltage) | 24.00 Volts |
| SPN 109 | Engine Coolant Pressure | 36.39 PSI |
| SPN 110 | Engine Coolant Temperature | 104.7 Fahrenheit |
| SPN 94 | Engine Fuel Delivery Pressure | 72.52 PSI |
| SPN 183 | Engine Fuel Rate | 424.37 Gal/hour (US) |
| SPN 100 | Engine Oil Pressure | 72.52 PSI |
| SPN 175 | Engine Oil Temperature | 1347.5 F ahrenheit |
| SPN 92 | Engine Percent Load at Current Speed | 82.0 % |
| SPN 247 | Engine Total Hours of Operation | 0.95 Hours |
| SPN 189 | Engine Rated Speed | 3600.0 RPM |
| SPN 237 | Vehicle Identification Number | LutechSystemsVIN |

NETWORKING MODULE FOR INSTRUMENTATION AND CONTROL DEVICES

RELATED APPLICATION

This application is a continuation of U.S. application Ser. No. 17/317,666, filed May 11, 2021, now U.S. Pat. No. 11,716,224, issued on Aug. 1, 2023. The entire teachings of the above application are incorporated herein by reference.

BACKGROUND

Systems such as watercraft vessels and various forms of industrial and agricultural equipment often require many different connected instrumentation and control devices. Such devices may need to communicate with each other and with other components of the system, often necessitating a large amount of expensive cabling with many failure prone connections. Such devices are often designed to communicate using different industry-standard network bus protocols, and as such, may be partially or fully incompatible with other devices associated with the system.

SUMMARY

Embodiments provide improved flexibility in connecting various instrumentation and control devices across a local network. Embodiments reduce physical requirements associated with connecting various instrumentation and control devices. Embodiments support user engagement with, and management of, various instrumentation and control devices, both at an individual device level and with regards to a local network across which the devices are connected.

In one embodiment, a module for managing communication among instrumentation and control devices associated with a system includes a network bridging interface (NBI) configured to interconnect a plurality of network buses associated with the system. The NBI is further configured to monitor messages propagating along at least one of the network buses. The messages may pertain to a status of the system or a component, a connected network device, or an environment thereof. The messages may pertain to control of a component or a connected network device of the system. The NBI is further configured to identify network devices connected to the network buses based on the monitored messages. The NBI is further configured to determine whether to allow or block transmission of a monitored message from a first network bus of the plurality to a second network bus of the plurality based on user settings. The first network bus may function as either a primary or a secondary bus associated with the network. Likewise, the second network bus may function as either a primary or a secondary bus and may have a level of primacy that differs from that of the first network bus. Either the first or the second network bus may function as a bus with a sub-secondary level of primacy, such as, for example, a tertiary bus, etc., if the embodiment includes more than two buses.

The embodiment may be configured such that the first network bus supports a first communication protocol, while the second network bus supports a second communication protocol. The user settings pertain to at least one of the monitored message, an identified network device associated with the monitored message, and a combination thereof. The NBI is further configured to allow or block transmission of the monitored message according to the determining. In some embodiments, the system may be at least one of a watercraft vessel, an industrial apparatus, and an agricultural apparatus.

In some embodiments, the module further includes a network router integrated with the NBI and configured to interconnect the plurality of network buses via a bridging interface that is a wired interface, a wireless interface, or a combination thereof. The bridging interface may be Ethernet. The bridging interface may be at least one of WiFi, Bluetooth®, and near-field communication (NFC). The network router may be configured to establish a virtual network bus by enabling communication between network devices wirelessly connected to at least one gateway associated with the router.

In some embodiments, the first communication protocol is a given protocol, and the second communication protocol is the same given protocol. The given protocol may be defined by National Marine Electronics Association (NMEA) 2000 or by another controller-area network (CAN)-bus-based network standard, or by an Ethernet-based network standard such as NMEA OneNet. The first network bus may be connected to the second network bus via a wireless interface. For example, two NMEA 2000 buses may be interconnected wirelessly. The first network bus may be connected to the second network bus via an Ethernet wired interface. For example, two NMEA 2000 buses may be interconnected via Ethernet.

In some embodiments, at least one of the first and second communication protocols is defined by NMEA 2000, or by another controller-area network (CAN)-bus-based network standard, or by an Ethernet-based network standard such as NMEA OneNet, and at least one of the first and second communication protocols is an alternate protocol. The alternate protocol may be defined by at least one of NMEA 0183 and Society of Automotive Engineers (SAE) J1939. The NBI may include a gateway configured to convert the monitored message from NMEA 2000 to the alternate protocol, or from the alternate protocol to NMEA 2000.

In some embodiments, the module further includes a serial interface supporting a communication protocol defined by NMEA 0183. The serial interface is connected to the at least one network bus via the NBI. In some embodiments, a connected network device associated with the at least one network bus is at least one of a weather-monitoring device, a sonar device, a radar device, and a global-positioning system (GPS) device.

In some embodiments, the module further includes a connected device interface (CDI) including terminal blocks. The terminal blocks may include terminals configured to electrically connect to one or more terminal devices associated with the system, and the CDI may be connected to the NBI internally to the module. The one or more terminal devices associated with the system may include at least one of a thermocouple temperature sensor, a relay controller, and a run detector.

In some embodiments, a CDI, as introduced above, includes a programmable device interface (PDI) configured to connect a selected electrically interconnecting circuit to a terminal of the terminal blocks. The interconnecting circuit may be selected based on a characteristic of a terminal device being connected to the terminal of the CDI. The terminal device being connected to the terminal may be at least one of a voltage signal generating device, a current loop sensor, a thermistor temperature sensor, a thermocouple, a resistive sender, a switch, and a relay.

In some embodiments, the NBI is further configured to obtain measured data from a connected terminal device of the CDI, and to construct a data message according to the first or the second communication protocol, the data message containing a representation of the measured data. An element or a structure of the data message may be based on a function of the connected terminal device within a context of the system. For example, an element or a structure of the data message may be based on information corresponding to an angle of a rudder of a marine vessel. The NBI may be configured to transmit the data message to a selected network device connected to the first or the second network bus. The transmitted data may propagate along a network bus of the first and second network buses to which the selected network device is connected. The NBI may be configured to obtain an operation message from a connected network device, to convert the operation message to an operation signal, and to relay the operation signal to the CDI. The CDI may be configured to transmit the operation signal to a connected terminal device of the CDI such that a corresponding operation is then carried out by the connected terminal device. An operation to be triggered by the operation signal may be, for example, an actuation of a relay, or a sounding of a sonar device.

In some embodiments, the module includes a user interface configured to enable a user to inspect and configure connected network devices of the NBI and connected terminal devices of the CDI. The user interface may be further configured to enable a user to monitor messages propagating along the network buses and specify user settings pertaining to allowing or blocking transmission thereof. The user interface may be further configured to enable a user to specify a type and a function of a terminal device being connected to a terminal of the PDI. The type of the terminal device may influence a selection of an electrically interconnecting circuit to connect to the terminal. The function of the terminal device may influence a selection of a message or a plurality of messages regarding the terminal device for the NBI to make available for transmission towards the first or the second network bus.

In some embodiments, the user interface is configured to allow a user to specify characteristics defining an alert, the characteristics including a threshold of a device associated with the module that, if crossed, automatically triggers an alert action based on a status of at least one characteristic of the characteristics defining the alert. The characteristics defining an alert may include at least one of a parameter group number (PGN) value variable, a calculated variable, and a timer variable. The alert action may include at least one of displaying the alert, or a representation thereof, in the user interface or on another display device, generating a message to report an alert message to a display device, generating a message to report a binary status, and generating a message to control a binary device.

In another embodiment, a method of managing communication among instrumentation and control devices associated with a system includes configuring a network bridging interface (NBI) to interconnect a plurality of network buses associated with the system. The method further includes configuring the NBI to monitor messages propagating along at least one of the network buses. The messages may pertain to a status of the system or a component, a connected network device, or an environment thereof. The messages may pertain to control of a component or a connected network device of the system. The method further includes configuring the NBI to identify network devices connected to the network buses based on the monitored messages. The method further includes configuring the NBI to determine whether to allow or block transmission of a monitored message from a first network bus of the plurality to a second network bus of the plurality based on user settings. The first network bus may function as either a primary or a secondary bus associated with the network. Likewise, the second network bus may function as either a primary or a secondary bus and may have a level of primacy that differs from that of the first network bus. Either the first or the second network bus may function as a bus with a sub-secondary level of primacy, such as, for example, a tertiary bus, etc., if an embodiment includes more than two buses.

The method further includes configuring the NBI to allow or block transmission of the monitored message according to the determining. This embodiment may further optionally include any features described herein in connection with any of the other embodiments described herein.

In another embodiment, a switching interface for interconnecting one or more terminal devices to a common device includes a connected device interface (CDI) including terminal blocks. The terminal blocks include terminals configured to electrically connect to one or more terminal devices. The CDI further includes a programmable device interface (PDI) configured to connect a selected electrically interconnecting circuit to a terminal of the terminal blocks. The interconnecting circuit is selected based on a characteristic of a terminal device being connected to the terminal of the CDI.

In another embodiment, a method of interconnecting one or more terminal devices to a common device includes configuring terminals of a terminal block of a connected device interface (CDI) to electrically connect to one or more terminal devices. The method further includes configuring a programmable device interface (PDI) of the CDI to connect a selected electrically interconnecting circuit to a terminal of the terminal blocks. The interconnecting circuit is selected based on a characteristic of a terminal device being connected to the terminal of the CDI.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 2A-C and 3A-B are schematic diagrams depicting various example embodiments of configurations of various instrumentation and control devices, either with or without modules for managing electronic communication according to the present disclosure.

FIGS. 5A-F, 6A-C, 7, 8A-C, 9A-K, 10A-E, 11A-E, and 12A-D show various screens of a user interface enabling a user to inspect and configure settings of a module for managing electronic communication among various devices, and settings of the various devices.

DETAILED DESCRIPTION

Figure 1:
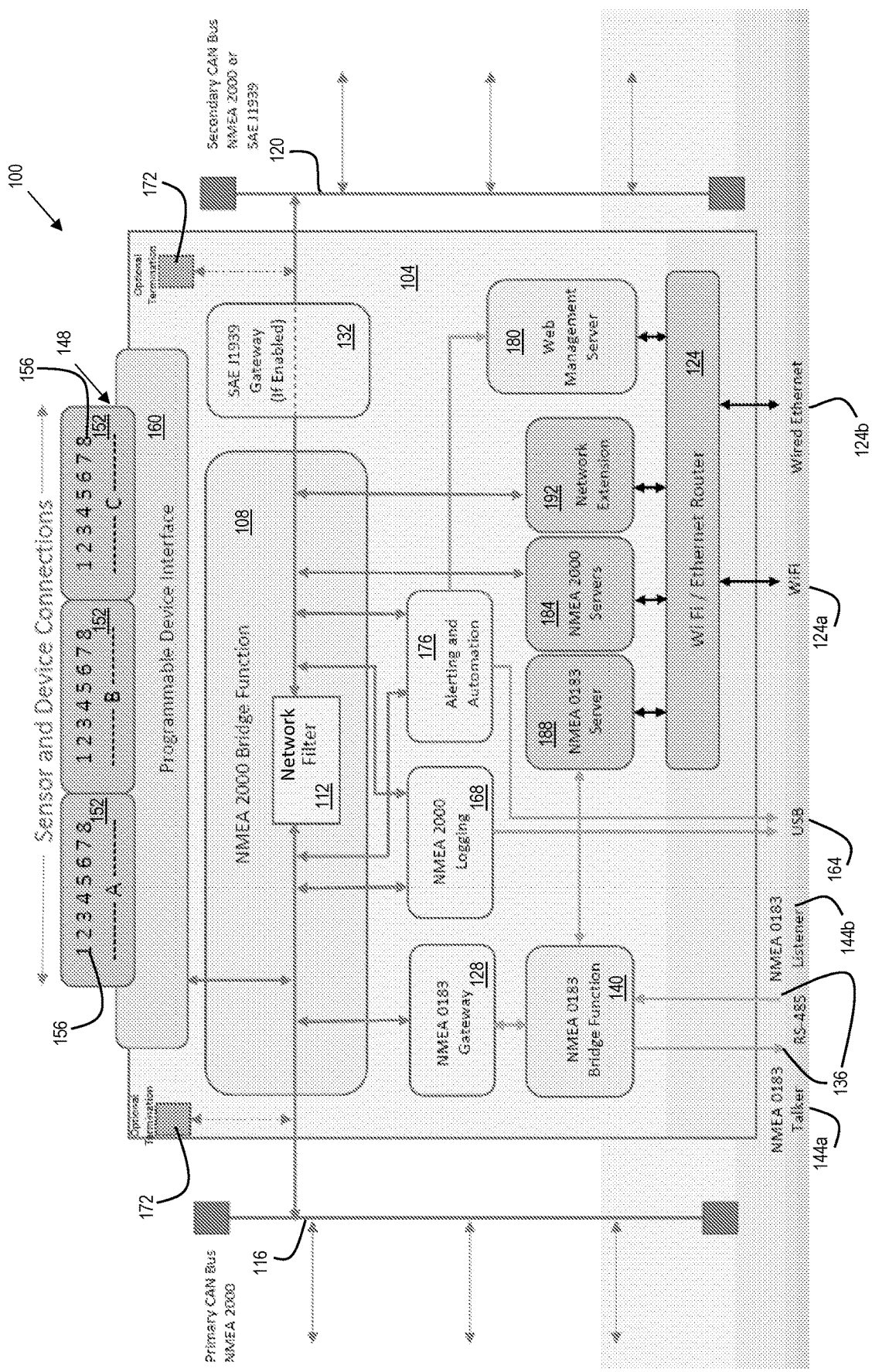
FIG. 1 is a schematic block diagram depicting an example embodiment of a module for managing electronic communication among various devices.

A description of example embodiments follows.

Embodiments of a module for managing communication between instrumentation and control devices, associated with a system and at least one network bus, may herein be referred to as networking modules, or simply as modules. Various embodiments of networking modules may be referred to as module models and may be distinguished with unique model numbers. Networking modules, in various embodiments according to the present disclosure, are designed and certified for use with National Marine Electronics Association (NMEA) 2000 networks and are highly configurable for a wide range of applications. Networking modules share a common set of features including built-in wireless networking support and browser-based configuration and control accessible by any of a laptop, a tablet, and a mobile device.

Different embodiments of networking modules include different combinations of features, thus comprising different models ranging from basic to advanced. Some embodiments of networking modules provide programmable sensor and device interfaces for parameters including voltage, current loop sensors, resistive senders, thermistor and thermocouple temperature sensors, run detectors, switch detectors, and relay controllers. Some embodiments include various combinations of features of basic models, while also including support for multi-network bridging and management, including multiple NMEA 2000 networks, NMEA 0183 support, and Society of Automotive Engineers (SAE) J1939 engine interface features. In some embodiments, unique alerting features provide customizable messages and task automation capabilities. Embodiments of networking modules are designed to operate in harsh marine environments and are rated for water resistance according to an Ingress Protection (IP) code such as, for example, IP66 or IP67.

Advantages provided by networking modules include a capability of a single module to perform the work of multiple different devices, such as multiple NMEA 2000 devices. This capability can lead to a significant reduction in cabling and connectors, a reduction in costs, and easier installation in comparison to conventional, multiple-device solutions. Further benefits include enabling an advanced level of network management, and extensive alerting and automation features.

In some embodiments, module design is based upon a highly capable quad-core ARM-based single board computer running Linux. Module design may include hardware and software support for a wide range of standard peripherals including communication protocols such as WiFi, Ethernet, Universal Serial Bus (USB), Inter-Integrated Circuit ($I^2C$), Serial Port Interface (SPI), and High Definition Multimedia Interface (HDMI) video and audio. Module design may include a processor, memory, and storage capabilities. Modules may employ open source tools and libraries, providing a foundation for rapid development of software supporting various functions of the module.

Embodiments provide electrically isolated power and network interfaces upon a common hardware foundation. In some embodiments, a programmable device interface (PDI) employs a programmable sensor interface board to provide unique flexibility to configure and attach a wide range of sensors and devices.

Many embodiments include multi-network support for communication protocols including NMEA 2000, NMEA 0183, and SAE J1939. An NMEA 0183 gateway may model a system such as a watercraft vessel to faithfully convert messages from a first protocol to a second protocol without producing redundant or incomplete messages. A J1939 protocol stack may include address discovery and automatic configuration with support for multiple electronic control units (ECUs). NMEA 2000 bus support may include complete message decoding and field-level interpretation. NMEA 2000 bus support may include whitelist/blacklist message filtering of various buses, devices, and parameter group numbers (PGNs). NMEA 2000 bus support may include multiple message servers supporting an unlimited number of clients. NMEA 2000 bus support may include a wired or wireless bus extension with device discovery.

In some embodiments, instrumentation and control devices include at least one of current loops, resistive senders, switch inputs, thermistors, thermocouples, direct current (DC) voltage measurements, equipment run detectors, and relay controllers. Current loops may operate within a range of 4 mA to 20 mA as is common in the art. Resistive senders may operate according to American standards, European standards, custom standards, or combinations thereof. Switch inputs may be supervised or unsupervised. Thermistors may include negative temperature coefficient (NTC) temperature sensors. Thermocouples may include at least one of J-type, K-type, T-type, and E-type thermocouples. DC voltage measurements may operate within a range of 0 V to 75 V. Equipment run detectors may operate within a range of 9 V RMS to 240 V RMS (alternating current (AC)), or 9 V to 240 V (DC). Equipment run detectors may herein be referred to interchangeably as run detectors. Run detectors may include a load resistance and may be configured to sense a voltage across the load resistance, which may be indicative of a connected apparatus being in a running state. Relay controllers may carry a specified current rating, for example, 10 A.

Embodiments including multi-network support may enable an NMEA 2000 bus to be fully isolated electrically from other components of the module or other components of a larger system such as a watercraft vessel. Embodiments may be configured to interface with existing wired or wireless networks or may be configured to create a complete wired and wireless network. Embodiments may enable a second bus to be fully isolated electrically from other components of the module or other components of the larger system. The second bus may be configurable as an NMEA 2000 or an SAE J1939 gateway. Embodiments may enable multiple NMEA 2000 buses to be bridged via a wired or wireless connection. Instances of wireless NMEA 2000 bridging may be referred to as wireless NMEA 2000 or as a virtual network bus. Embodiments may provide isolated NMEA 0183 listener and talker interfaces in combination with an NMEA 2000 gateway. Embodiments may provide NMEA OneNet protocol support in manners reflective of those described herein for providing NMEA 2000 support.

FIG. 1 depicts an example embodiment of a module 100 for managing communication among instrumentation and control devices associated with a system. According to the embodiment, the module 100 includes a network bridging interface (NBI) 104, depicted in FIG. 1 as including an NMEA 2000 Bridge Function 108 which in turn includes a network filter function 112. In the embodiment, the NBI 104 is connected to network buses including a primary 116 and a secondary 120 Controller Area Network (CAN) bus. The primary CAN bus 116 is an NMEA 2000 bus, while the secondary CAN bus 120 may be an NMEA 2000 bus or an SAE J1939 bus. In some embodiments, at least one of the primary 116 and secondary 120 network buses may be an Ethernet-based network bus such as NMEA OneNet. The NMEA 2000 Bridge Function 108 shown in FIG. 1 is configured to monitor messages propagating along at least one of the network buses 116, 120. The messages may pertain to a status of a system associated with the network buses 116, 120. Alternatively, or in addition, the messages may pertain to a status of a component, a connected network device, or an environment of the system, or the messages may pertain to control of a component or a connected network device of the system. A network device, as such, may be connected to the NBI 104 via either the primary 116 or secondary 120 CAN bus, or via a WiFi/Ethernet router 124 as depicted in FIG. 1. In the embodiment, the NBI 104 is configured to identify network devices connected to the network buses 116, 120 based on the monitored messages.

Continuing with reference to FIG. 1, through the network filter function 112, the NBI 104 is configured to determine whether to allow or block transmission of a monitored message from a first network bus of the plurality to a second network bus of the plurality based on user settings. The first network bus as referenced here may be either the primary 116 or the secondary 120 bus. Likewise, the second network bus may be a bus other than the first network bus, and may have a level of primacy that differs from that of the first network bus. As such, the second network bus as referenced here may be the secondary bus 120 or may be the primary bus 116. Either the first or the second network bus may function as a bus with a sub-secondary level of primacy, such as, for example, a tertiary bus, etc., if an embodiment includes more than two buses.

The embodiment of FIG. 1 continues such that the first network bus supports a first communication protocol, while the second network bus supports a second communication protocol. The aforementioned user settings pertain to at least one of the monitored message, an identified network device associated with the monitored message, and a combination thereof. The NBI 104, through the network filter function 112, is further configured to allow or block transmission of the monitored message according to the preceding determination of whether to allow or block the message.

In the embodiment of FIG. 1, the module 100 integrates a network router 124 within the NBI 104. The router 124 is configured to interconnect the primary 116 and secondary 120 network buses shown in FIG. 1, along with any additional network buses that may interface with the module 100. The interconnection is realized using a bridging interface supported by the router. The bridging interface may be a wireless interface such as, for example, WiFi 124a, Bluetooth®, or near-field communication (NFC). The bridging interface may be a wired interface such as, for example, Ethernet 124b, USB, I²C, serial data interface, or HDMI video or audio. The bridging interface may be a combination of a wired and a wireless interface. The router 124 may be configured to establish, operate, and maintain a virtual network bus by enabling communication between network devices wirelessly connected to at least one gateway associated with the router 124.

In some embodiments, first and second communication protocols, corresponding to first and second network buses, may be the same protocol. For example, FIG. 1 shows a primary CAN bus 116 operating according to NMEA 2000, and a secondary CAN bus 120 that may also operate according to NMEA 2000. In some embodiments, first and second communication protocols may differ from each other. For example, FIG. 1 shows a secondary CAN bus 120 that may operate according to SAE J1939, while a primary CAN bus 116 operates according to NMEA 2000. In other example embodiments, a primary network bus 116 may operate according to SAE J1939, while a secondary network bus 120 operates according to NMEA 2000. In still other example embodiments, a primary 116 and a secondary 120 network bus may both operate according to SAE J1939. In still other example embodiments, at least one of a primary 116 and a secondary 120 network bus may operate according to NMEA 0183. In an embodiment, a first NMEA 2000 network bus may be connected to a second NMEA 2000 network bus via a wireless interface. In an embodiment, a first NMEA 2000 network bus may be connected to a second NMEA 2000 network bus via a wired interface such as, for example, Ethernet. In any embodiment, as described above, a network bus referred to herein as a first network bus and having a first communication protocol, or as a second network bus having a second communication protocol, may function as a primary 116 or secondary 120 network bus in a module 100, or as a network bus with another order of primacy such as tertiary, etc.

In some embodiments, the module includes a gateway associated with the NBI and configured to convert the monitored message from NMEA 2000 to an alternate protocol, or from the alternate protocol to NMEA 2000. The alternate protocol may be NMEA 0183 or SAE J1939. For example, FIG. 1 shows an NMEA 0183 gateway 128 configured to convert messages between NMEA 2000 and NMEA 0183, and an SAE J1939 gateway 132 configured to convert messages between NMEA 2000 and SAE J1939. In some embodiments, the module 100 may include an NMEA 0183 serial interface connected to at least one network bus via the NBI. For example, FIG. 1 shows an RS-485 interface 136 supporting NMEA 0183 via an NMEA 0183 bridge function 140 and configured in a talker 144a and listener 144b configuration. The RS-485 interface 136 of FIG. 1 communicates with the NMEA 0183 gateway 128 to convert messages travelling between the RS-485 interface 136 and the NMEA 2000 bridge function 108.

In some embodiments, the module includes a connected device interface (CDI) 148 including terminal blocks 152. The terminal blocks 152 may be configured to electrically connect to one or more terminal devices associated with the system. The CDI 148 may be connected to the NBI 104 internally to the module 100. In FIG. 1, a CDI 148 is shown as including blocks 152 A, B, and C, each with eight terminals 156 providing sensor and device connections. Blocks 152 A, B, and C interface both with a programmable device interface (PDI) 160 and with the NMEA 2000 bridge function 108. The PDI 160 may be implemented as a component of a CDI 148. In the embodiment of FIG. 1 as well as in other embodiments, the PDI 160 is configured to connect a selected electrically interconnecting circuit (not shown but understood to be present within the PDI 160) to a terminal 156 of the terminal blocks 152. The interconnecting circuit may be selected based on a characteristic of a terminal device being connected to the terminal 156 of the CDI 148.

Network devices connected to network buses 116, 120 serviced by the module 100 may include at least one of weather-monitoring devices, sonar devices, radar devices, and global-positioning system (GPS) devices. Terminal devices connected to a CDI 148 of the module 100 may include at least one of thermocouple temperature sensors, relay controllers, run detectors, voltmeters, current loop sensors, thermistor temperature sensors, resistive senders, switch detectors, and switch controllers. Any of the terminal devices listed herein may, in some embodiments, connect to a PDI 160 of a CDI 148.

In some embodiments, the NBI 104 is configured to obtain measured data from a terminal device connected to a terminal 156 of the CDI 148. The NBI 104 may construct a data message containing a representation of the measured data. The data message may be constructed according to the first or second communication protocol, such as, for example, NMEA 2000, NMEA 0183, or SAE J1939 as shown in FIG. 1. Components or other characteristics of the data message may be based on a function of the connected terminal device within a context of the system. For example, measured data corresponding to a rudder angle of a watercraft vessel may be generated by a current loop device, and the message may pertain to the rudder angle. In some embodiments, the NBI 104 is configured to transmit the data message to a selected network device connected to the first or the second network bus. The transmitted data may propagate, for example, along a primary network bus 116 to a navigational device connected to the primary network bus 116. In some embodiments, the NBI 104 may be configured to obtain an operation message from a network device connected the first or the second network bus. The NBI 104 may be further configured to convert the operation message to an operation signal, and to relay the operation signal to the CDI 148. The CDI 148, in turn, may be configured to transmit the operation signal to a terminal device connected to a terminal 156 of the CDI 148. For example, an operation may be an actuation of a relay, or a sounding of a sonar device. As such, the operation signal may be constructed so as to stimulate the operation, such as in the form of a pulse to actuate a relay, or a tone to be produced by a sonar transducer.

Some embodiments of the module 100 may enable devices that are otherwise incompatible with network buses 116, 120 associated with the module 100 to connect to the network buses 116, 120 via adapter cables, such as a DB9 to NMEA 2000 adapter cable. Such adapter cables may further enable an NMEA 0183 bus connected to the module to be set up in a talker-listener configuration, a configuration commonly used in the art. Alternatively, or in addition, an NMEA 2000 or SAE J1939 bus may connect to the module 100 via a DB9 connector. Some embodiments may be configured to interface with a cellular modem, enabling various features including, for example, short message service (SMS) text alerts, e-mail alerts, and remote access.

Multiple embodiments of the module 100 may respectively include a common motherboard design including functionality for features such as an isolated power system, network interfaces, and system control electronics. The motherboard design may include partitions to be selectively populated to create functional variations for various embodiments. The motherboard design may include a standardized interface for various feature boards. Feature boards may provide sensor interfaces, controls, and other model-specific functions within a standardized form factor, further supporting multiple embodiments of the module 100.

Some embodiments include USB connectors 164 as shown in FIG. 1, which may enable a connection to a USB storage drive for extended NMEA 2000 bus logging functions 168. Some embodiments include switchable bus termination resistors 172 as shown in FIG. 1 and described hereinbelow. In some embodiments, the module 100 supports a highly configurable alerting system 176 as shown in FIG. 1 and described hereinbelow. Some embodiments include a web management server 180 as shown in FIG. 1 and described hereinbelow. Some embodiments of the module 100 include in the NBI 104 an NMEA 2000 server 184 to interface between the NMEA 2000 bridge function 108 and the router 124, as shown in FIG. 1. In some embodiments, an NMEA 0183 server 188 interfaces between the NMEA 0183 bridge function 140 and the router 124. In some embodiments, a network extension 192 function may be enabled by the router 124 as shown in FIG. 1 and may function as described hereinbelow.

Figure 2A:
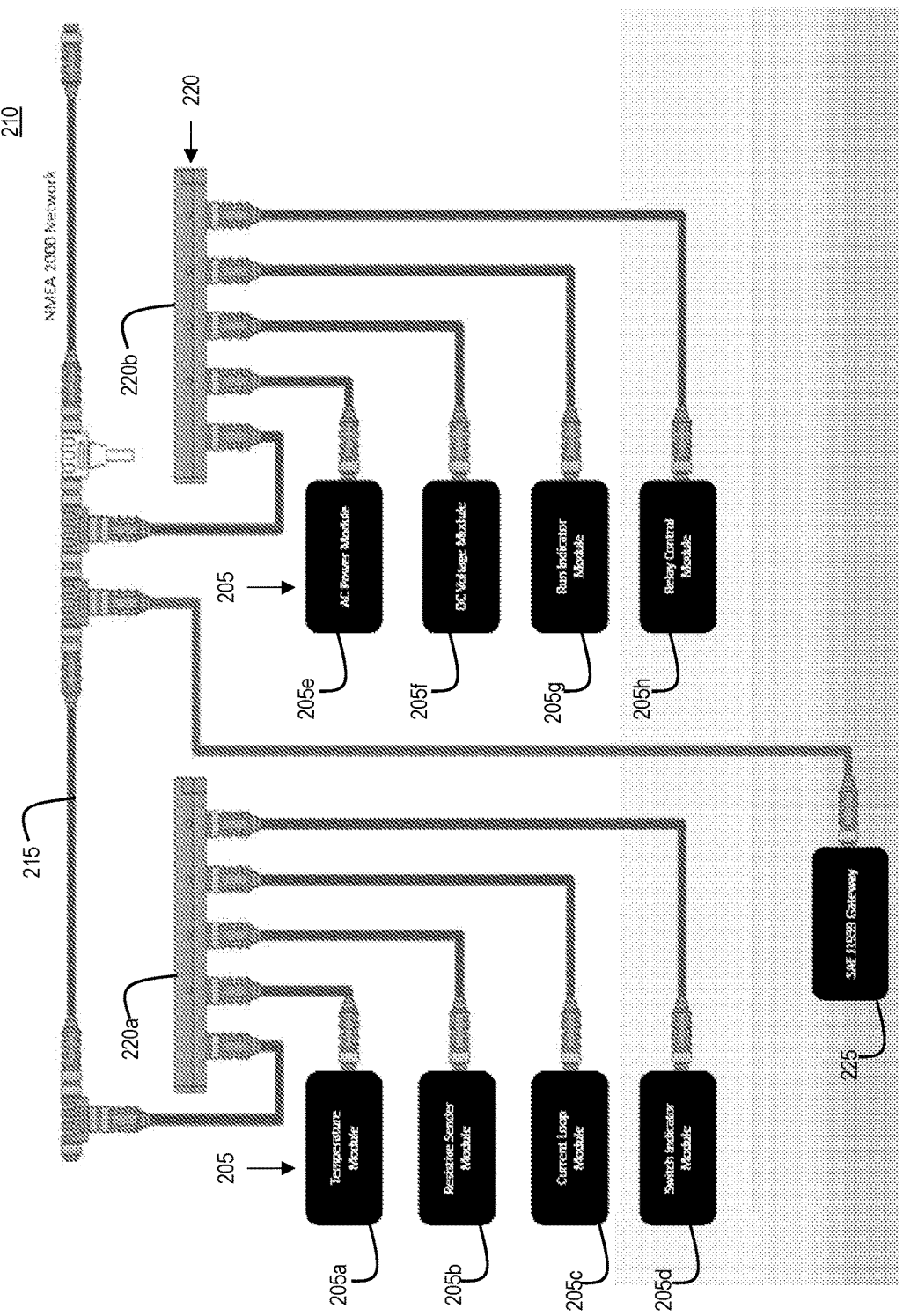

FIG. 2A depicts an example of a traditional configuration of instrumentation and control devices 205 within an engine room 210 for a watercraft vessel. An NMEA 2000 network bus 215 may connect to various backplanes 220, each backplane 220 connecting to various sensors and devices 205. In FIG. 2A, a first backplane 220a is shown as connected to a temperature module 205a, a resistive sender module 205b, a current loop module 205c, and a switch indicator module 205d, while a second backplane 220b is shown as connected to an alternating current (AC) power module 205e, a direct current (DC) voltage module 205f, a run indicator module 205g, and a relay control module 205h. Additionally, in FIG. 2, an SAE J1939 gateway 225 is shown as connected to the NMEA 2000 network bus 215 in parallel with the first 220a and second 220b backplanes.

Figure 2B:
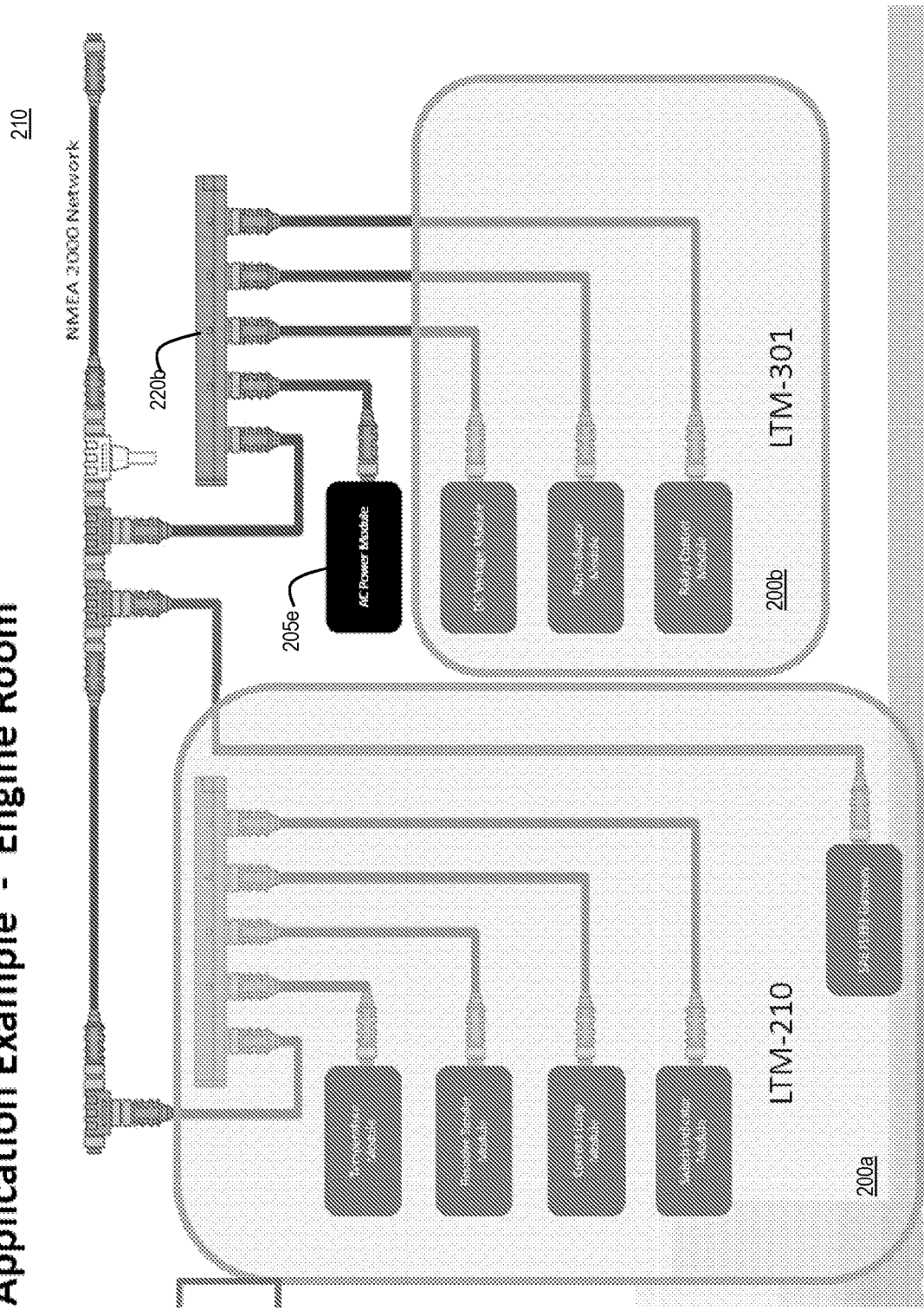

FIG. 2B depicts the engine room 210 of FIG. 2A, with various sensors and devices 205 replaced with two embodiments of the module 100. One embodiment of the module 100, a module model LTM-210 200a, integrates the functionality of the temperature module 205a, the resistive sender module 205b, the current loop module 205c, the switch indicator module 205d, the first backplane 220a, and the SAE J1939 gateway 225 of FIG. 2A into a single unit. Another embodiment of the module 100, a module model LTM-301 200b, integrates the functionality of the DC voltage module 205f, the run indicator module 205g, and the relay control module 205h of FIG. 2A into a single unit. In the embodiment, only the AC power module 225e remains as a single-function device, connected to the module model LTM-301 200b through the second backplane 220b.

FIG. 2C depicts the engine room 210 of FIG. 2B, with each networking module 200a, 200b shown as a black box. In comparison with FIG. 2A, FIG. 2C highlights the reduction in cabling that embodiments of the module 100 advantageously provide. It is noted that, by integrating multiple functions within a single unit, embodiments of the module 100 also provide a reduction in cost of implementations of engine rooms, as well as other applicable systems.

Figure 3A:
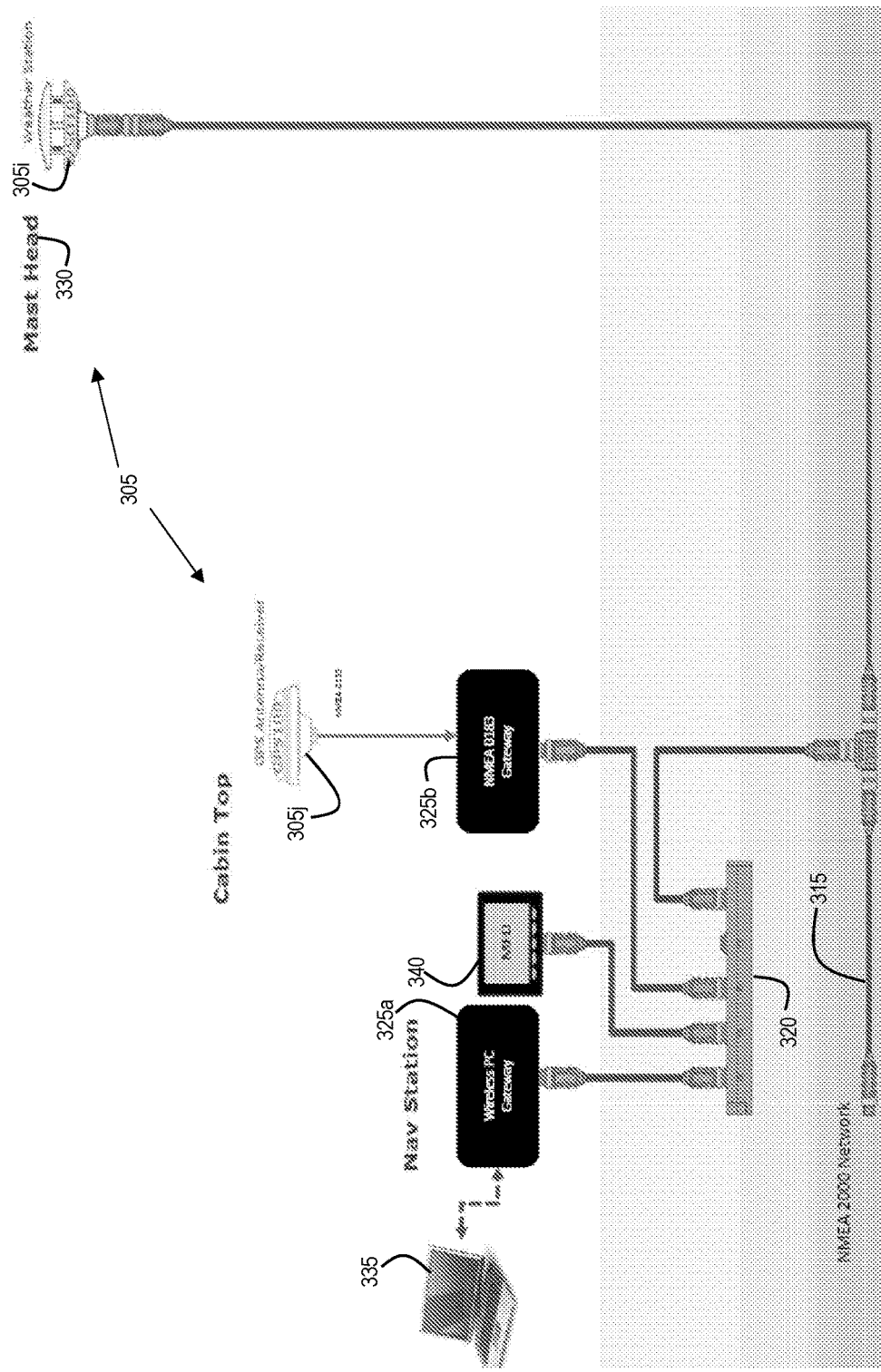

FIG. 3A depicts an example of a traditional configuration of instrumentation and control devices 305 aboard a watercraft vessel such as a sailboat. An NMEA 2000 network bus 315 may connect at least to a cabin backplane 320, as well as a weather-monitoring device 305i mounted atop a mast head 330 of the vessel. In FIG. 3A, the cabin backplane 320 connects to a computer 335 for purposes including navigation through a wireless PC gateway 325a. The cabin backplane 320 of FIG. 3A also connects to a multi-function display (MFD) 340, and to a global positioning system (GPS) device 305j via an NMEA 0183 gateway 325b.

FIG. 3B depicts an example implementation of two embodiments of the module 100 within the context of the watercraft vessel of FIG. 3A. In FIG. 3B, a module model LTM-210 300a is shown to integrate the wireless PC gateway 325a functionality of FIG. 3A, while also providing wired connections 345 to the cabin backplane 320 and the GPS device 305j. The LTM-210 300a is also shown to establish a wireless NMEA 2000 bus 350 between itself 300a and a module model LTM-101 300c atop the mast head 330, which connects to the weather-monitoring device 305i. In addition to a significant reduction in expensive and failure-prone cabling running from a cabin 355 of the vessel to the masthead 330 and to the wireless PC gateway 325a, the implementation of FIG. 3B provides improved electrical isolation among components in various locations aboard the vessel. For example, if lightning were to strike the masthead 330, downstream electronics within the cabin 355 and elsewhere aboard the vessel would be protected from surges resulting from the lightning strike, by the isolation provided by the wireless connection 350 to the mast head device 305i.

Figure 4B:
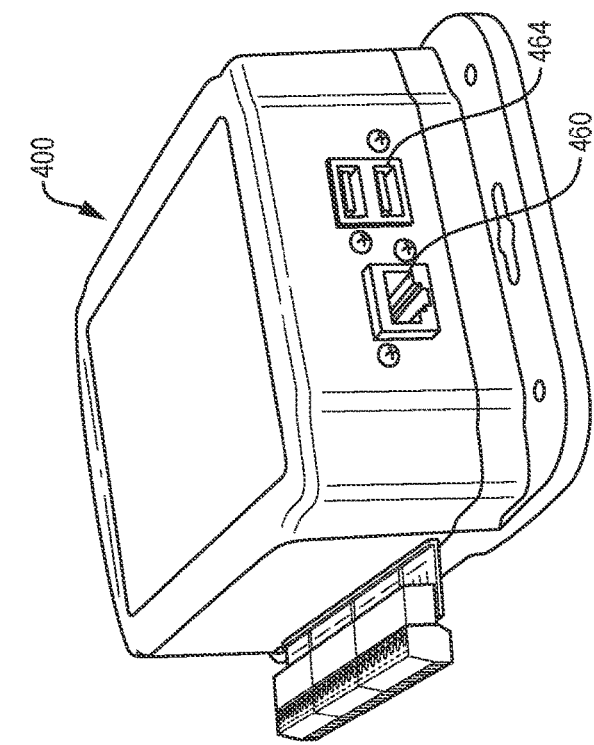
FIGS. 4A-C depict various connectors of a module for managing electronic communication among various devices.
Figure 4C:
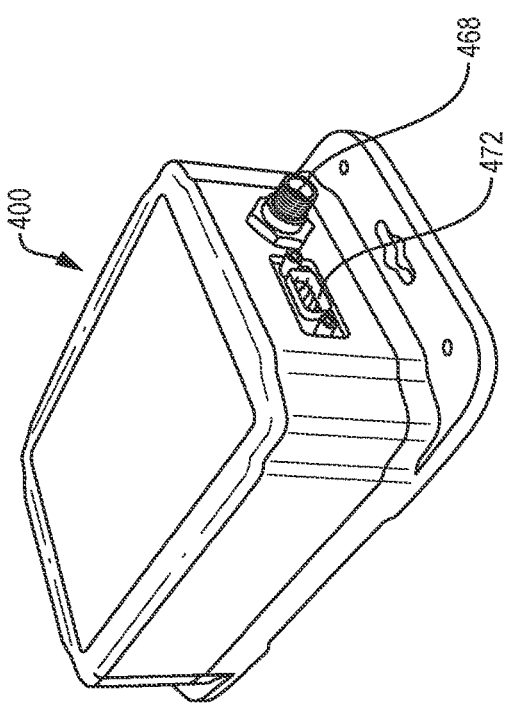
Figure 4A:
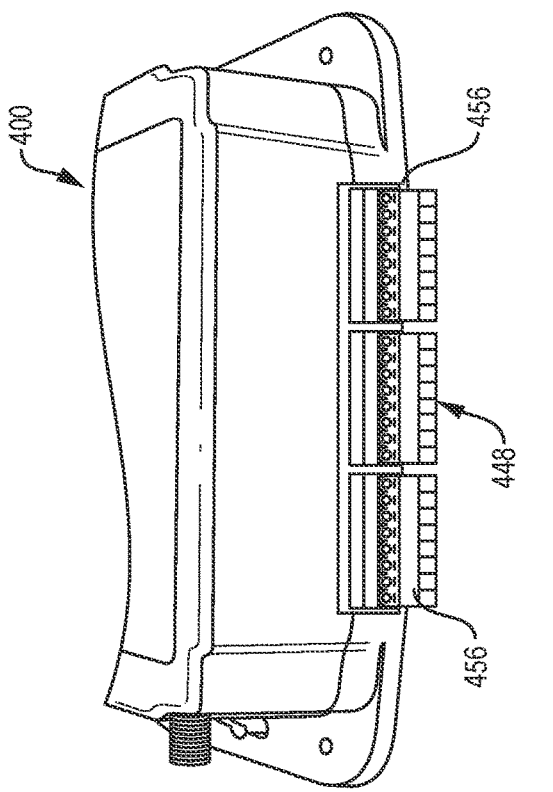

FIG. 4A depicts terminal blocks 456 of a CDI 448 of an embodiment 400 of the module 100. FIG. 4B depicts Ethernet 460 and USB 464 connectors of an embodiment 400. Functionality provided by the USB connectors 464 may include connection to a USB storage drive for extended NMEA 2000 bus logging functions 168. The Ethernet connector 460 may be a standard RJ-45 port supporting speeds of 10, 100, and 1000 Mbps. FIG. 4C depicts NMEA 2000 468 and DB9 472 connectors of an embodiment 400. Some embodiments of the module 100 are attached to an NMEA 2000 bus through a standard drop cable, which cable may also transmit power to operate the module 100.

Some embodiments include a bus termination resistor 172 that may be enabled, i.e., connected between a bus and a ground plane, by a user via a user interface, such as by actuating a switch connected in series with the resistor. Embodiments provide full isolation to a primary NMEA 2000 bus 116 interface included therewith. In some embodiments, an industry-standard DB9 connector 472 is provided for connection to a secondary network bus 120. The secondary network bus 120 may be a physical NMEA 2000 bus or an SAE J1939 bus. The DB9 connector 472 may also transmit NMEA 0183 RS-422 serial data. By using an adapter cable such as the DB9 to NMEA 2000 adapter cable described hereinabove, embodiments of the module 100 may be connected to a secondary network bus 120 via a standard drop cable. The secondary network bus 120 may be an NMEA 2000 bus. The drop cable may also supply power to operate the secondary bus 120. In some embodiments, a bus termination resistor 172, for example, 120Ω, may be configured by a user to be connected to the secondary network bus 120 in a similar manner as described above. Embodiments provide full isolation to the secondary network bus 120.

Some embodiments include a web management server 180 that may be used to configure and manage various settings pertaining to the module 100. A user may proceed with initial configuration of the module after connecting to a wireless access point built in to the module 100, and navigating via web browser to a noted IP address of the module 100. A username and password may be set to safeguard configuration settings of the module 100. A wireless access point passphrase, using a standard such as WiFi Protected Access II (WPA2) may be set for added security.

Some embodiments of the module 100 include a user interface 500 supported by the web server 180 and configured to enable a user to inspect and configure a range of devices and sensors 205 including network devices of the NBI 104 and connected terminal devices of the CDI 148. Such terminal devices may be connected to the CDI 148 through a pluggable terminal block 152 to a terminal pair. The user interface 500 may be further configured to monitor messages propagating along the network buses 116, 120 and specify user settings pertaining to allowing or blocking transmission of the messages. The user interface 500 may be further configured to specify a type and a function of a terminal device being connected to a terminal 156 of a CDI 148. The type of the terminal device may influence a selection of a message or a plurality of messages regarding the terminal device for the NBI 104 to make available for transmission towards the first or the second network bus.

Figure 5A:
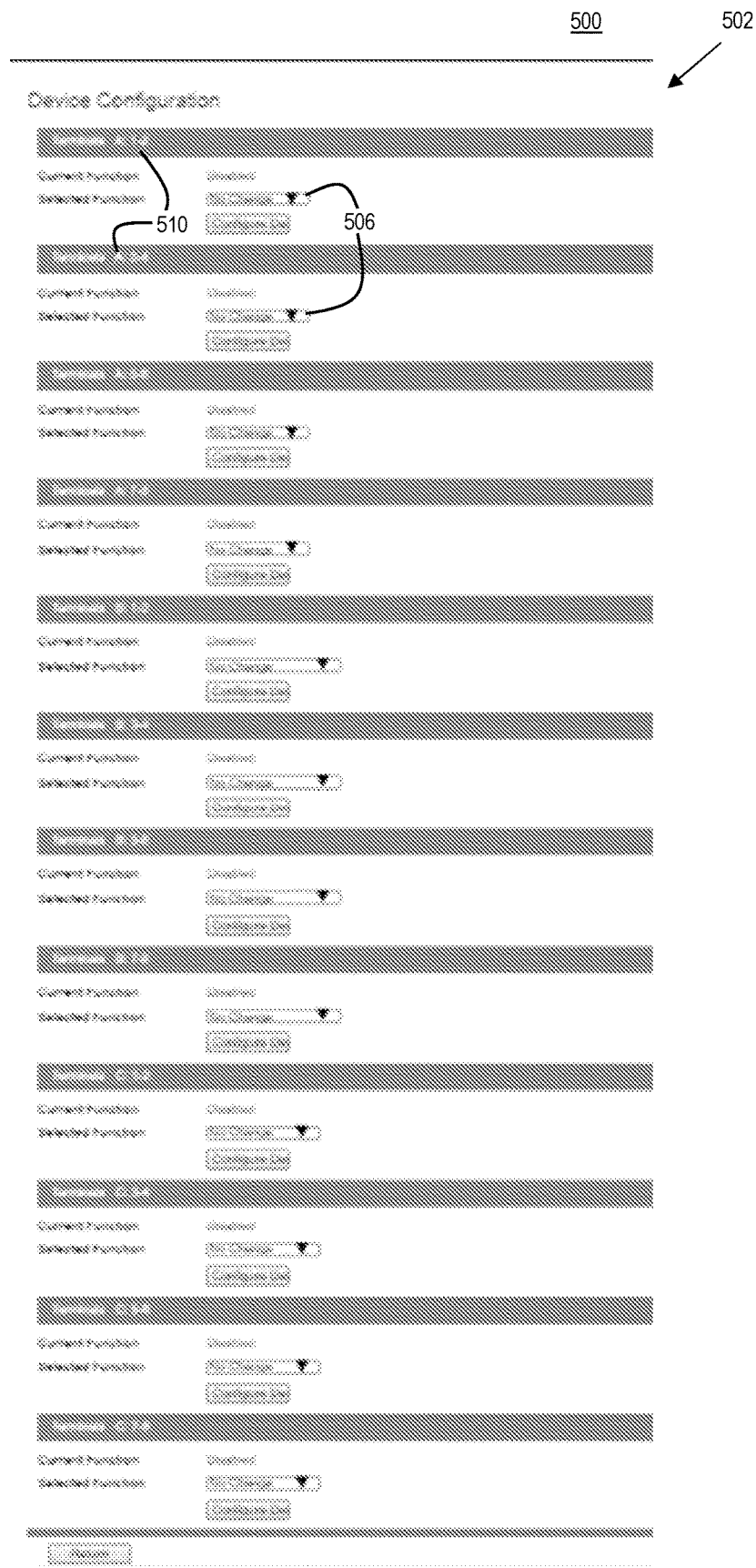
Figure 5B:
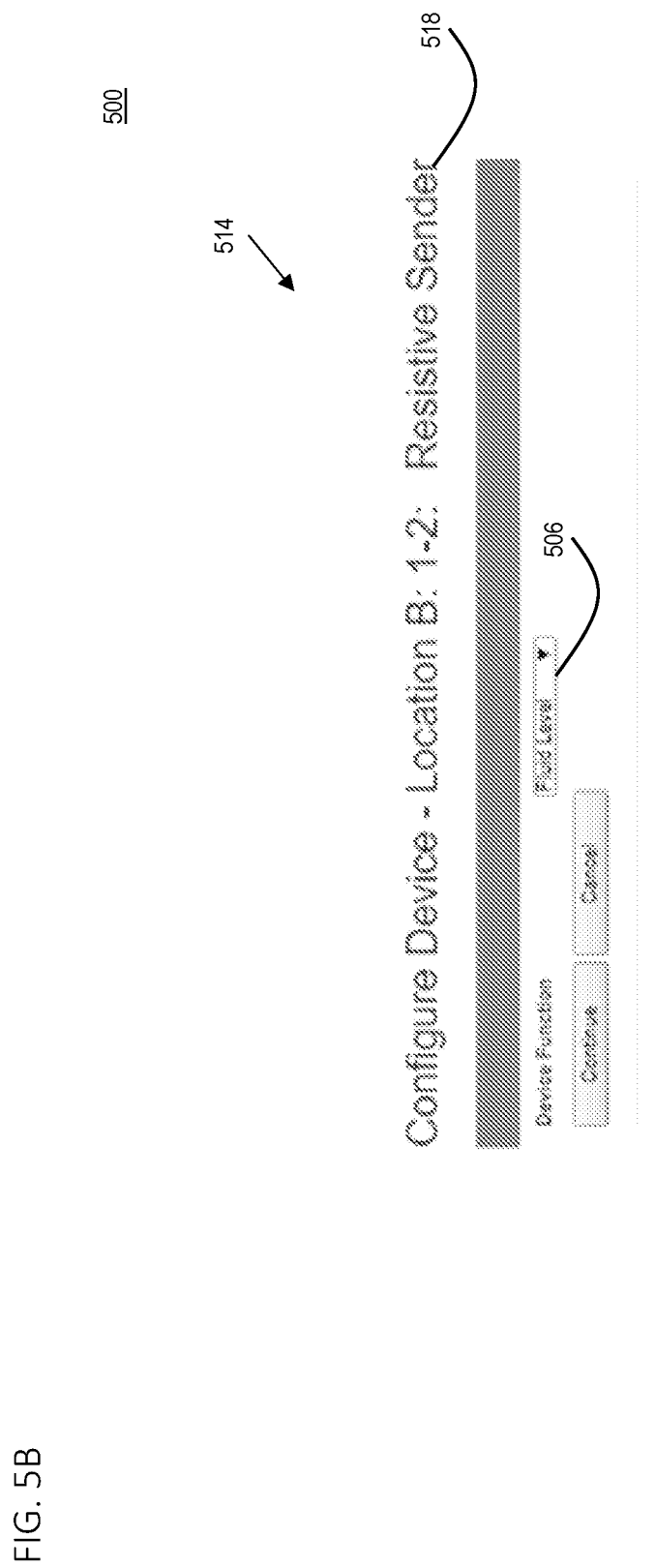
Figure 5C:
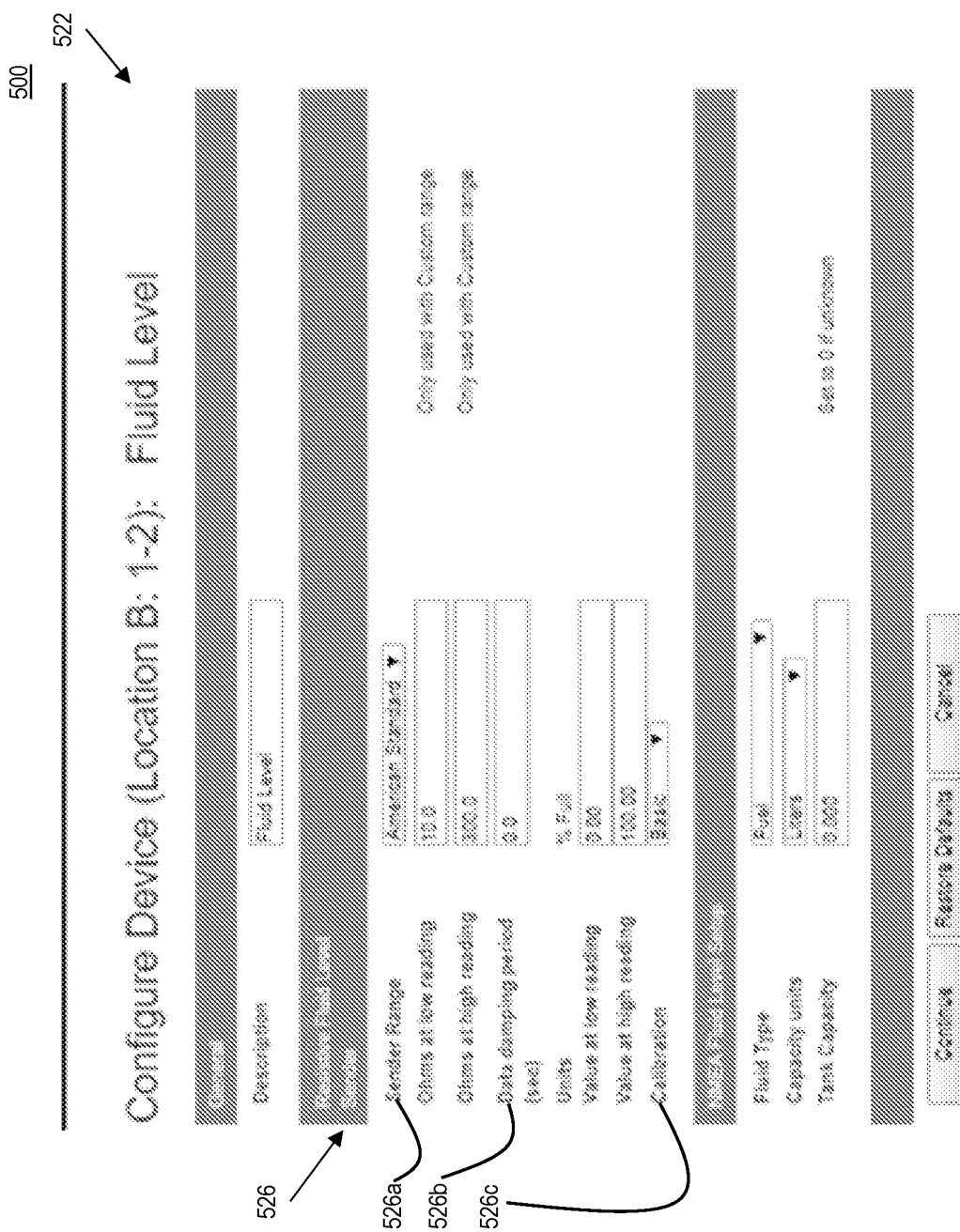
Figure 5D:
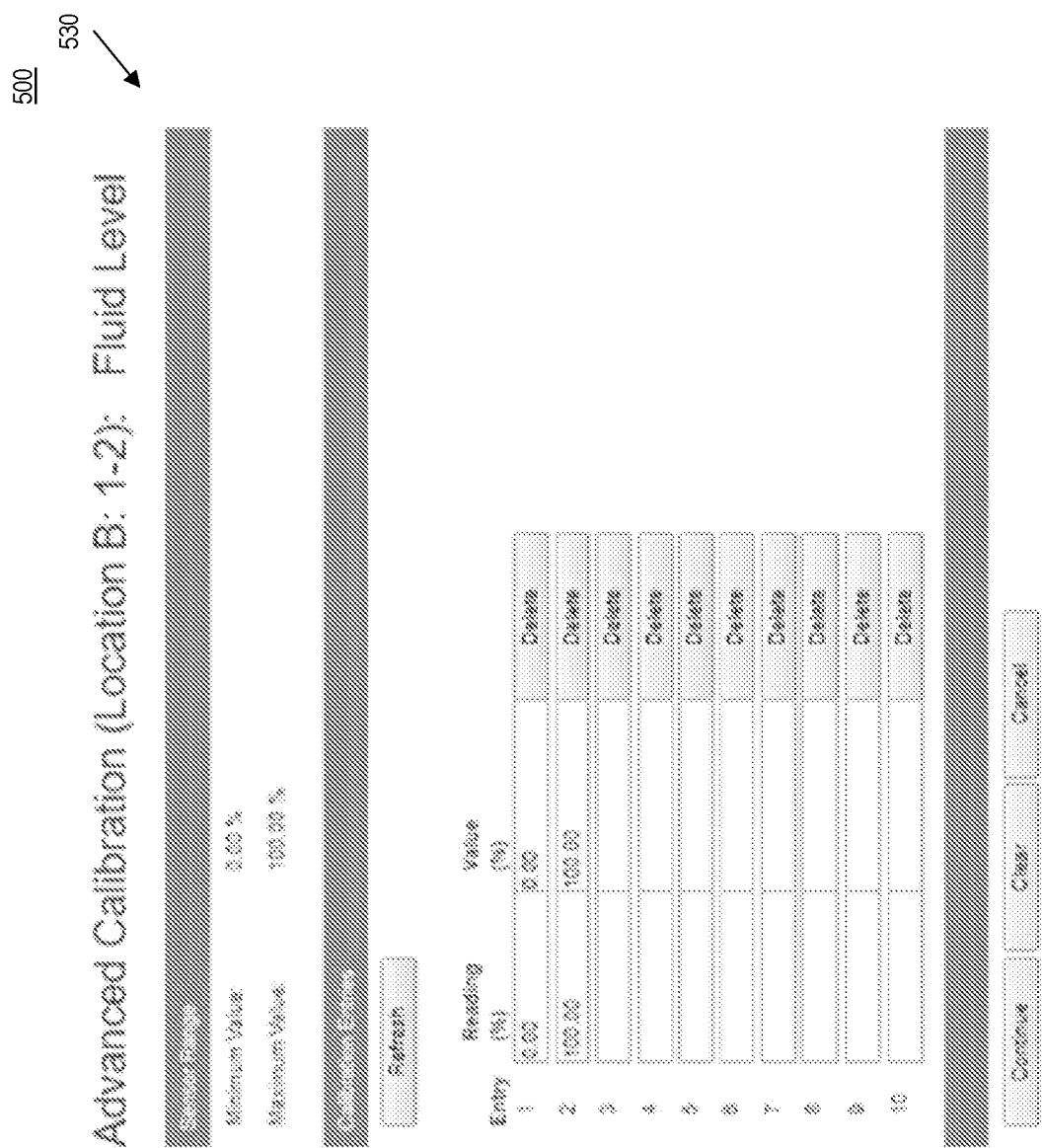
Figure 5E:
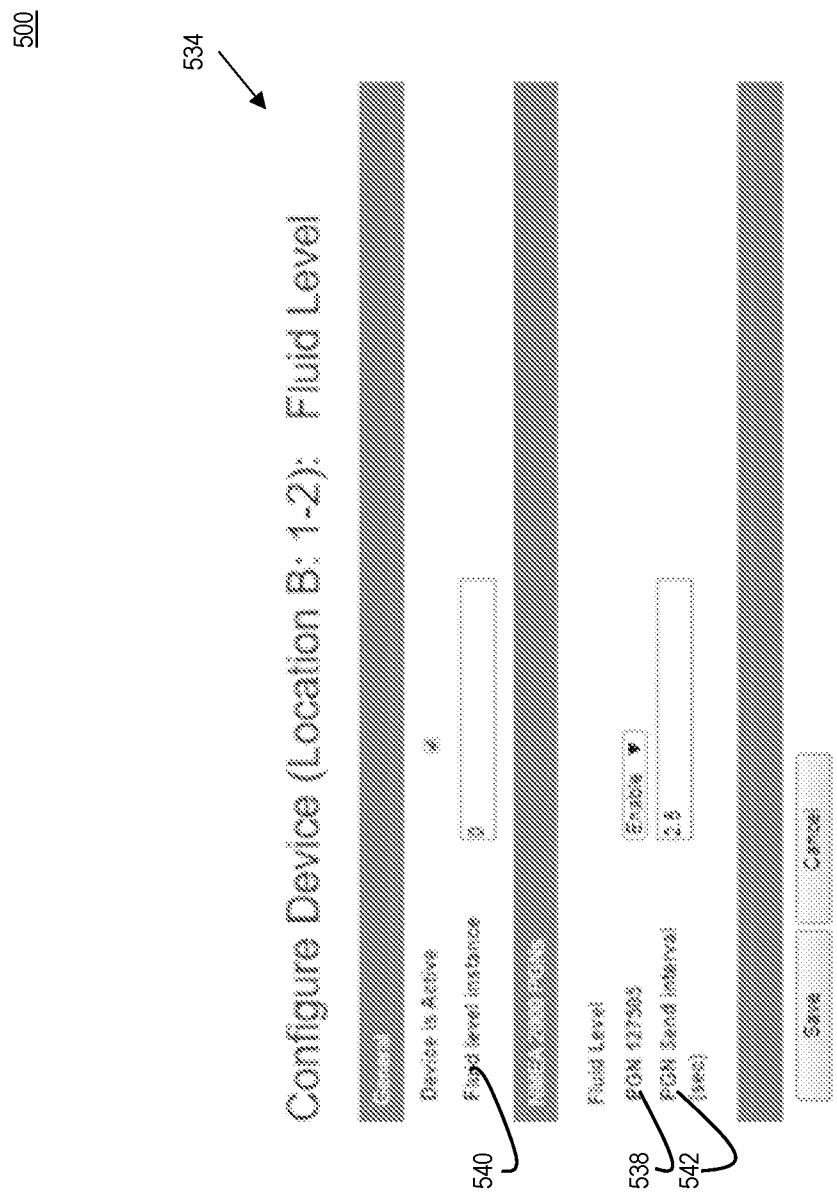
Figure 5F:
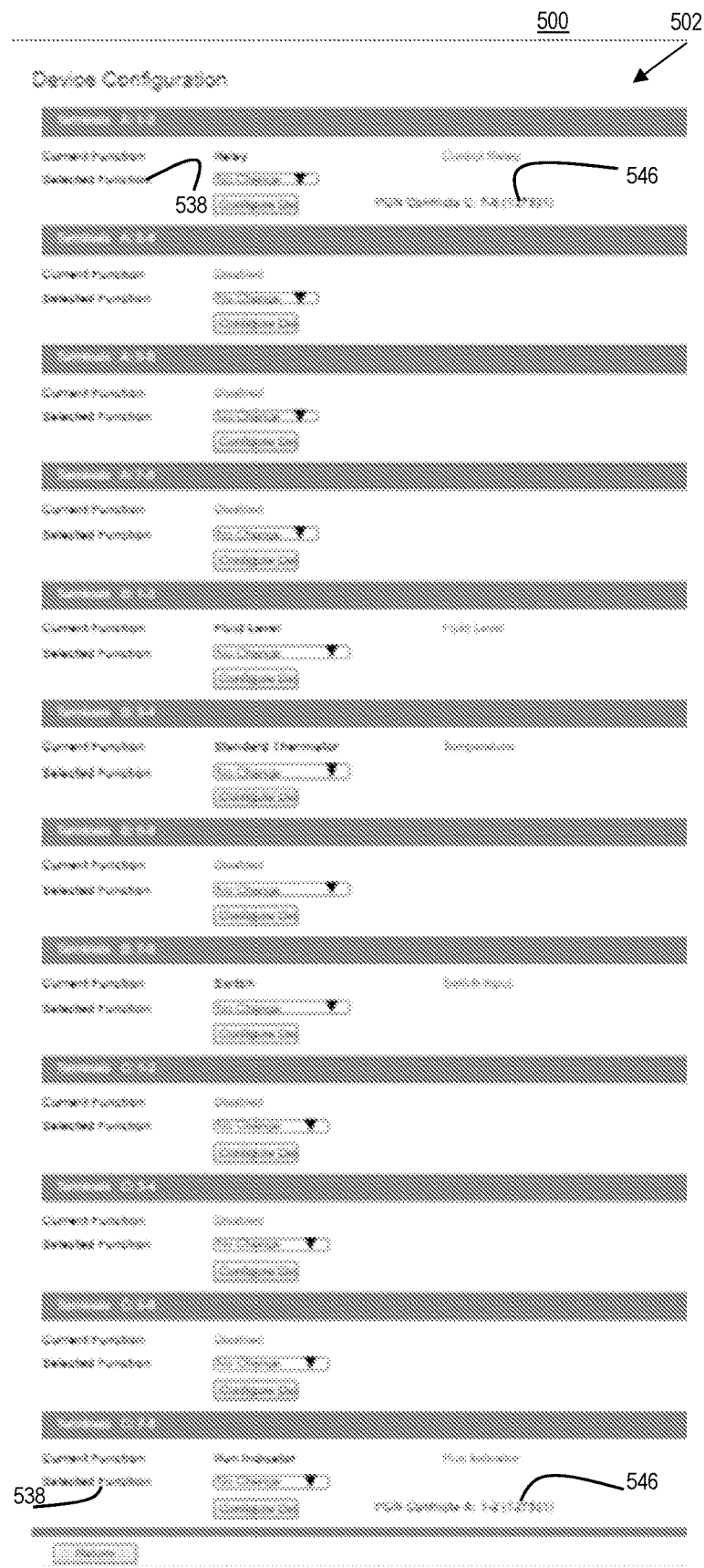

FIG. 5A shows a device configuration screen 502 of a user interface 500 according to an embodiment. The device configuration screen 502 of FIG. 5A shows a current function 506 assigned to terminals 156, 510 of the CDI, which terminals 510 may be configured in terminal pairs. The device configuration screen 502 enables the user to change the function 506 and otherwise configure the device. Terminals 510 and functions 506 available within the device configuration screen 502 may differ for different models of networking modules 100. FIG. 5B shows an example interface 514 for specifying a function 506 of a device 205, 518 if a user has selected a resistive sender within the device configuration screen 502 of FIG. 5A. FIG. 5C continues this example, showing an example interface 522 for configuring the device 518 to measure fluid level and configuration options 526 applicable to a resistive sender device, including sender range or resistance range 526a, data damping period 526b, calibration type 526c, and other fields. Data damping period 526b may refer to an interval of time during which multiple data samples are taken for subsequent averaging over the interval. Calibration type 526c may enable selection of a basic or advanced device calibration available at least for resistive senders and current loop devices. FIG. 5D shows an example advanced calibration screen 530. Calibration may be based on previously measured values and may be either interpolative or extrapolative based on the previously measured values. Basic calibration may assume linear operation of a sensor 518 within a specified calibration range, while advanced calibration may be used for sensors 518 that do not operate linearly. For example, a fuel tank may be shaped in a way that causes sensor readings to change less rapidly as the fluid level drops. FIG. 5E shows an example NMEA 2000 parameter group number (PGN) configuration screen 534 that enables a user to specify the NMEA 2000 PGNs 538 that will be generated for the selected device function. In the example, PGN 127505 is available. Other example functions such as temperature management may generate several different PGN messages. Settings of a PGN configuration screen 534 may include instance number 540 and PGN send interval 542. FIG. 5F shows example warning messages 546 that may be issued when the module 100 identifies conflicts among PGN messages caused by device settings. In the example, two devices have been configured to use the same switch position for the selected NMEA 2000 PGN 538. A user may resolve the conflict by selecting an alternate value on the PGN configuration screen 534, as shown in FIG. 5E, for one of the affected PGNs 538.

In some embodiments, the user interface 500 includes a network configuration screen. Settings on such a screen may include an enable function, which may be activated by a user subsequent to completion of other desired configuration steps so as to prevent any premature communication by the module along the network bus. Settings on a network configuration screen may include a bus termination control, which may be used to connect and disconnect termination resistors 172 to and from the network bus 116, 120. Termination resistors 172 may be, for example, 120 Ω. Settings on a network configuration screen may include various forms of product information such as system instance, device instance, and installation description, and may be used to distinguish between multiple networking modules 100 connected to a network. Settings on a network configuration screen may enable configuration of a secondary bus 120 as an NMEA 2000 bus, or as an SAEJ1939 bus for gateway operation. Settings on a network configuration screen may enable configuration of a serial port for NMEA 0183 talker and/or listener operation. Settings on a network configuration screen may enable bridging of NMEA 2000 messages from devices wirelessly connected to the module 100, thus supporting a wireless NMEA 2000 bus. Such a wireless NMEA 2000 bus may be referred to as a virtual NMEA 2000 bus. An NMEA 2000 message log may be accessed and downloaded from a network configuration screen.

In some embodiments, a networking module 100 may be configured to connect to a WiFi network, or to extend an NMEA 2000 network to other networking modules wirelessly. A networking module 100 may be configured to wirelessly connect to an access point built into another networking module. In some embodiments, a networking module 100 may be connected to a wired network such as, for example, an Ethernet network. Such embodiments support high bandwidth transmissions and alleviate situations in which wireless connectivity is difficult to sustain. In some embodiments, dynamic host configuration protocol (DHCP) may be disabled in favor of a static IP address being assumed by the module 100.

In some embodiments, networking modules 100 that are connected to a wired, e.g. Ethernet, or wireless network may be configured to extend an NMEA network across the wired or wireless interface. Networking modules 100 advertise their presence on available networks so as to be discoverable by other networking modules, without knowledge of IP addresses of the other networking modules, but with knowledge of serial numbers thereof. In some embodiments, a transmission control protocol (TCP) port may be specified in case of network conflicts. A first networking module may connect to a second networking module following a user selection, within the user interface 500, of the second networking module from a list.

Figure 6A:
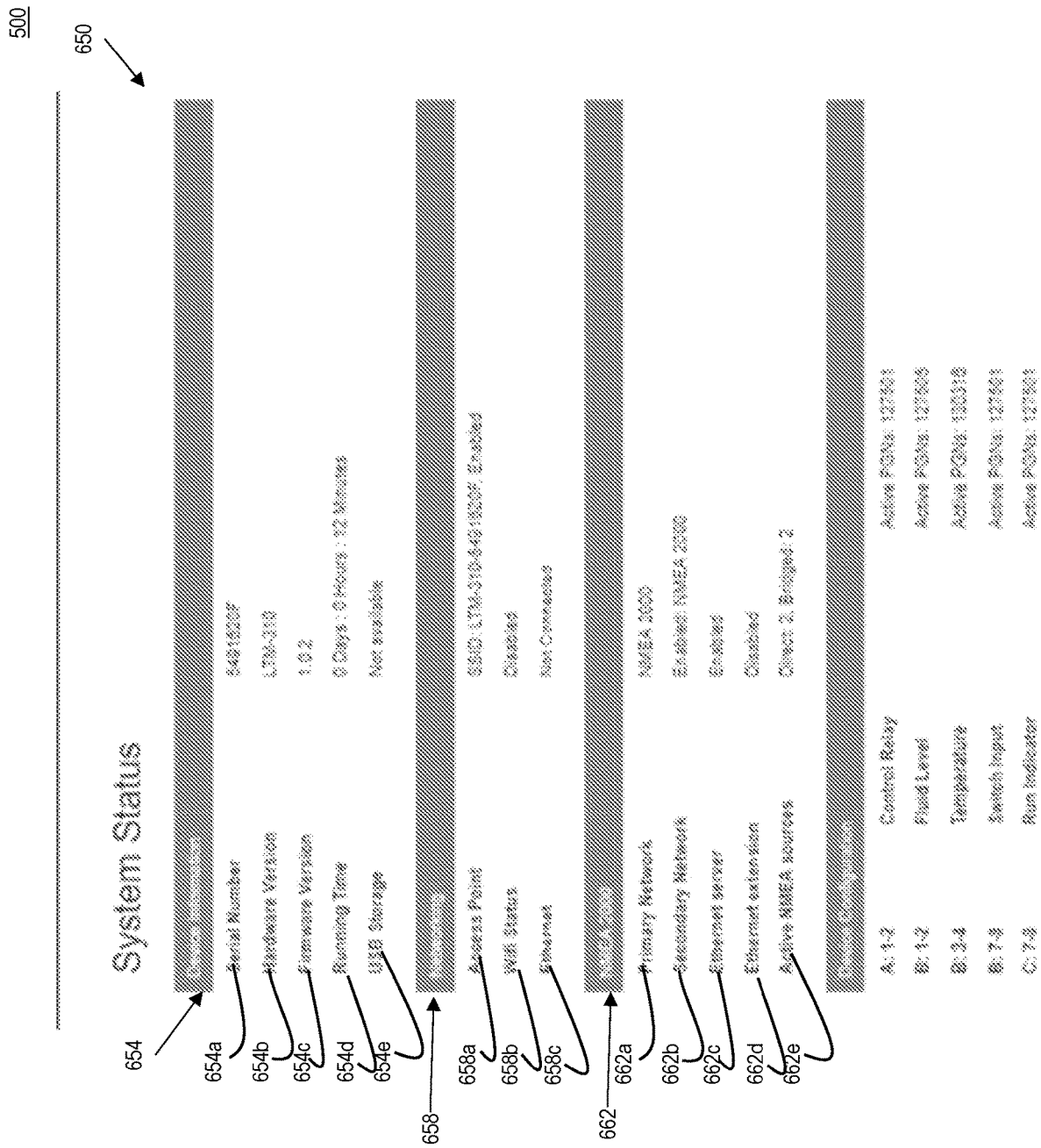
Figure 6B:
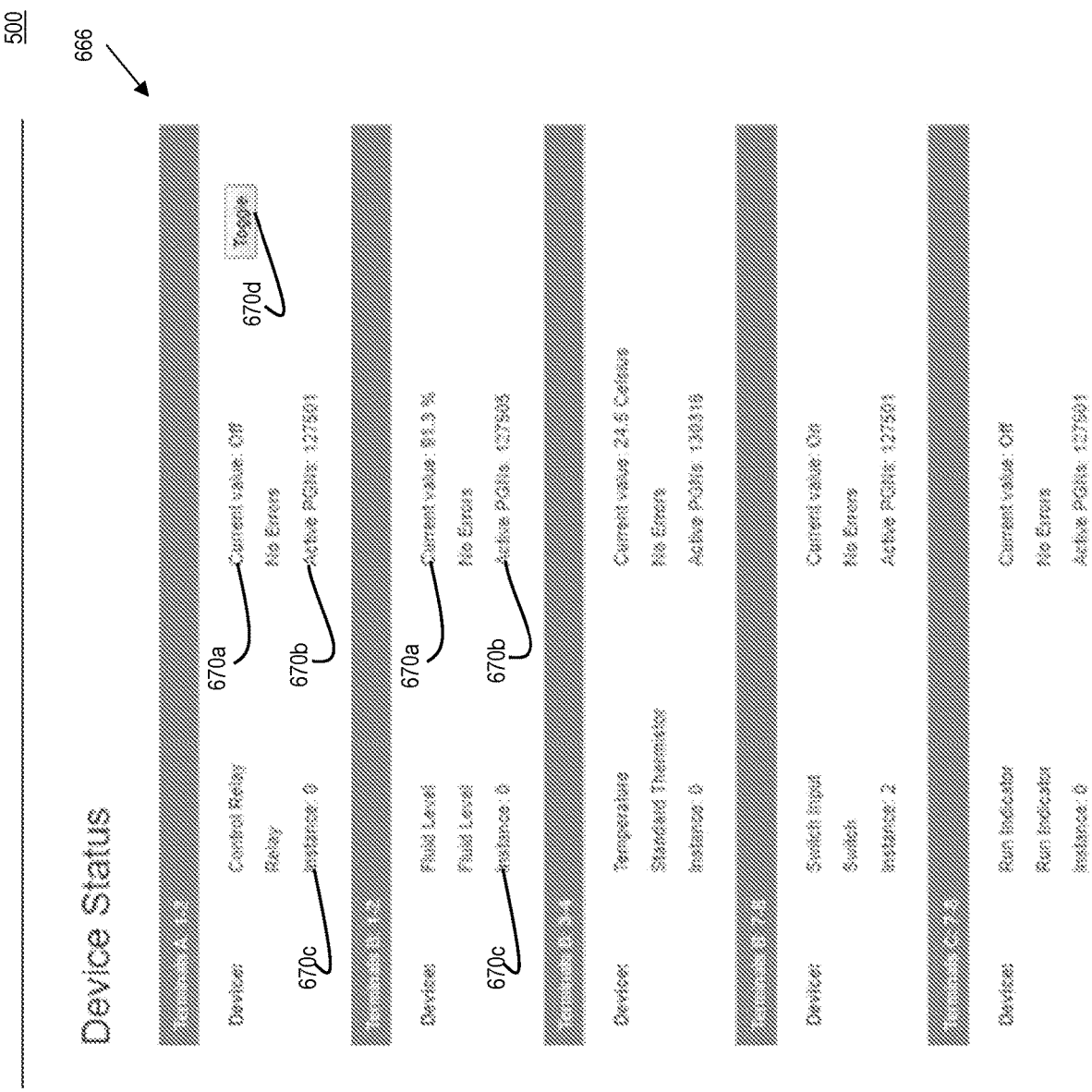
Figure 6C:
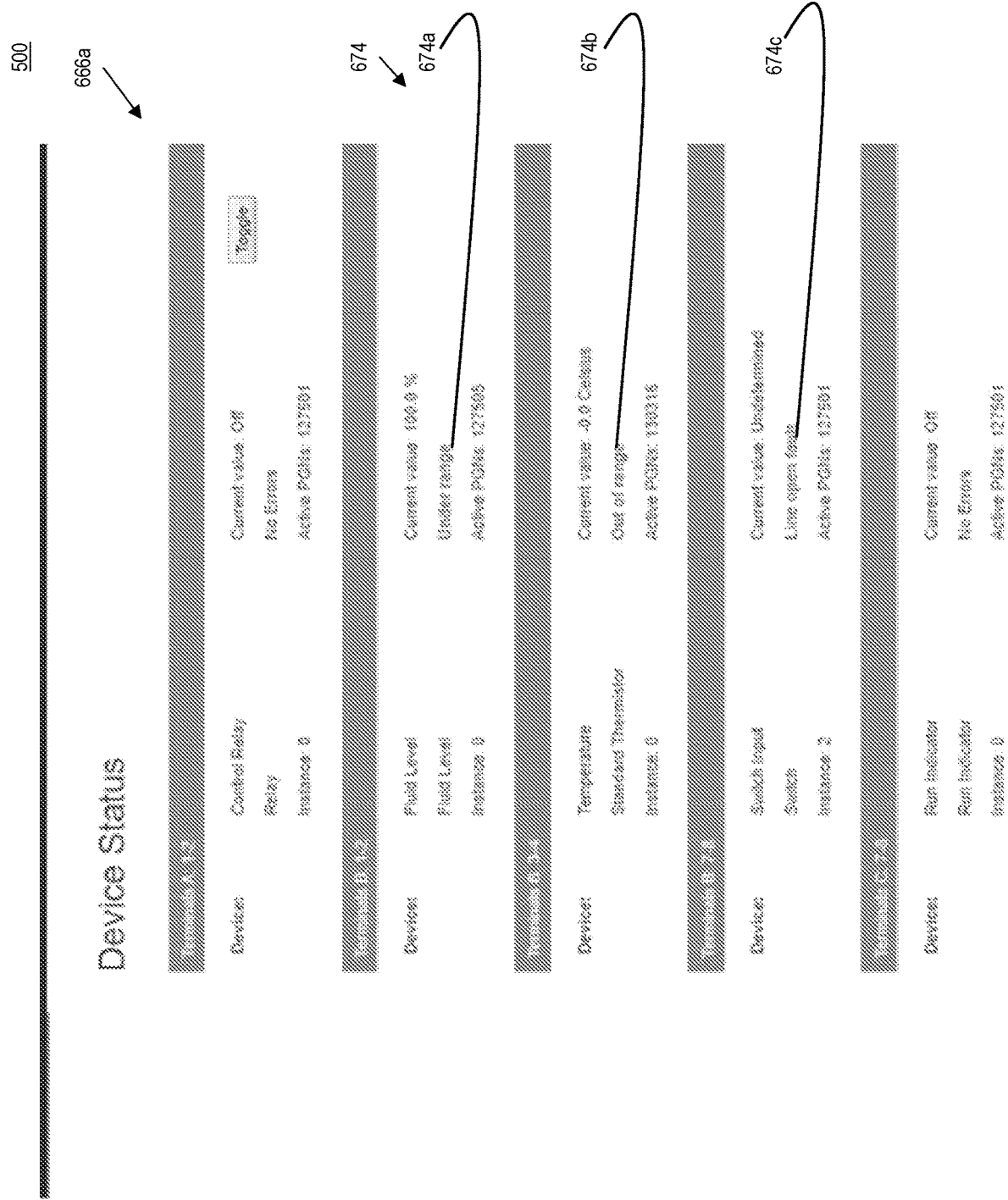

In some embodiments, a user interface 500 may include a status screen 650 to serve as a home page for the module configuration interface and to provide an overview of operation of the module 100. An example status screen 650 is shown in FIG. 6A. The status screen 650 of FIG. 6A includes indications of device information 654 such as serial number 654a, hardware 654b and firmware 654c version, running time since the module was last restarted 654d, and used and available USB storage 654e. The status screen 650 of FIG. 6A further includes networking information 658 such as module SSID 658a and status of WiFi 658b and Ethernet 658c connections. The status screen 650 of FIG. 6A further includes NMEA 2000 network status indicators 662 including statuses of a primary 662a and secondary 662b network, an Ethernet server 662c, and Ethernet extension 662d, and any devices connected either directly over the NMEA 2000 bus or bridged through TCP/IP servers 662e. FIG. 6B shows a view devices or device status screen 666 included in some embodiments. The device status screen 666 of FIG. 6B enables a user to see sensor values 670a for devices connected to the module 100, active PGNs 670b that will be sent, and PGN instance numbers 670c. The device status screen 666 of FIG. 6B also enables a user to manually change states of relay devices by clicking a toggle button 670d. A user may also ensure, through the device status screen 666, that connected devices are properly configured and connected to correct terminals 152 with no errors detected. FIG. 6C shows an example device status screen 666a indicating various errors 674, including readings flagged as being out of range due to configuration errors such as an incorrect range 674a for a resistive sender measuring fluid level, and a disconnected lead 674b on a thermistor. The device status screen 666a of FIG. 6C also indicates a line-open fault 674c for a connected binary switch.

Figure 7:
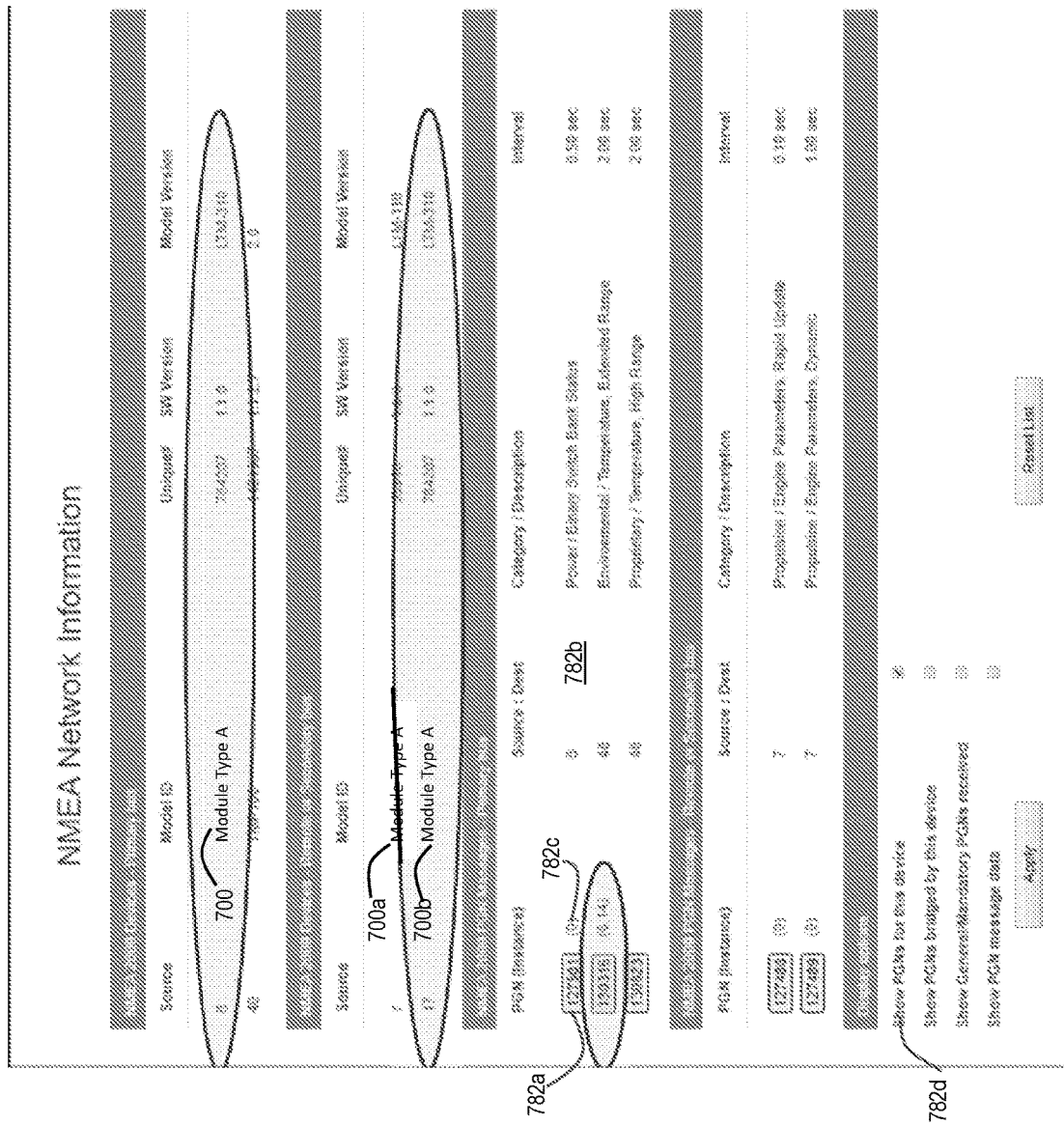

FIG. 7 shows a multipurpose interface 778 of a user interface 500 according to some embodiments. The multipurpose interface 778 may provide a summary of NMEA 2000 bus activity. In the example of FIG. 7, two additional networking modules 700a, 700b are shown as being connected to a local networking module 700, one additional networking module 700a on a primary NMEA 2000 bus 116 and the other additional networking module 700b on a secondary NMEA 2000 bus 120 of the local networking module 700. In some embodiments, devices 205, 305 connected via a virtual or wireless secondary bus 350 of a local networking module 100 will also appear within the secondary bus 120 section of the multipurpose interface 778. Embodiments of a multipurpose interface 778 may also indicate active PGNs 782a observed on buses connected to the local networking module, along with information 782b pertaining to the active PGNs. The information 782b may include instance values 782c to differentiate between messages with the same PGN number. Also included in a multipurpose interface 778 may be various options 782d for specifying which PGNs to include.

Figure 8A:
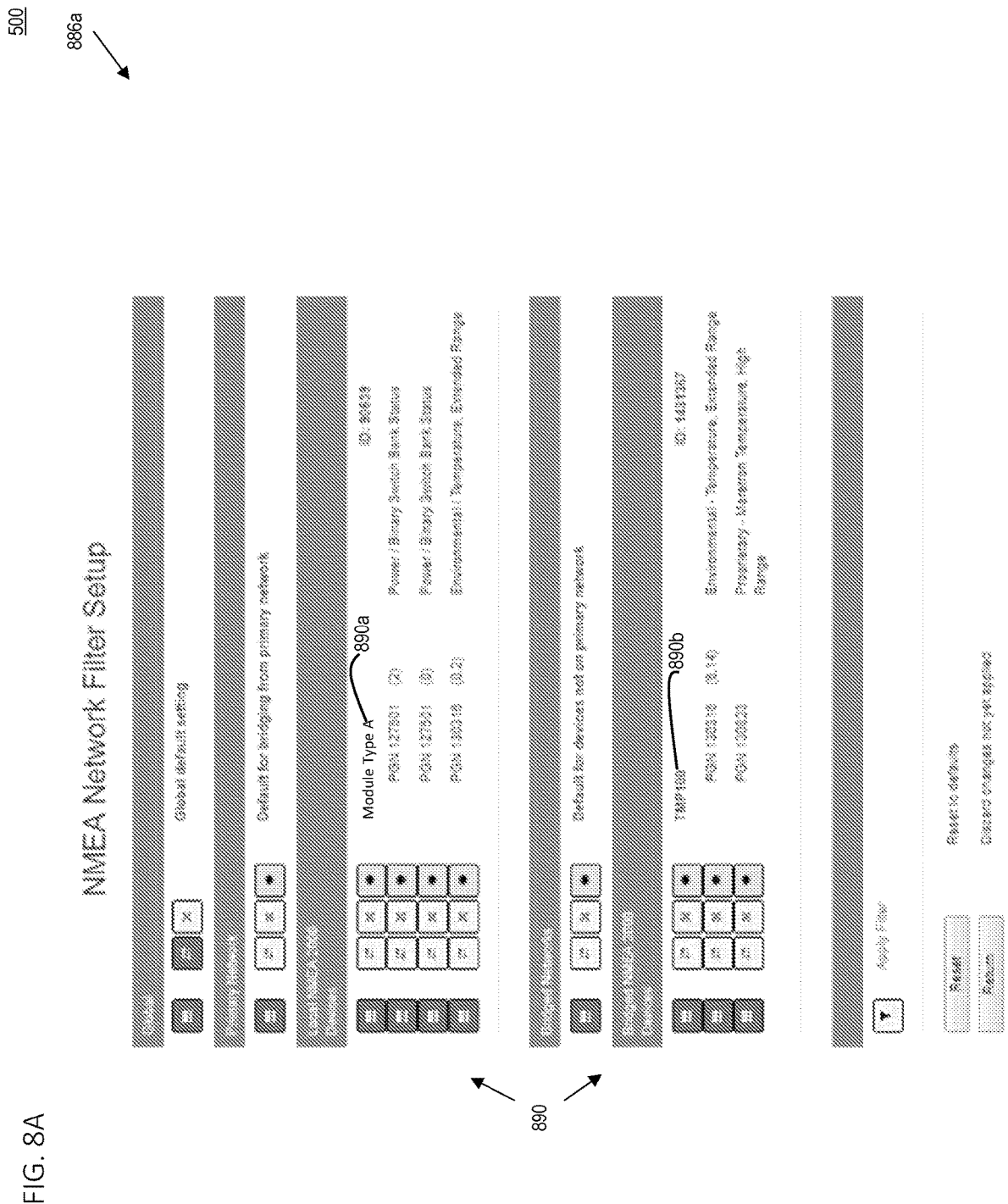

FIG. 8A shows an example configuration screen 886a of a user interface 500 for a message filtering function built 112 in to an NBI 104, or a component thereof, such as the NMEA 2000 Bridge Function 108 of FIG. 1. Such a filtering function 112 may be configured to control PGN message traffic between primary 116 and secondary 120 network buses. The filter function 112 may determine whether or not a given PGN from one bus is bridged to another. The filter function 112 may be configured using a whitelist/blacklist approach, with at least three settings for each PGN, including allow, block, and default. An action for a PGN set to default may depend on a higher-level setting. Settings as described may also be available at device and bus levels. At the device level, the setting is used to determine an action for all PGNs generated by that device that are set to default. At the bus level, the setting is used to determine an action for all devices that are set to default. In FIG. 8A, two devices 890 are shown as configured to send NMEA 2000 PGN messages: the local networking module 890a on the primary network bus, and a TMP100 device 890b on a bridged or secondary network bus.

Figure 8B:
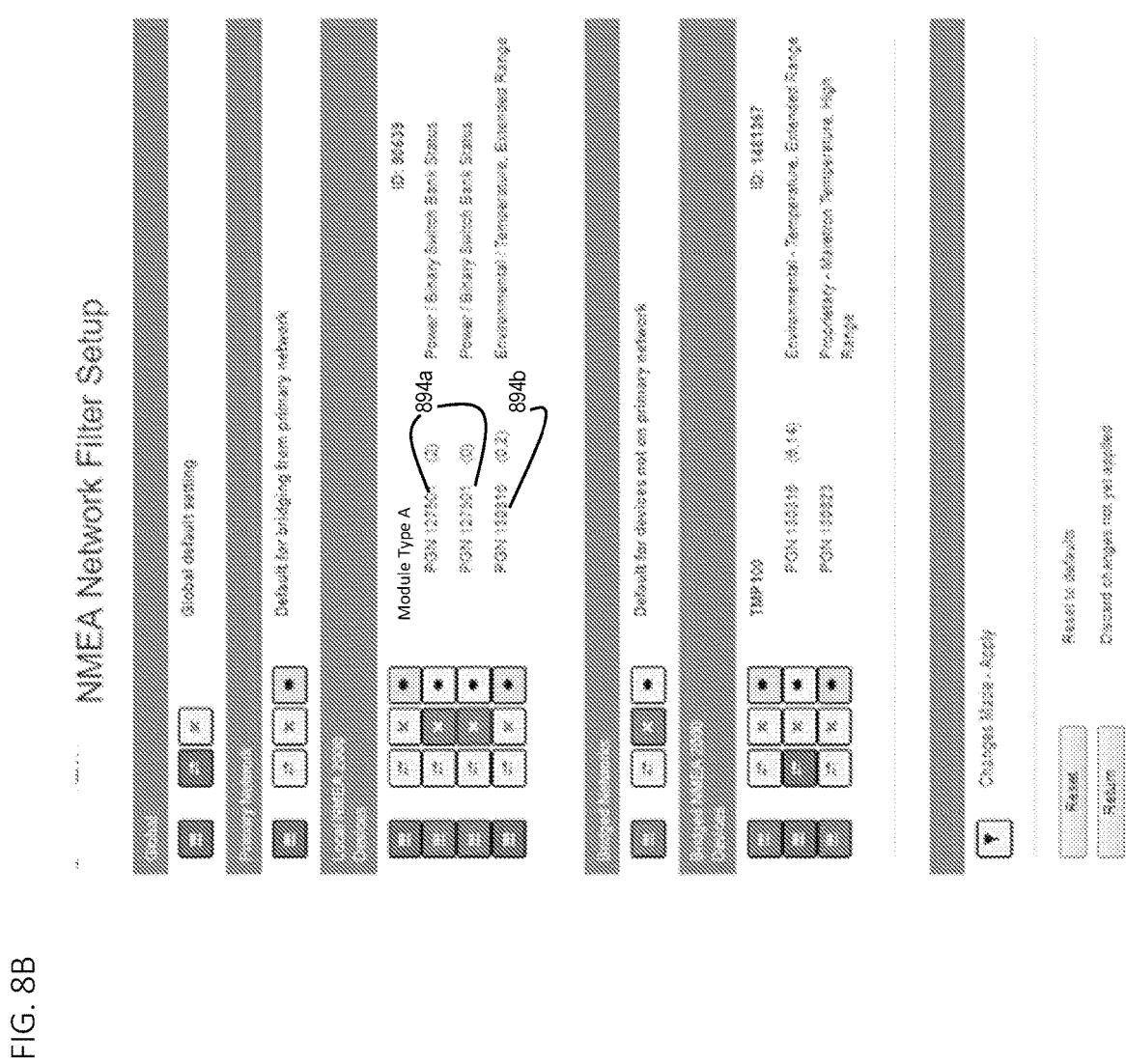

FIG. 8B shows an example configuration screen 886b for a message filtering function 112 wherein various settings differ from the example of FIG. 8A. In the example 886b of FIG. 8B, two switch bank status PGNs 127501 894a originating in the local networking module 890a have been individually blocked or blacklisted, and thus will not be bridged to the secondary network bus 120. In FIG. 8B, the default setting for the secondary network bus 120 is shown as having been changed to the block setting. However, a temperature PGN 130316 894*b* has been individually allowed or whitelisted, and thus it will be bridged to the primary network 116.

Figure 8C:
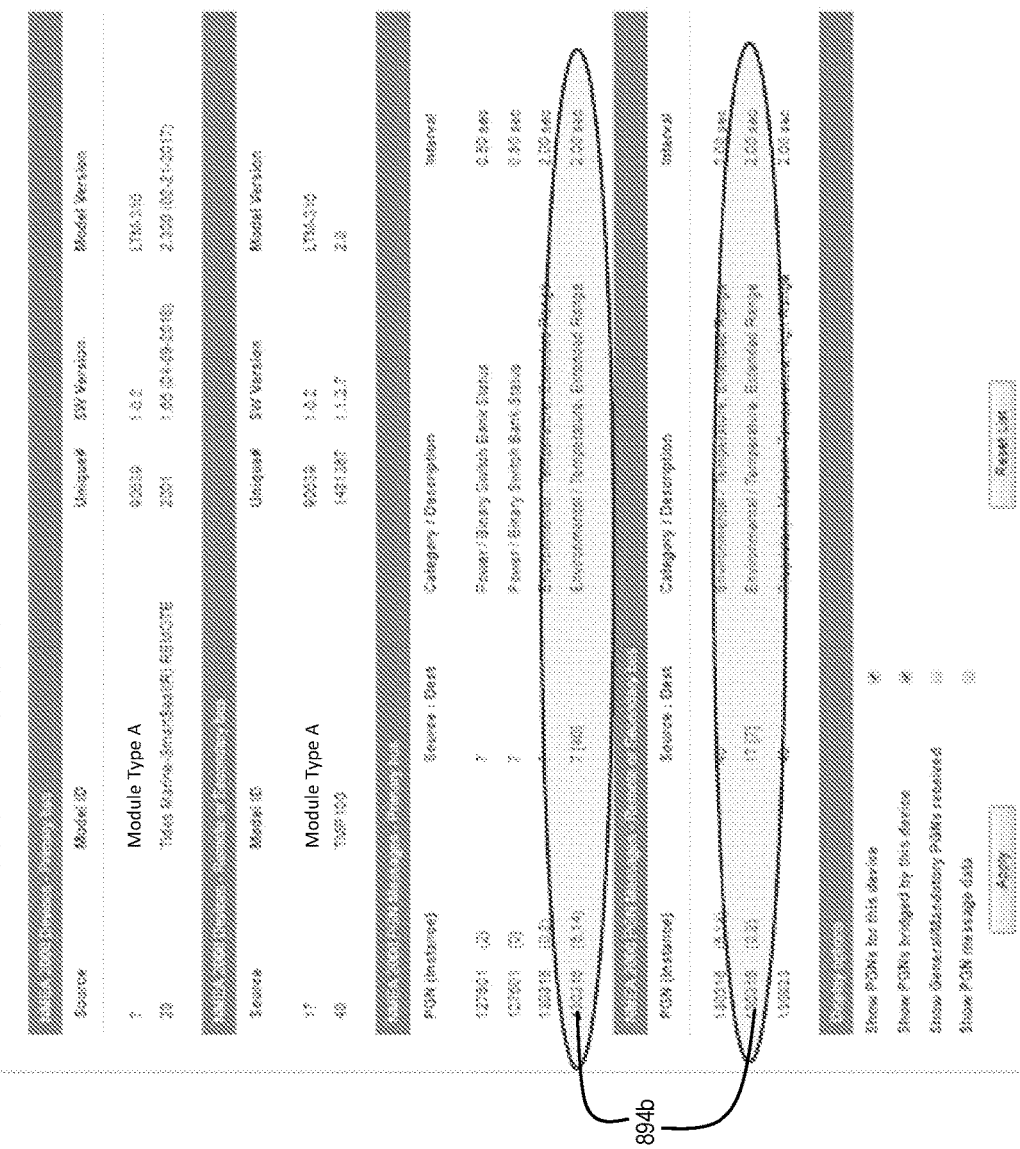

PGNs 894*a,b* and devices 205 listed on a configuration screen 886 for message filtering 112 include devices and messages that have been detected by the local networking module 890*a*. Newly observed PGNs will follow the default settings. Using the example of FIG. 8B, if a new NMEA 2000 device is added to the primary network bus 116, PGNs 894*a,b* sent by the newly added device will be bridged to the secondary network bus 120. Similarly, if a new NMEA 2000 device is added to the secondary bus 120, any PGNs 894*b* sent by the newly added device will not be bridged according to the bus default. In the example, this also applies at the device level: if the TMP100 configuration has been changed to add a new measurement and PGN message, the new PGN message would not be bridged because the device default had been set to the block setting. FIG. 8C shows an example multipurpose interface 878 after configuring the filtering function 112 according to the example of FIG. 8B. In the example, two 130316 temperature PGNs 894*b* are shown to be bridged.

In some embodiments, the module 100 supports a highly configurable alerting system 176. Through the user interface 500, alerts may be defined based upon NMEA 2000 message field values, timers, and counters, and may be combined with other alerts. Thresholds may be established for devices that, if crossed, automatically trigger alert actions based on a status of at least one characteristic defining the alert. Alert variables may include at least one of PGN values variables, calculated variables, timer variables, and event counter variables. Alert actions may include at least one of displaying the alert, or a representation thereof, in the user interface 500, generating a message to report an alert message to a display device, generating a message to report a binary status, and generating a message to control a binary device.

Figure 9A:
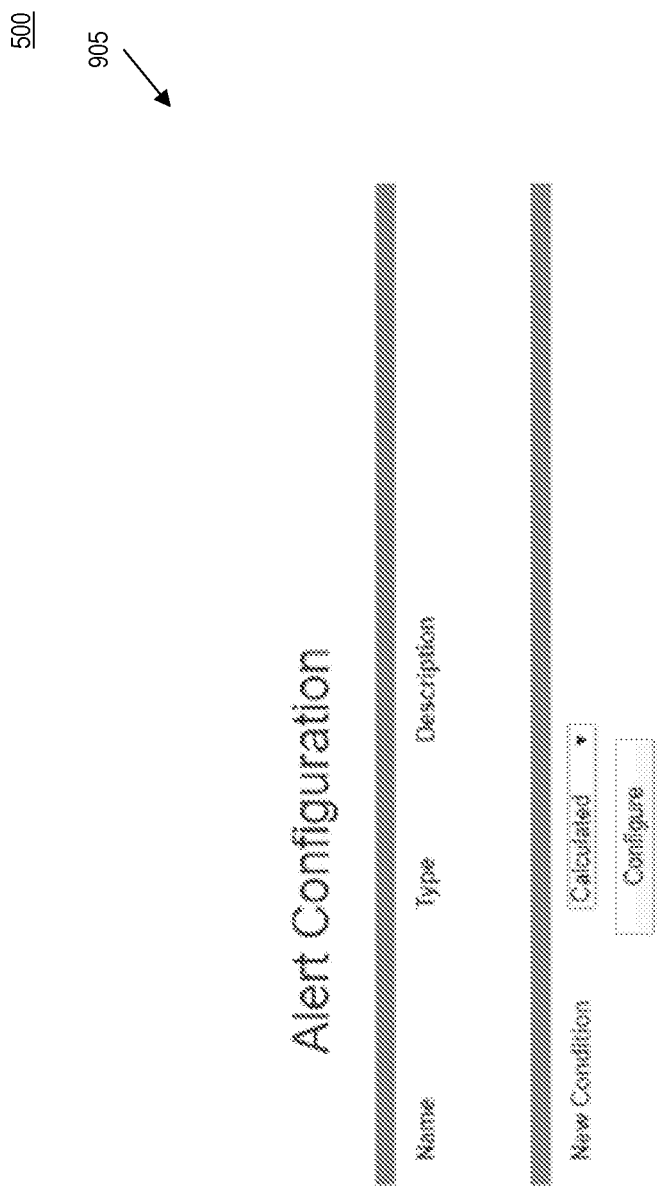

FIG. 9A shows an example alert configuration screen 905 of a user interface 500 for systems including an alerting system 176, without any variables defined. An alert variable may have as a value one of three states, including true, false, and unknown. Values of true and false respectively indicate that a condition such as a threshold is met and not met. A value of unknown indicates that PGN data is not available for the variable or a component thereof.

Figure 9B:
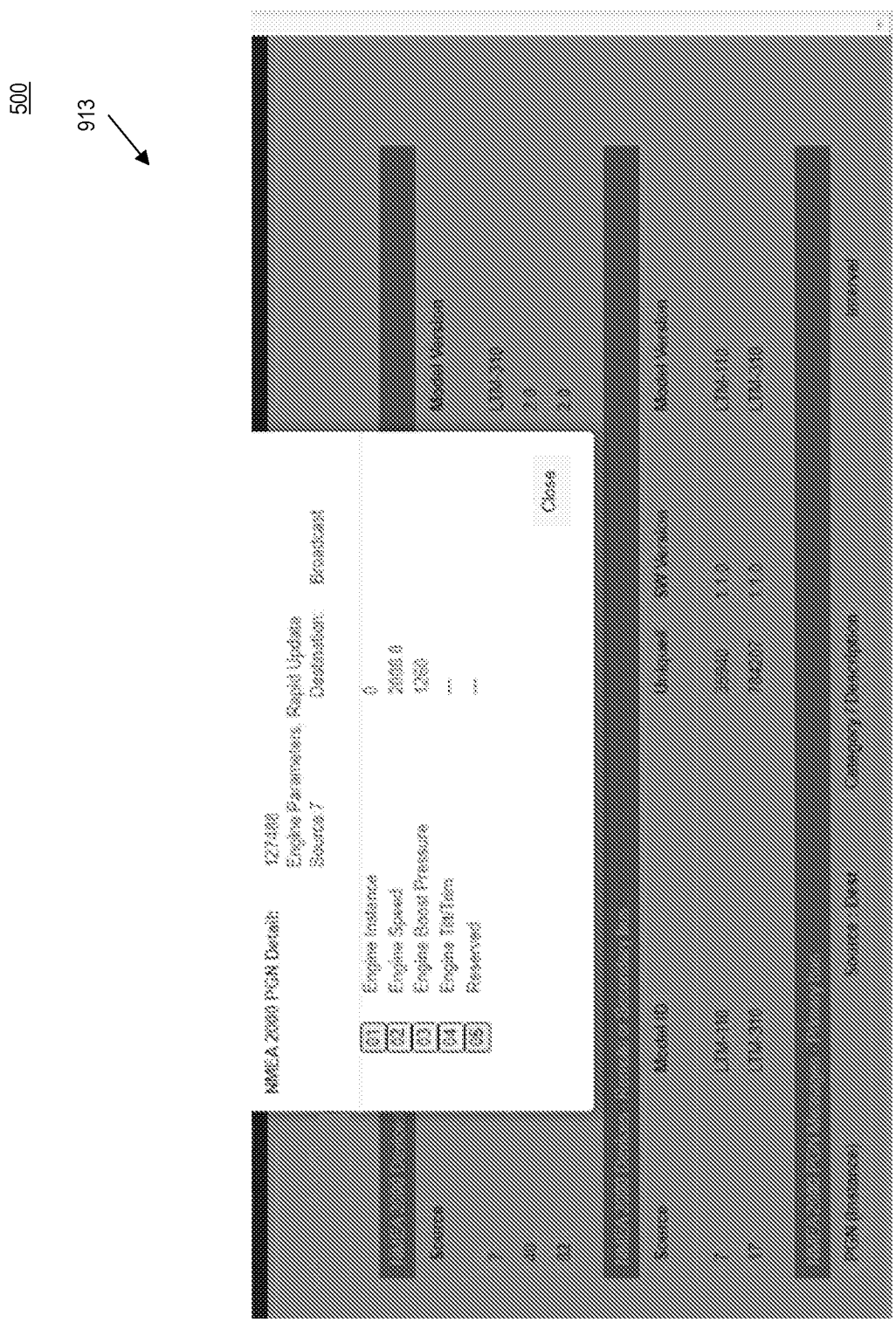
Figure 9C:
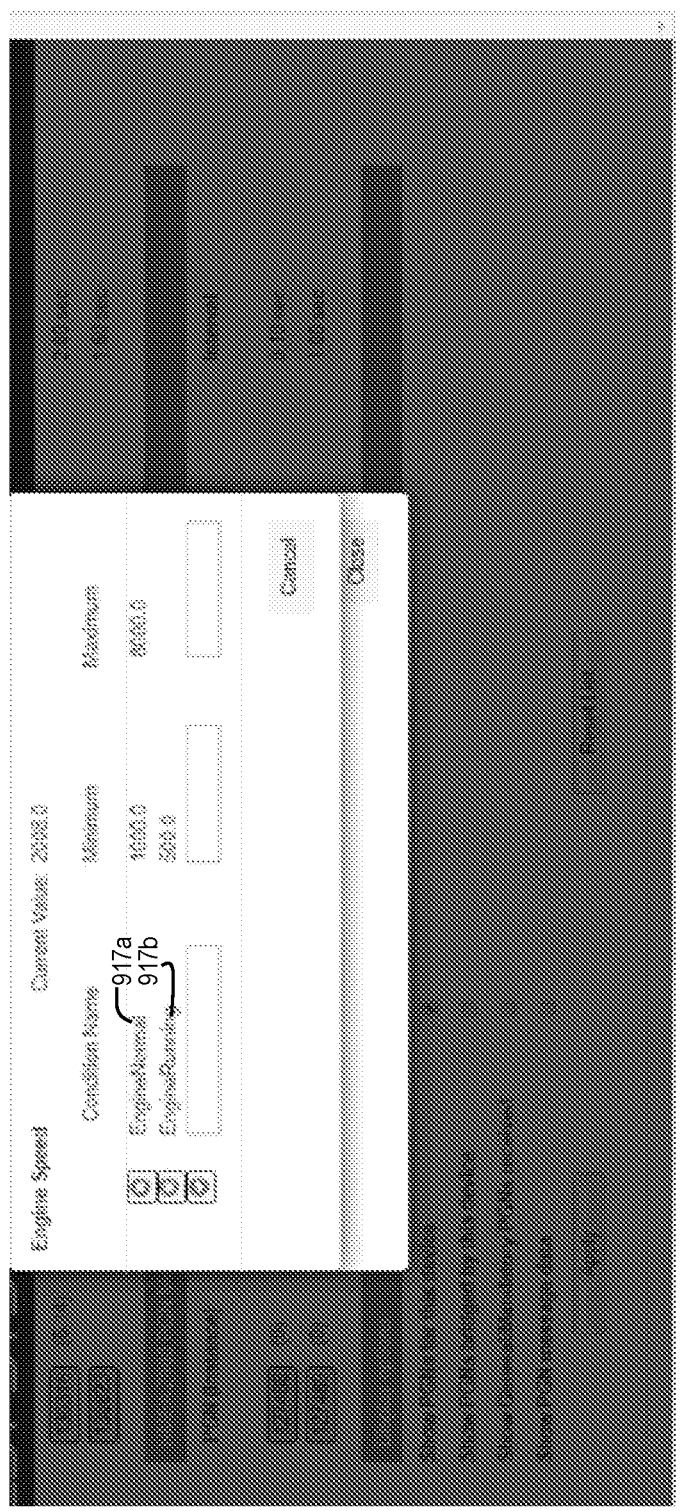

FIG. 9B shows, for a user interface 500, an example PGN message detail 913 for a PGN labeled "Engine Parameters, Rapid Update," generated by the SAE J1939 interface function. FIG. 9C shows two conditions, EngineNormal 917*a* and EngineRunning 917*b*, set for an engine speed variable that may be created for the specified PGN. Such conditions may be defined according to engine rotations per minute (RPM).

Figure 9D:
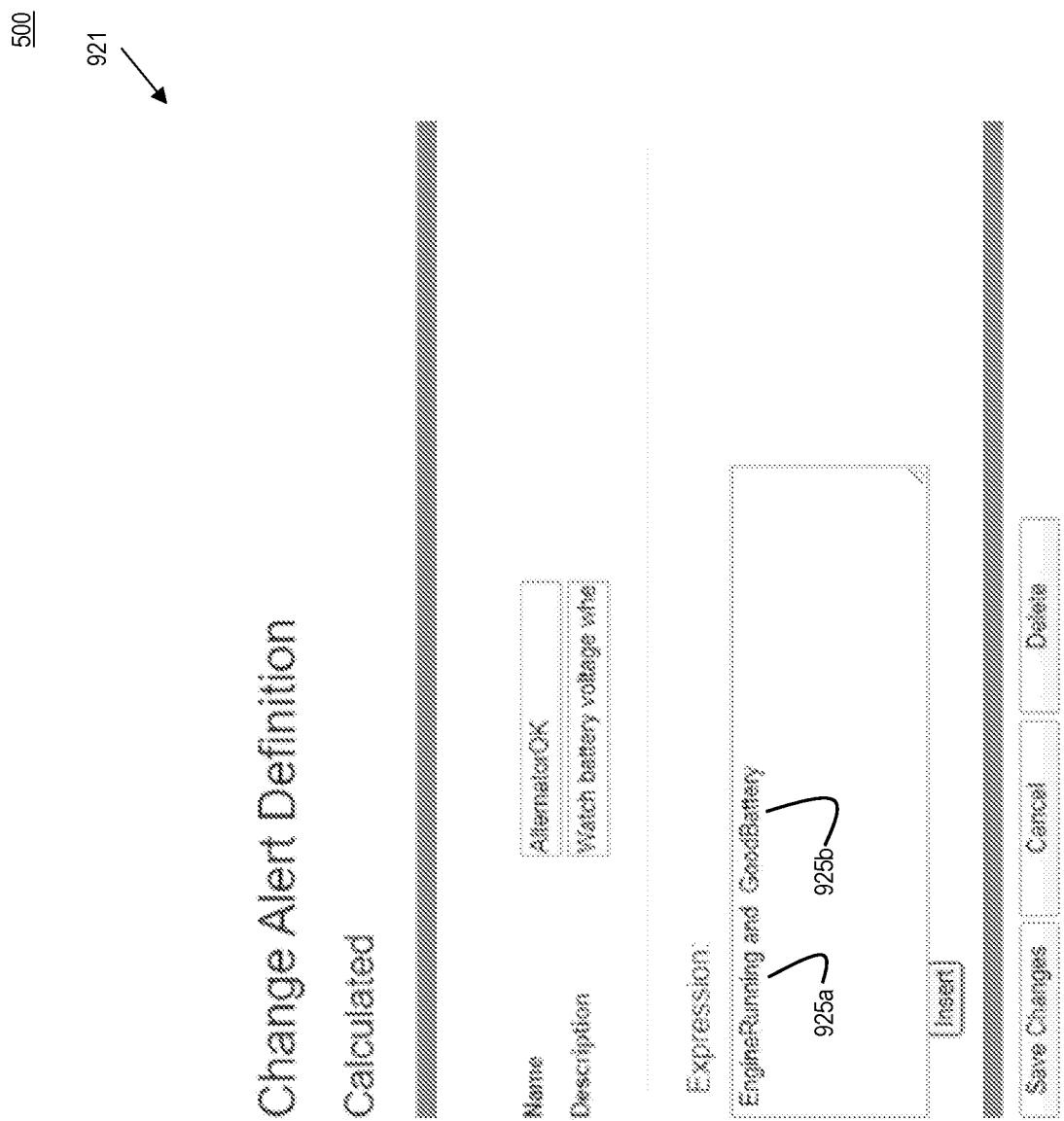
Figure 9E:
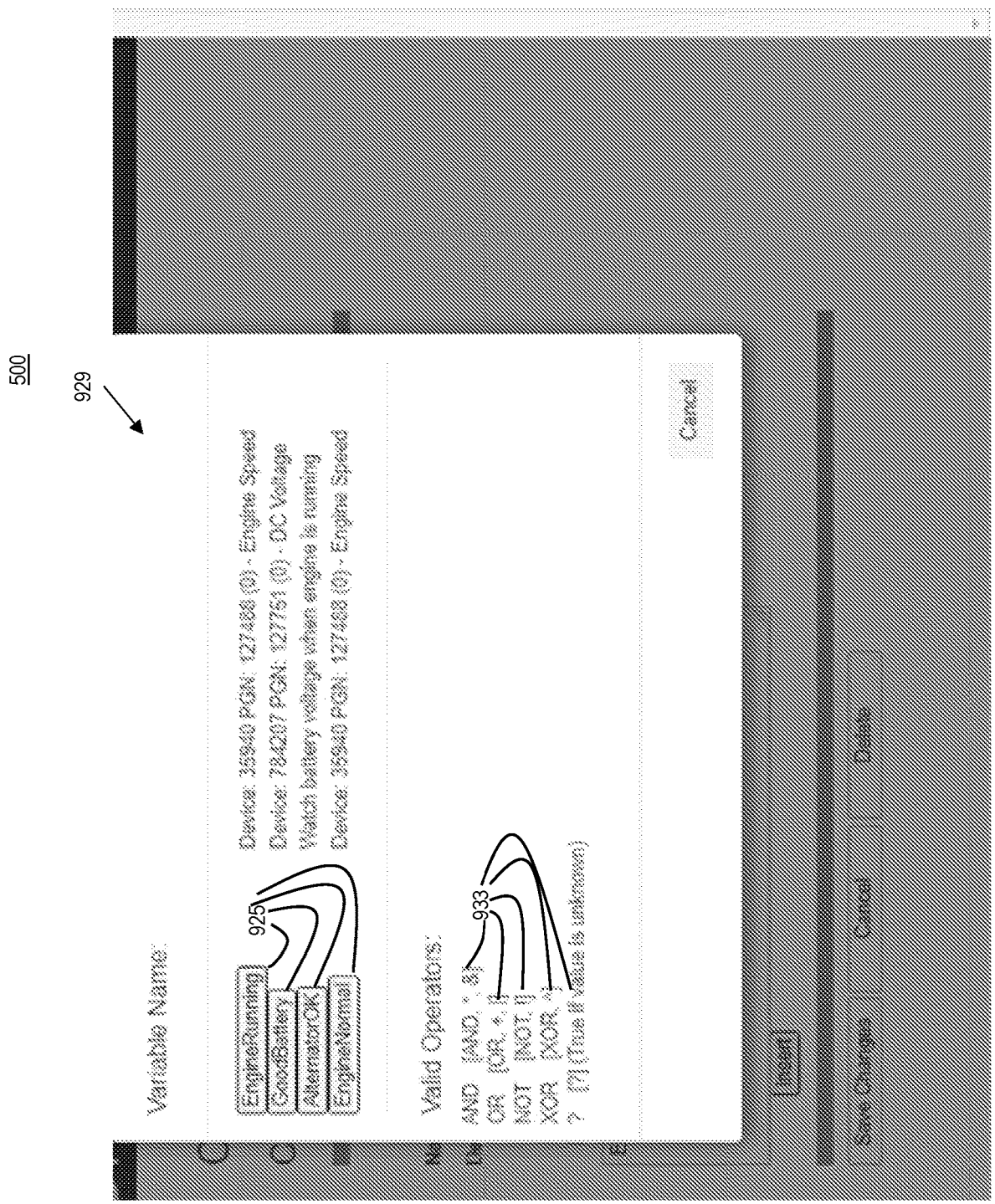

FIG. 9D shows, for a user interface 500, an example definition screen 921 for a calculated variable. Calculated variables may be defined based on an expression including values of other variables. In the example, a voltage measurement called GoodBattery 925*a* is combined with a previously defined EngineRunning variable 925*b* to indicate alternator status according to a threshold voltage level. FIG. 9E shows an example screen 929 for inserting variables 925 and logic operators 933 into an expression for a calculated variable. If any variable 925 used in the expression has a value of unknown, the calculated variable will also be unknown. An action may be defined according to a variable 925 having a value of unknown. For example, an alert may be desired when a device 205 is offline and not communicating.

Figure 9F:
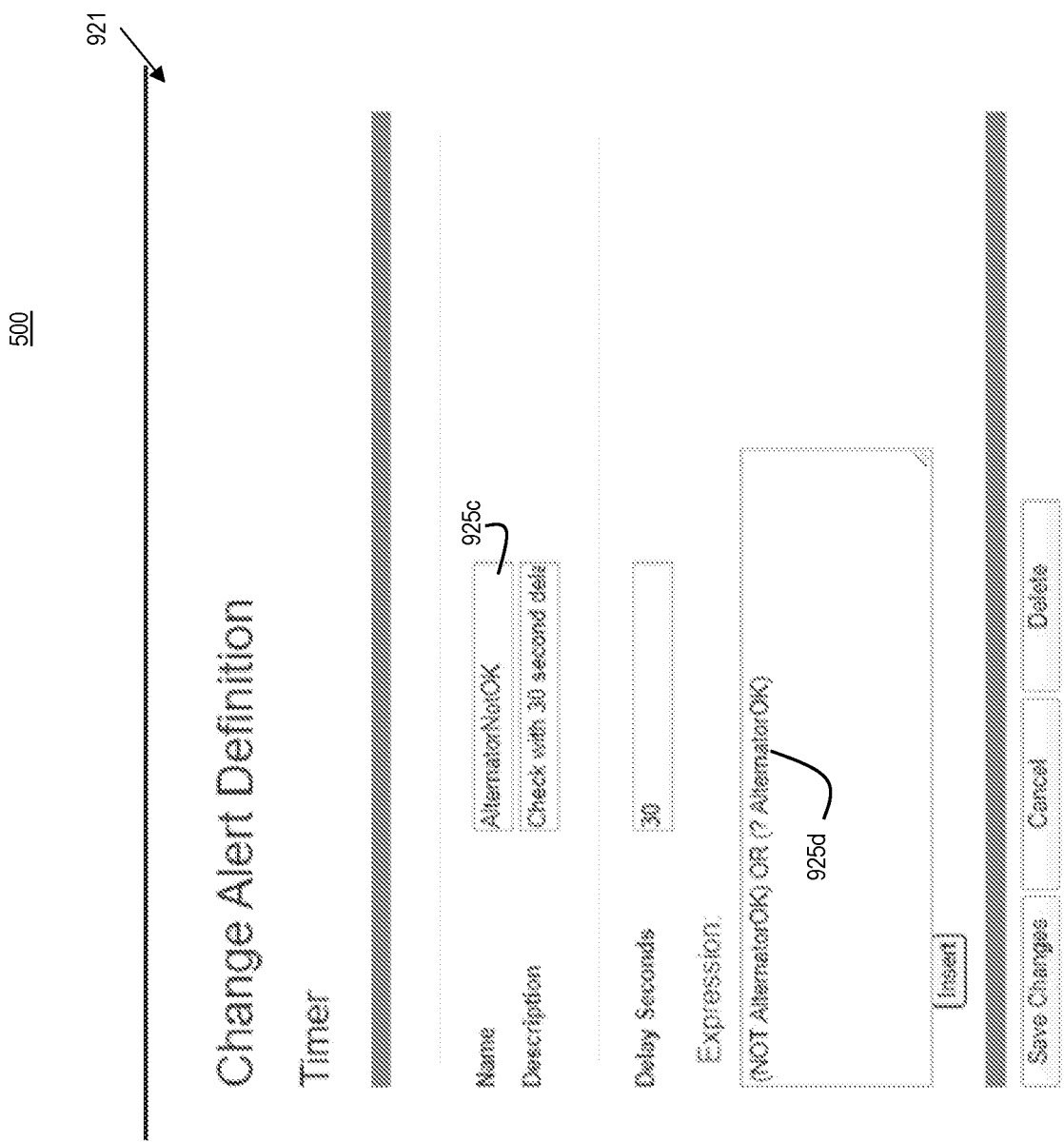

FIG. 9F shows, in an example definition screen 921 for a calculated variable, in a user interface 500, an example implementation of a timer variable named AlternatorNotOK 925*c* that will become true if another variable, AlternatorOK 925*d*, is false or unknown for a specified period of time. Embodiments such as the example may thus be configured to implement a delayed action. Just as for a calculated variable, an expression may be provided for evaluation to determine whether or not a given action will be triggered.

Figure 9G:
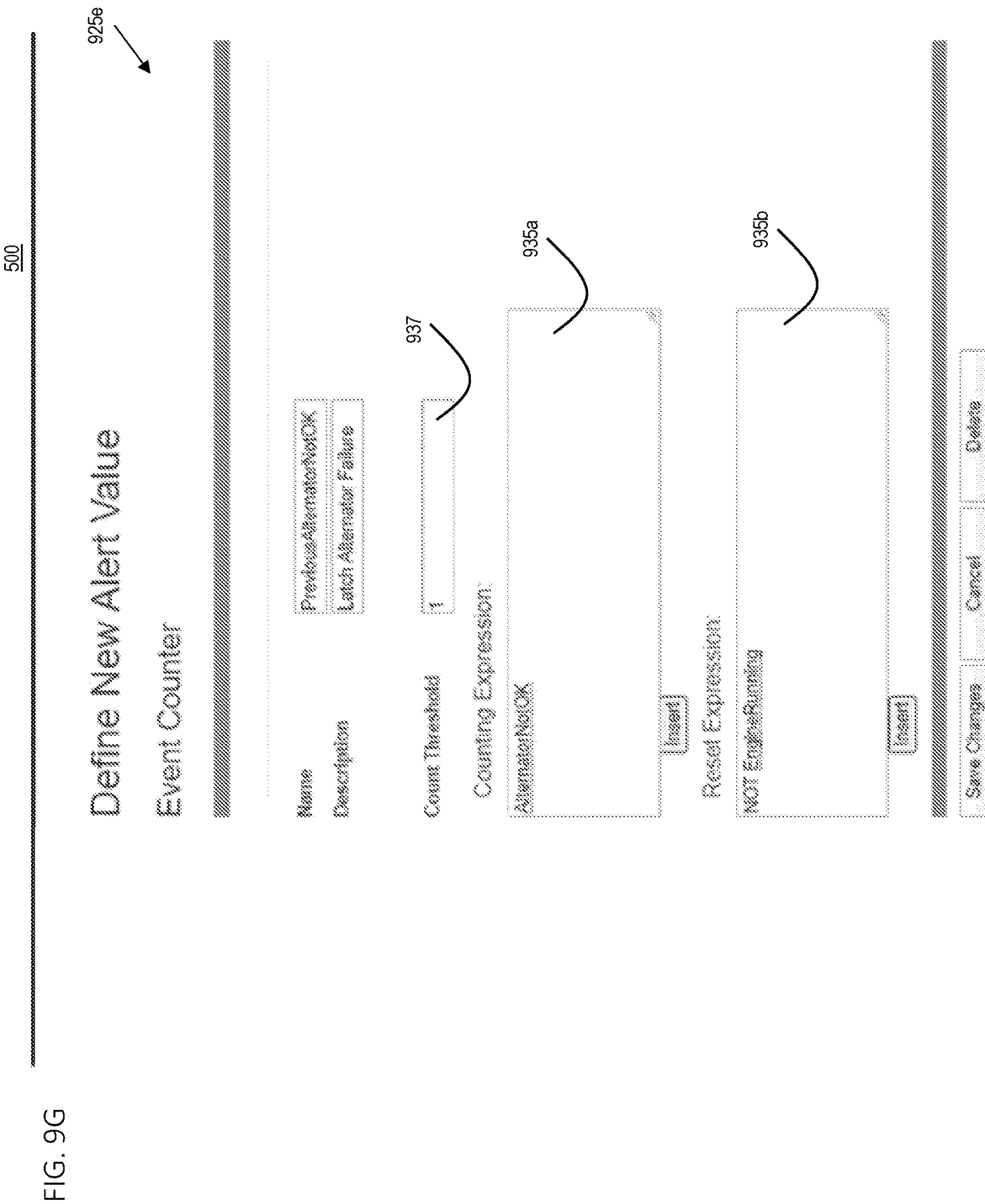

FIG. 9G shows an example implementation of an event counter variable 925*e* in a user interface 500. Event counters may be defined using an expression to increment 935*a* a counter 937 each time a value changes from false to true, and an expression to reset 935*b* the counter 937 to zero. In the example, a count threshold of 1 is set such that the first time that AlternatorNotOK 925*c* becomes true, the event counter variable 925*e* will also become true. In the example, a reset expression 935*b* becomes true when the engine is turned off, triggering the counter 937 to reset to zero, and the event counter variable 925*e* to become false. Counters 937 may thus be used to latch values of variables controlling alerts.

Figure 9H:
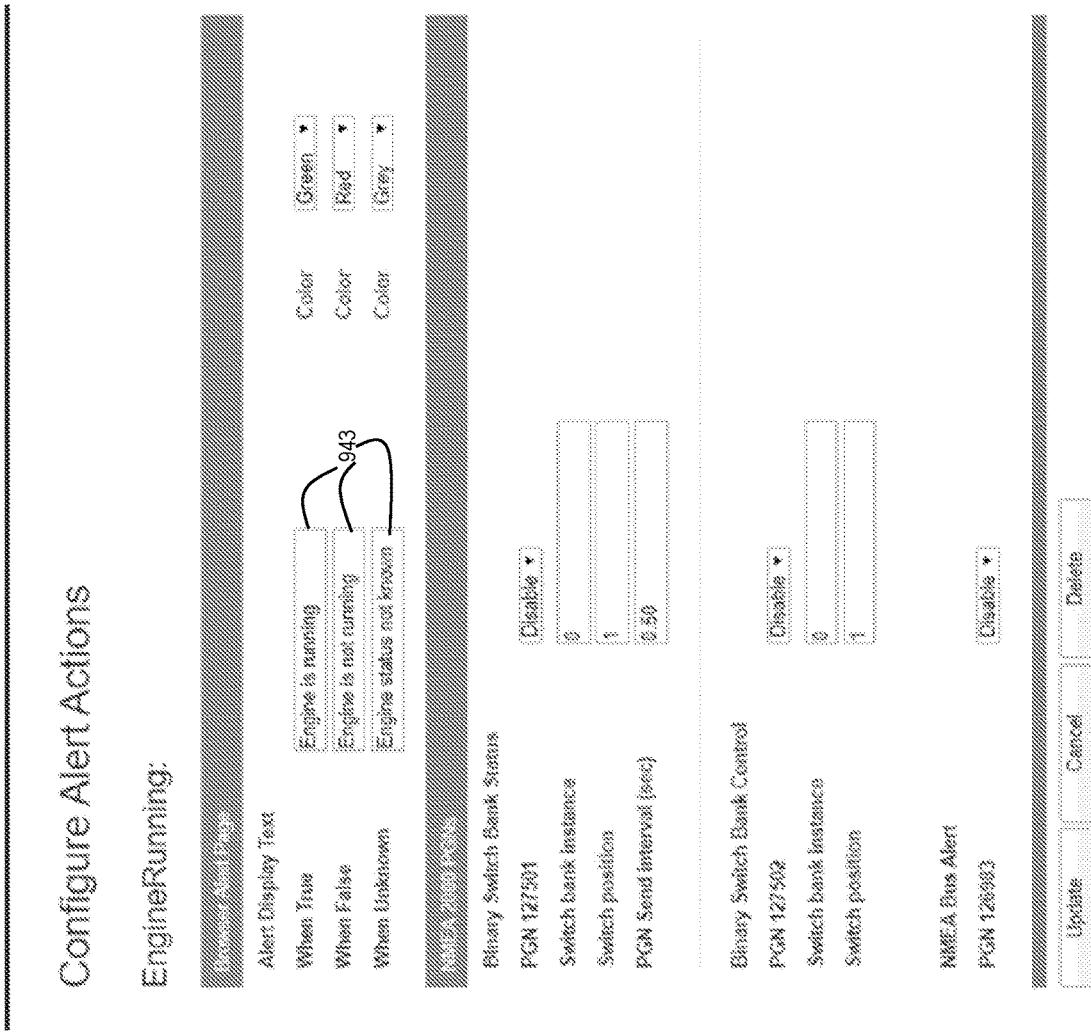
Figure 9I:
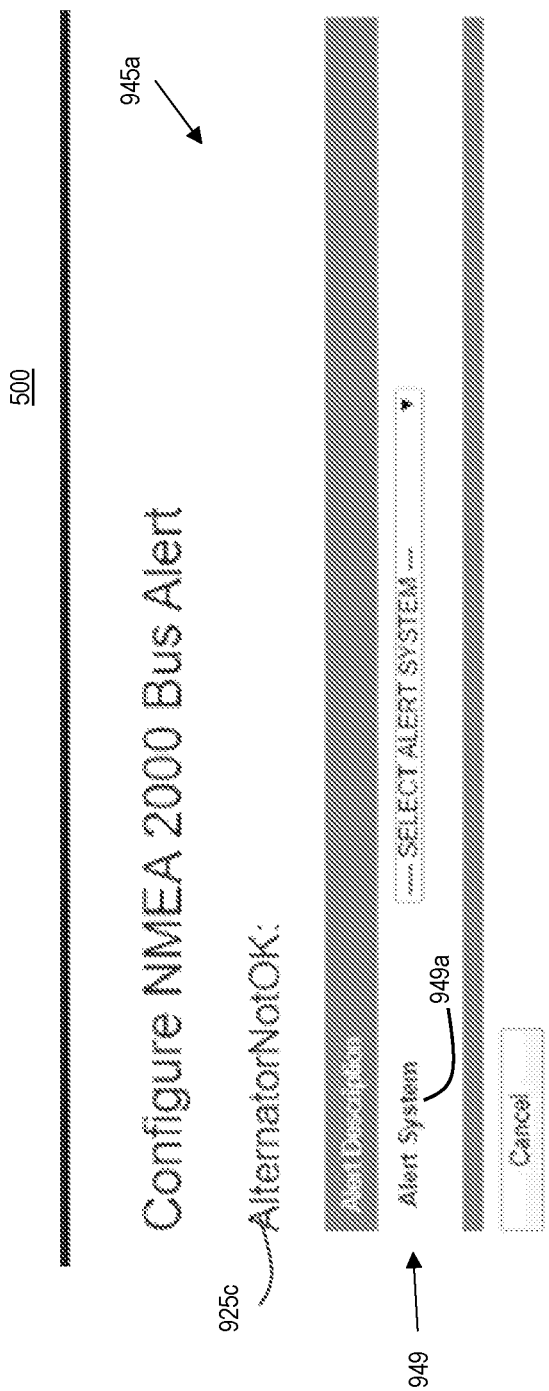
Figure 9J:
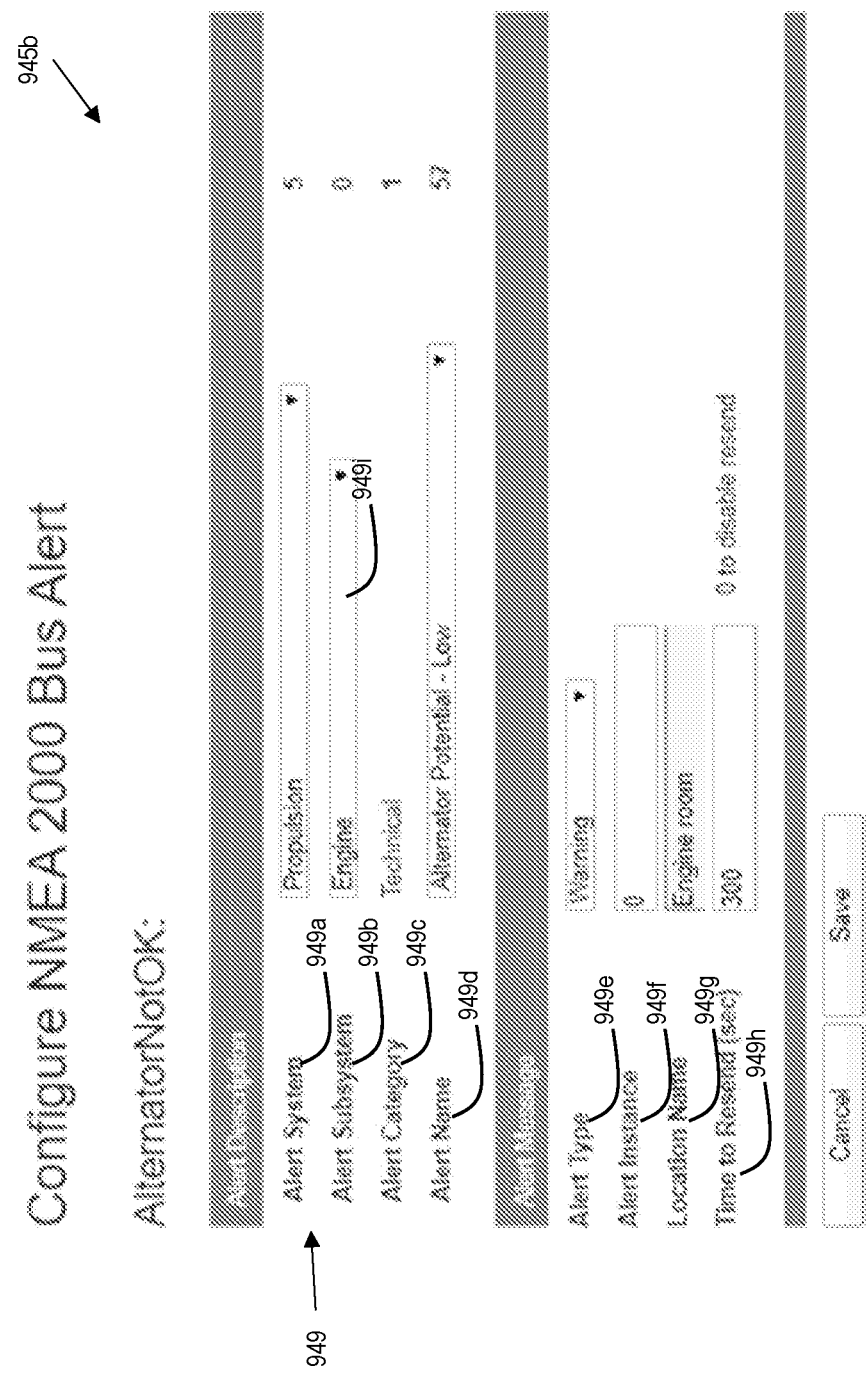
Figure 9K:
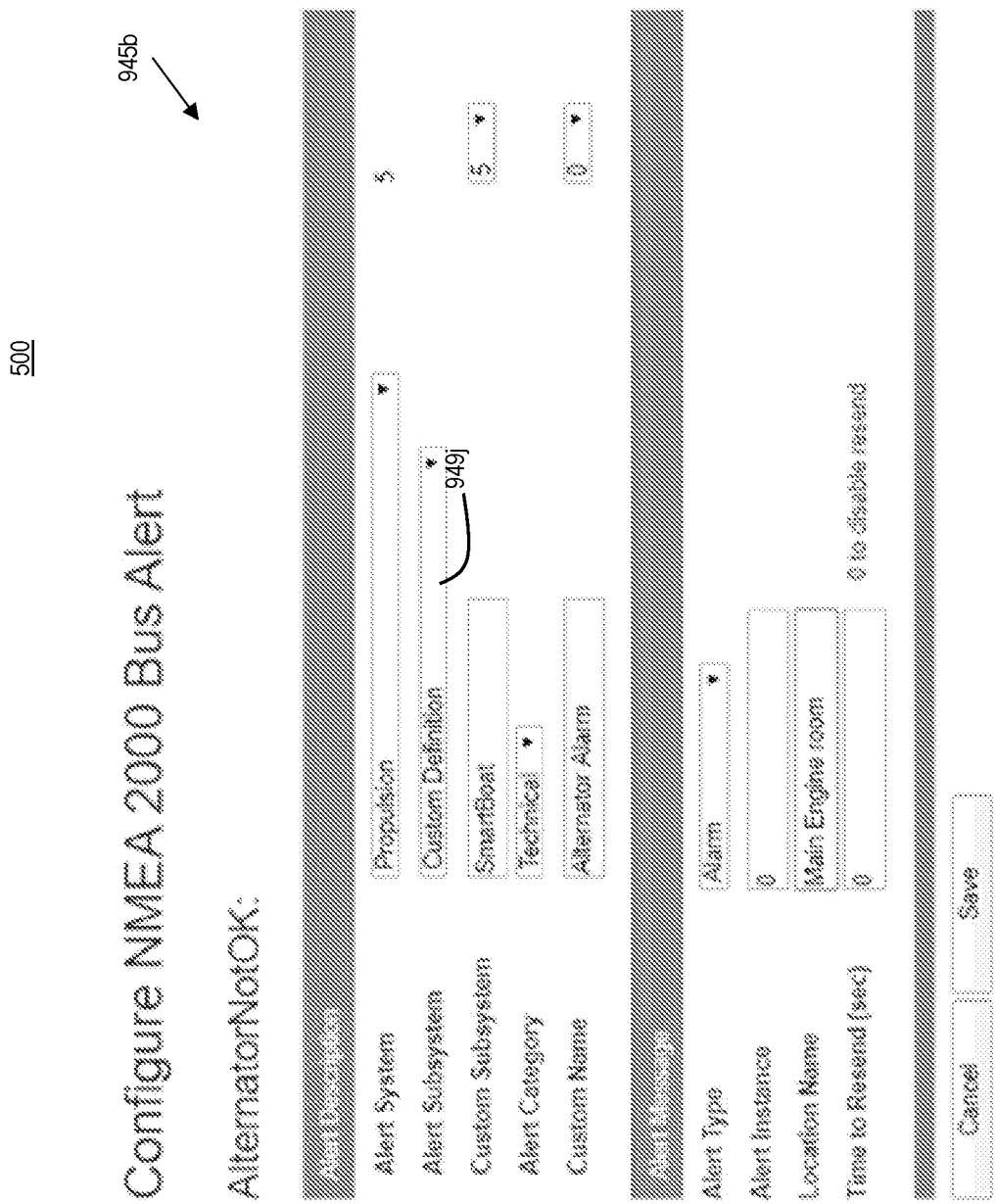

FIG. 9H shows, in a user interface 500, an example configuration screen 941 for an action to be automatically taken upon issuance of an alert. Such actions may include displaying the alert in a browser, reporting a binary status, and controlling a binary device. NMEA 2000 bus alert messages 943 may also be displayed on a multi-function display. FIG. 9I shows an example configuration screen 945*a* for NMEA 2000 bus alerts, as selected to configure bus alerts for the AlternatorNotOK variable 925*c* of FIG. 9F. Fields 949 used to identify an alert may include alert system 949*a*. FIG. 9J depicts an example configuration screen 945*b* with additional fields 949 including alert subsystem 949*b*, alert category 949*c*, and alert name or description 949*d*. Alert category 949*c* may be determined automatically based on alert system 949*a* and alert subsystem 949*b*. Additional configuration options may include alert type 949*e* or severity, alert instance 949*f*, location name 949*g* (e.g., "Engine Room"), and a time to resend 949*h* an alert if the alert variable remains true. Alerts may be configured by selecting a standard NMEA 2000 bus alert 949*i* as shown in FIG. 9J, or by configuring a custom alert 949*j* as shown in FIG. 9K.

Figure 10A:
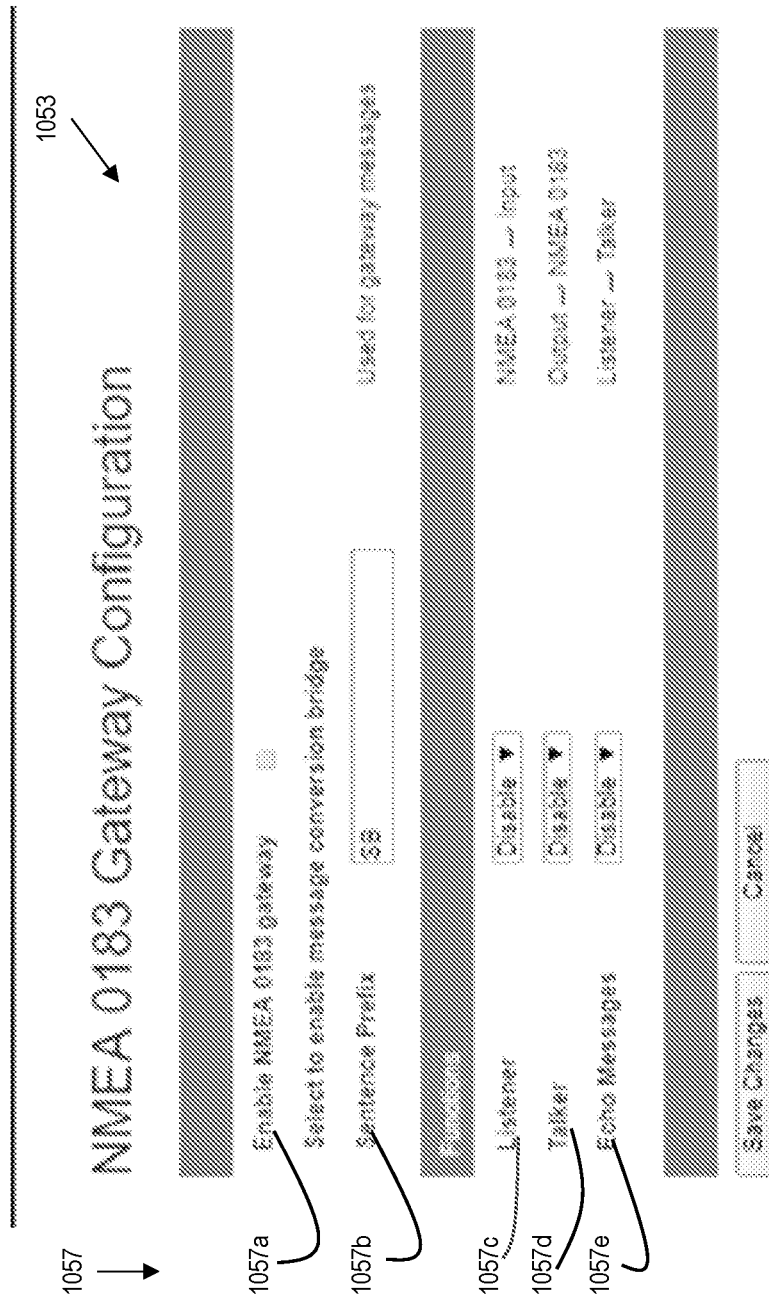

FIG. 10A shows, in a user interface 500, an example configuration screen 1053 for an NMEA 0183 gateway 128. Some embodiments of the module 100 include an isolated EIA-422 serial port for both input, as a listener, and output, as a talker. Some embodiments include a TCP/IP server for NMEA 0183 messages that supports listener and talker operation. Configuration options 1057 for the NMEA 0183 gateway may include an enable/disable control 1057*a* for conversion of supported NMEA 2000 PGNs to NMEA 0183 sentences and vice versa, a sentence prefix 1057*b* for NMEA 0183 sentences, and enable/disable controls for listener 1057*c* and talker 1057*d* functions to respectively send and process received sentences. NMEA 0183 configuration options may include an enable/disable control for echo messages 1057*e* such that, when enabled, sentences received by the listener function will be sent unchanged to the talker function.

Figure 10B:
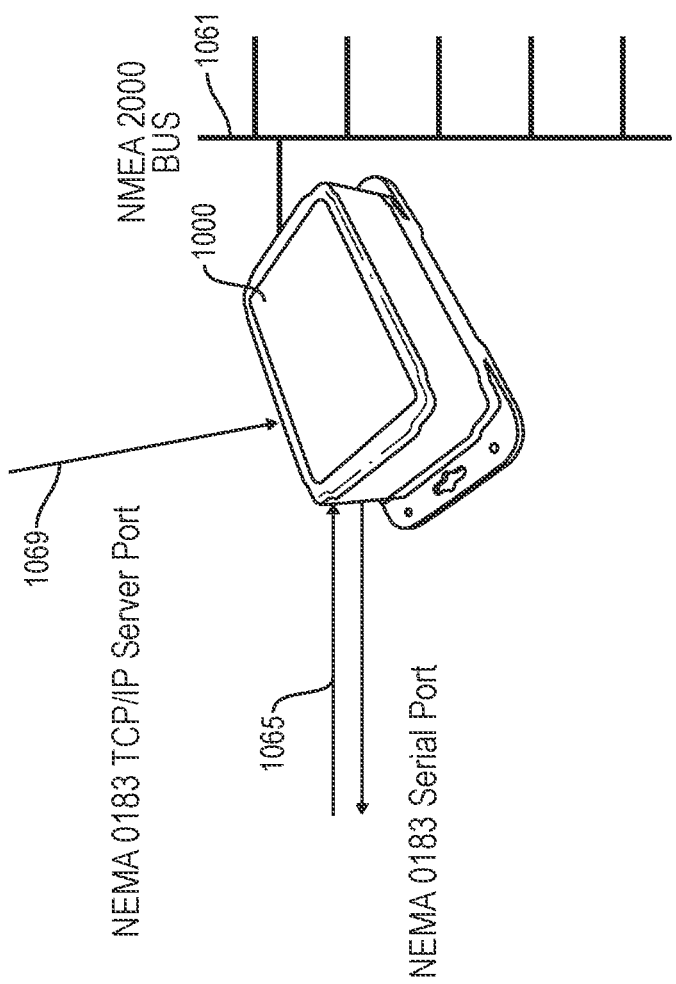

FIG. 10B shows an example embodiment of a networking module 100, 1000 with an active NMEA 2000 bus 1061, an NMEA 0183 serial connection 1065 enabled for both talker and listener support, an active NMEA 0183 TCP/IP server connection 1069 with incoming sentences, and echo messages enabled. In the example, the NMEA 0183 serial talker function is configured to multiplex the NMEA 0183 sentences received by the listener port, along with sentences generated by the NMEA 2000 conversion gateway, and messages received by the TCP/IP server.

Figure 10C:
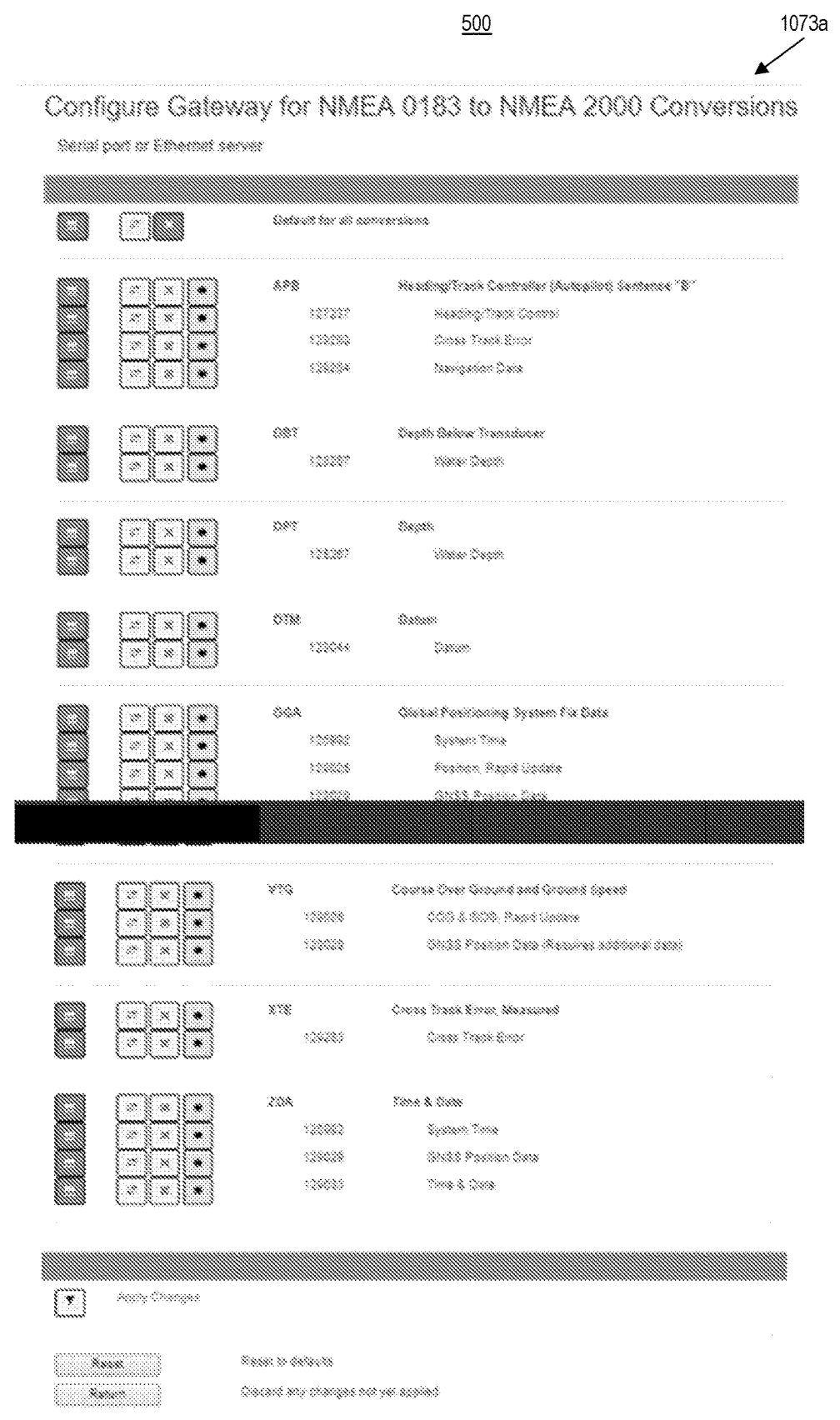
Figure 10D:
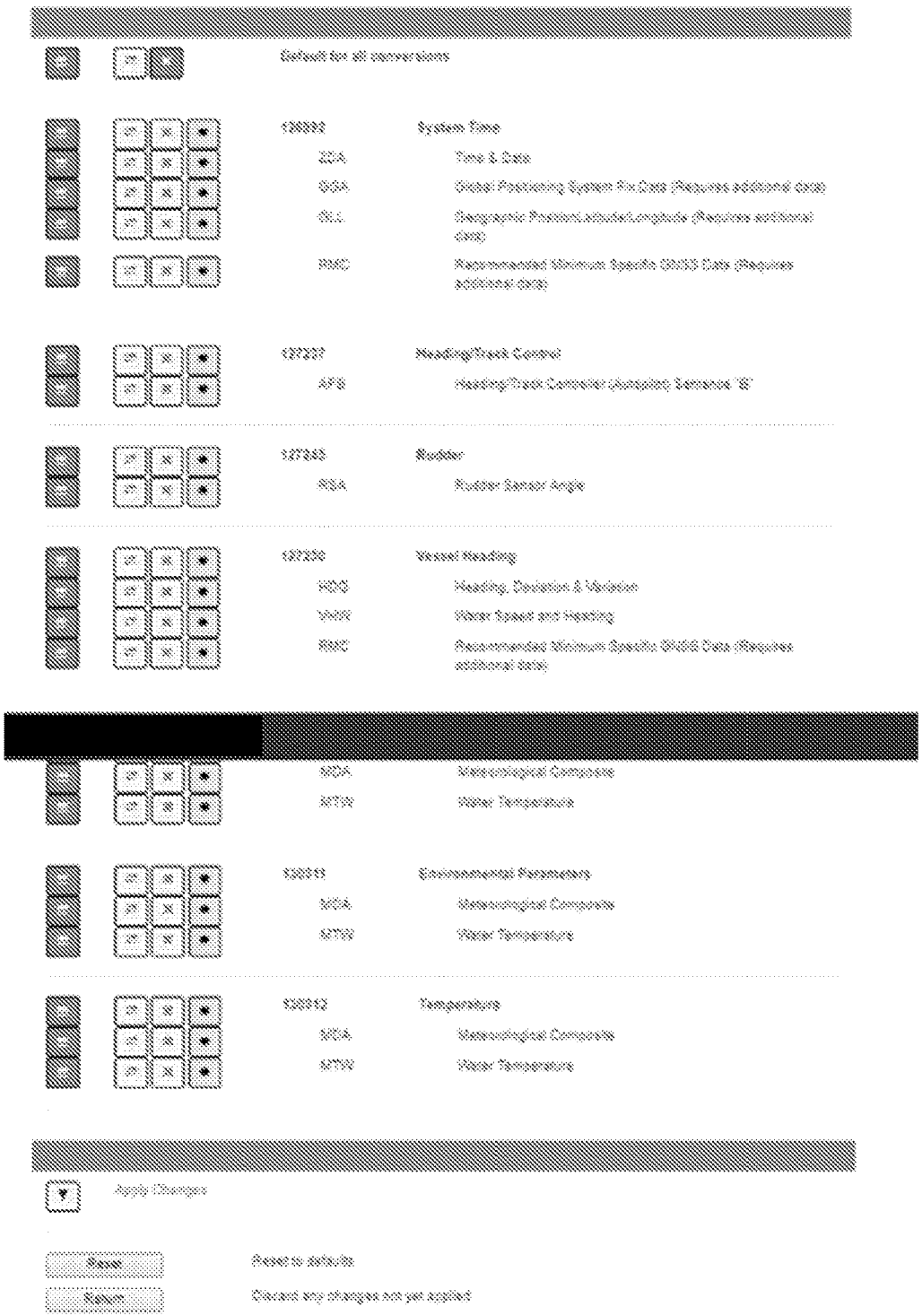

FIG. 10C shows, in a user interface 500, an example configuration screen 1073a for conversion of NMEA 1083 sentences to NMEA 2000 PGNs. FIG. 10D shows an example configuration screen 1073b for conversion of NMEA 2000 PGNs to NMEA 0183 sentences. Because there may not be one-to-one mapping between NMEA 2000 PGNs and NMEA 0183 sentences, the conversion gateway may maintain a database of values that have been received. When a message is created, data from such a database may be used to complete the message with information available to the networking module 100. FIG. 10E shows an example display 1077 of active NMEA 0183 sentences. In the example, each line represents a sentence received by the listener function or sent by the talker function. Sentences processed 1077a, 1077b by the NMEA 0183 gateway 128 are shown in blue in the interface 500; however, a difference in appearance between the sentences 1077a, 1077b and other sentences shown in the interface 500 is not readily discernable in the example display 1077 of FIG. 10E.

The NMEA 0183 gateway 128 may herein be referred to interchangeably as the "NMEA 2000 gateway 128," or as the "NMEA 2000 conversion gateway 128," being configured to convert messages from the NMEA 2000 protocol to the NMEA 0183 protocol, and vice versa. For example, in FIG. 10E, the NMEA 2000 conversion gateway 128 is referenced by name in text displayed by the example interface 1077.

Figure 11A:
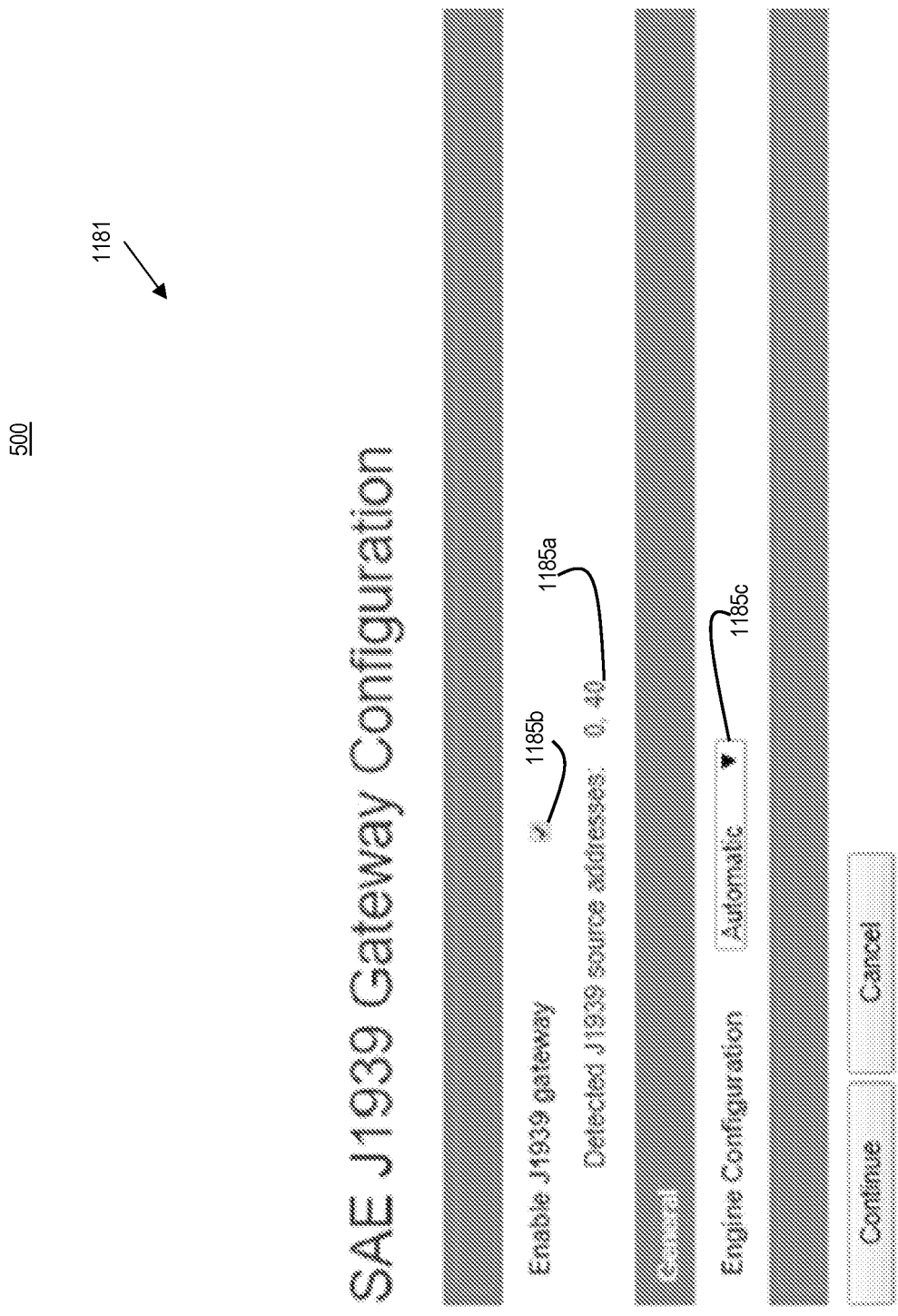
Figure 11B:
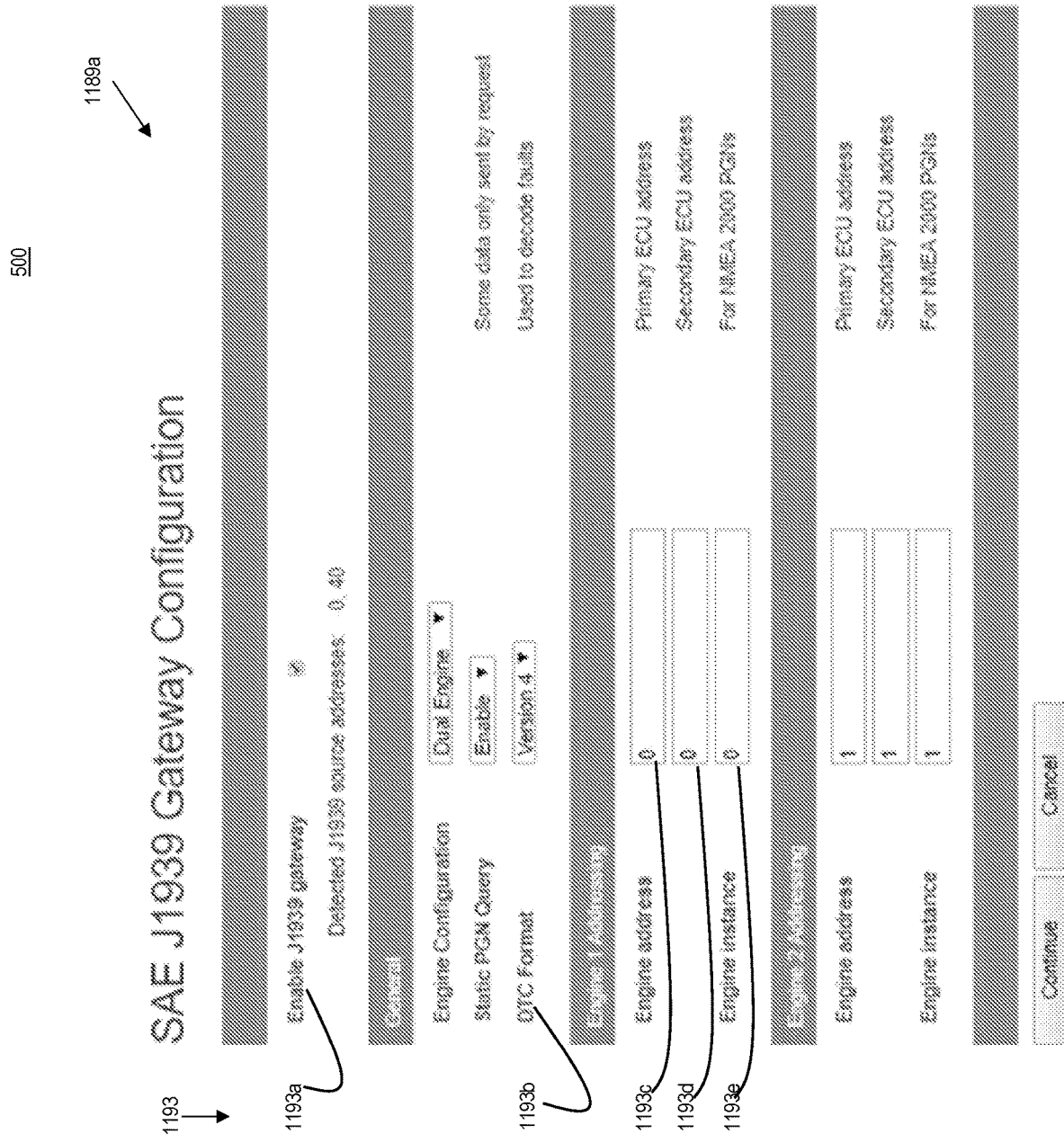
Figure 11C:
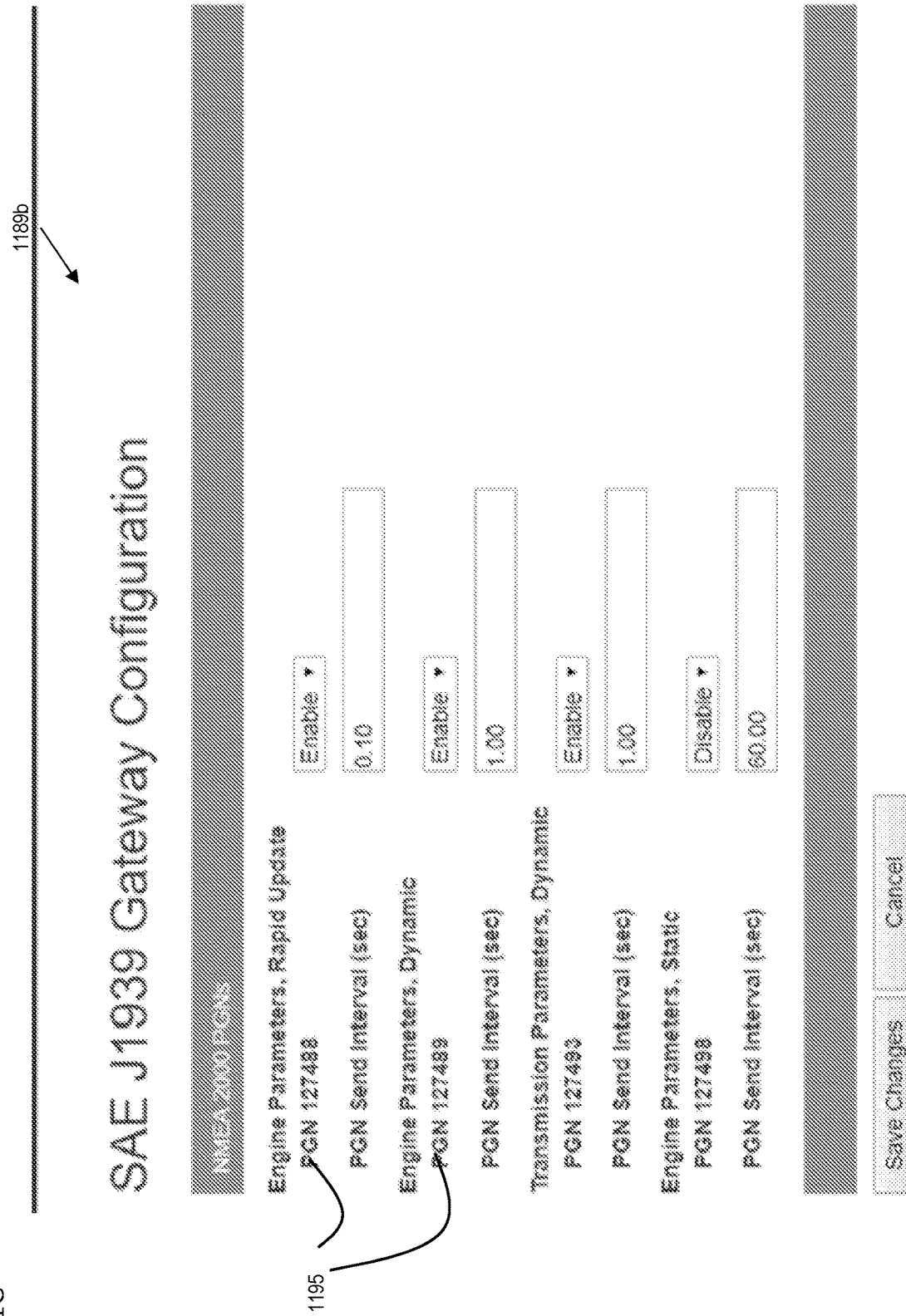

FIG. 11A shows, in a user interface 500, an example configuration screen 1181 for an SAE J1939 gateway 132. Addresses 1185a are shown in the example for SAE J1939 devices detected on the secondary bus 120 by the networking module 100. The SAE J1939 gateway function 132 may receive SAE J1939 PGN messages and create corresponding NMEA 2000 PGN messages containing an indication of engine status. The SAE J1939 gateway configuration screen 1181 may include options for enabling 1185b the SAE J1939 gateway 132 and specifying various engine configurations 1185c including single engine, dual engine, and automatic discovery and configuration of single or multiple engine and transmission sources. A second networking module may be used to interface with a given engine of a dual engine setup if the given engine is on a separate bus from the local networking module 100. FIG. 11B shows an example configuration page 1189a that may be used to manually configure an SAE J1939 gateway 132 for a dual engine setup. Configuration options 1193 shown in the example of FIG. 11B include an enable/disable control 1193a for the networking module to request static PGN information from connected network devices, a version selector 1193b for diagnostic trouble codes (DTCs), and at least two engine address fields 1193c,d to configure the networking module to communicate with, for example, ECUs for an engine and a transmission or for two engines of a system such as a watercraft vessel. Configuration options 1193 in the example of FIG. 11B also include engine instance 1193e, which may be used to distinguish and accordingly direct generated NMEA 2000 PGN messages to an ECU of a given engine of a plurality of engines. FIG. 11C shows, in an example configuration page 1189b, example NMEA 2000 PGNs 1195 generated by the SAE J1939 gateway 132. FIG. 11D shows an example engine and transmission data viewing screen 1197, which may be used when the SAE J1939 gateway function 132 is active. FIG. 11E shows another example engine and transmission data viewing screen 1199, after a DTC has been detected by the networking module 100.

Figure 12A:
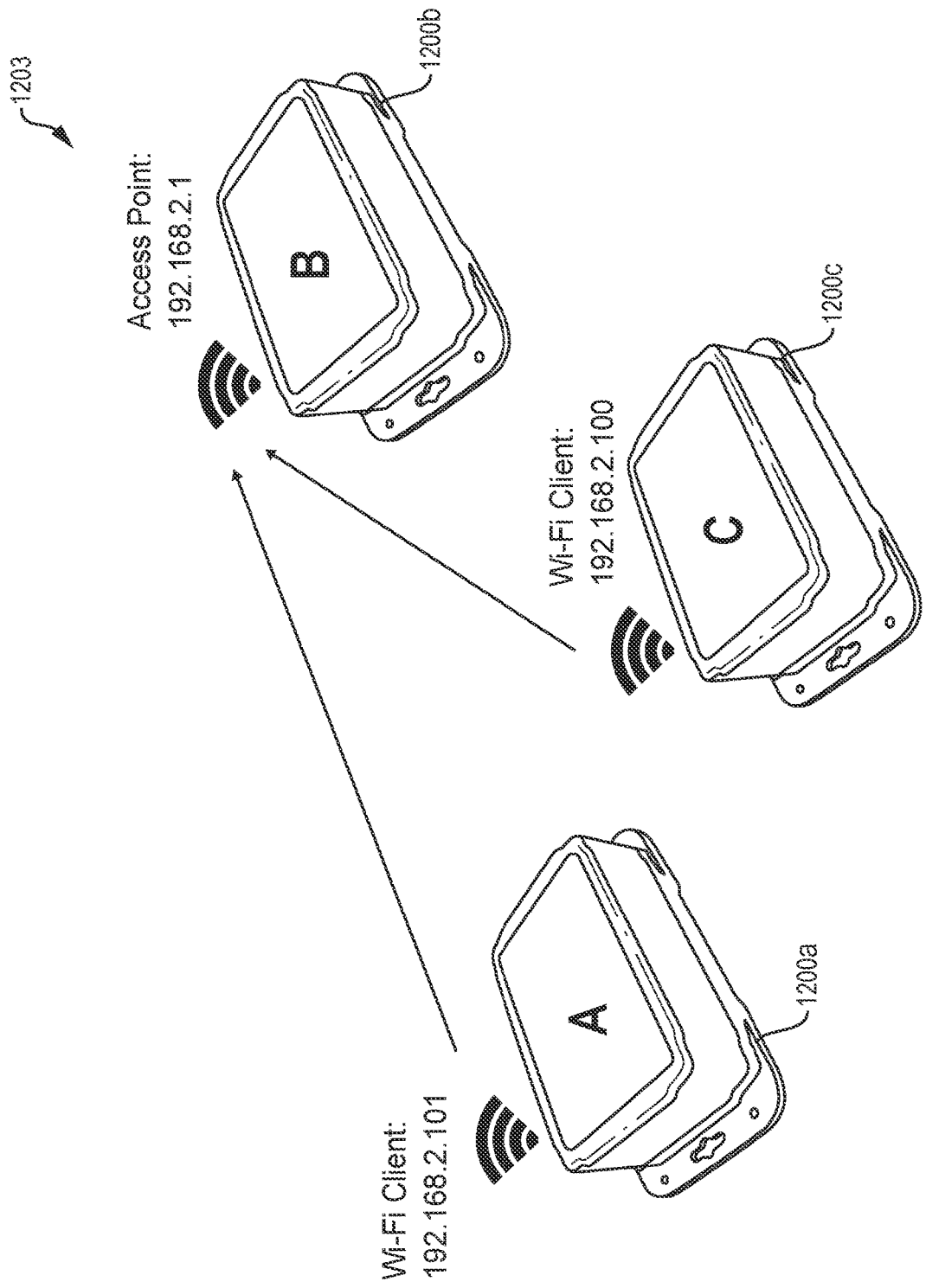
Figure 12B:
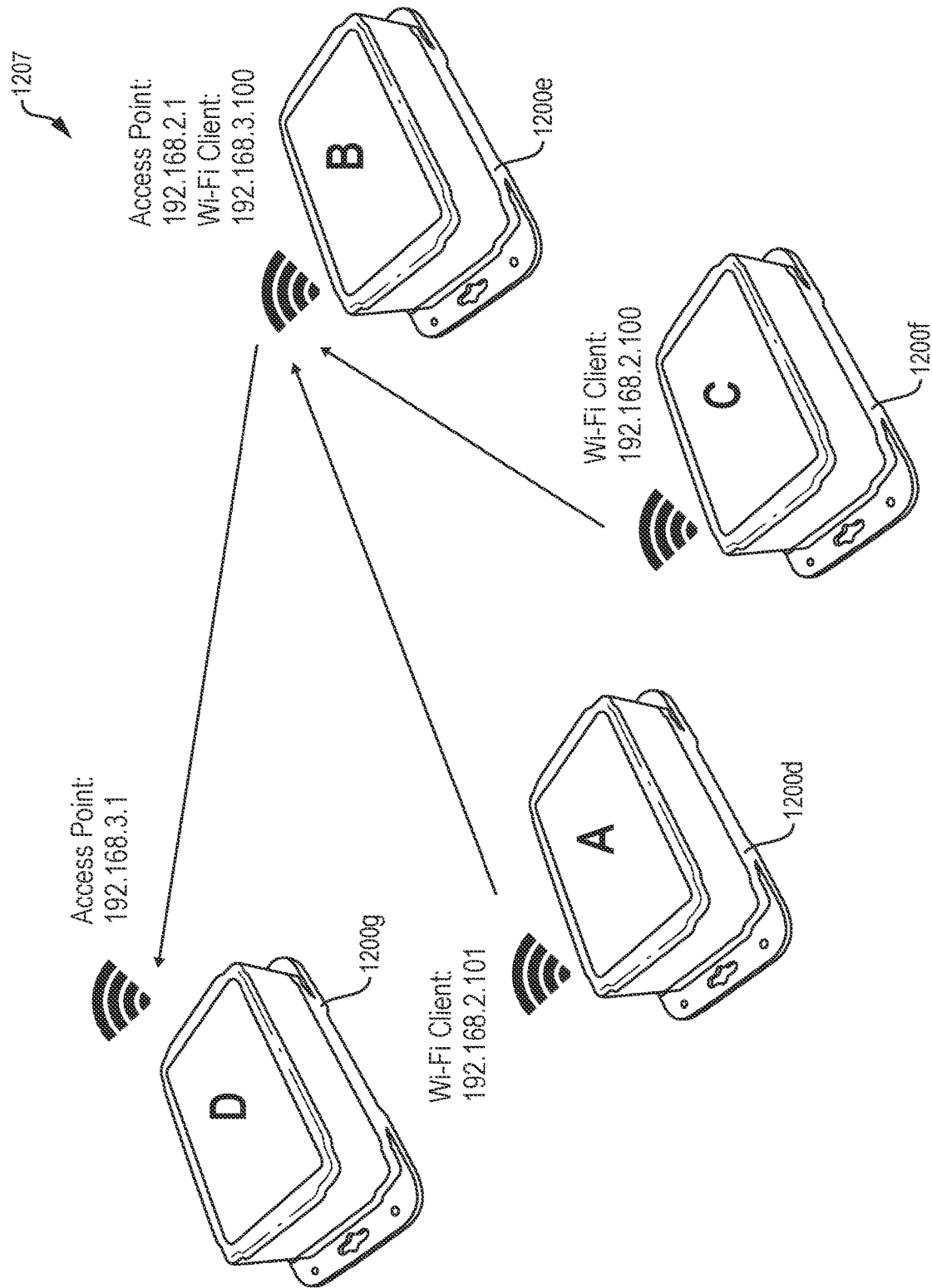
Figure 12C:
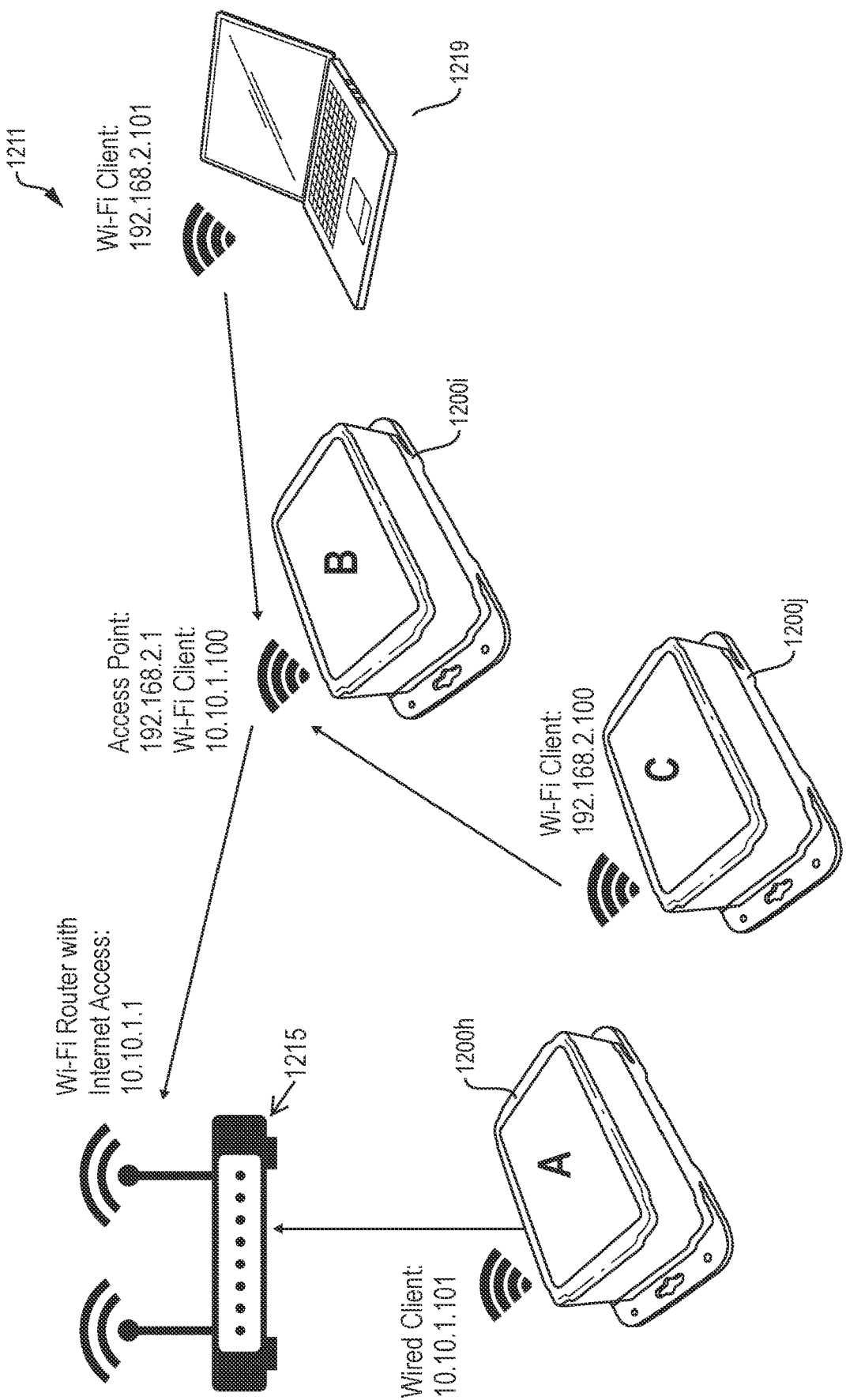

FIG. 12A shows an example configuration 1203 with three networking modules 1200a-c that are connected wirelessly, with one module 1200b acting as an access point, and the other two modules 1200a,c connecting to the access point module 1200b as clients. FIG. 12B shows another example configuration 1207 with four networking modules 1200d-g that are connected wirelessly, with two modules 1200e,g acting as access points. FIG. 12C shows still another example configuration 1211, including a WiFi router 1215, a wired client 1200h connected thereto, and a PC-based WiFi client 1219 and additional WiFi client 1200j connected to the networking module 12001 serving as an access point, which access point 12001 is also configured as a WiFi client of the router 1215.

Figure 12D:
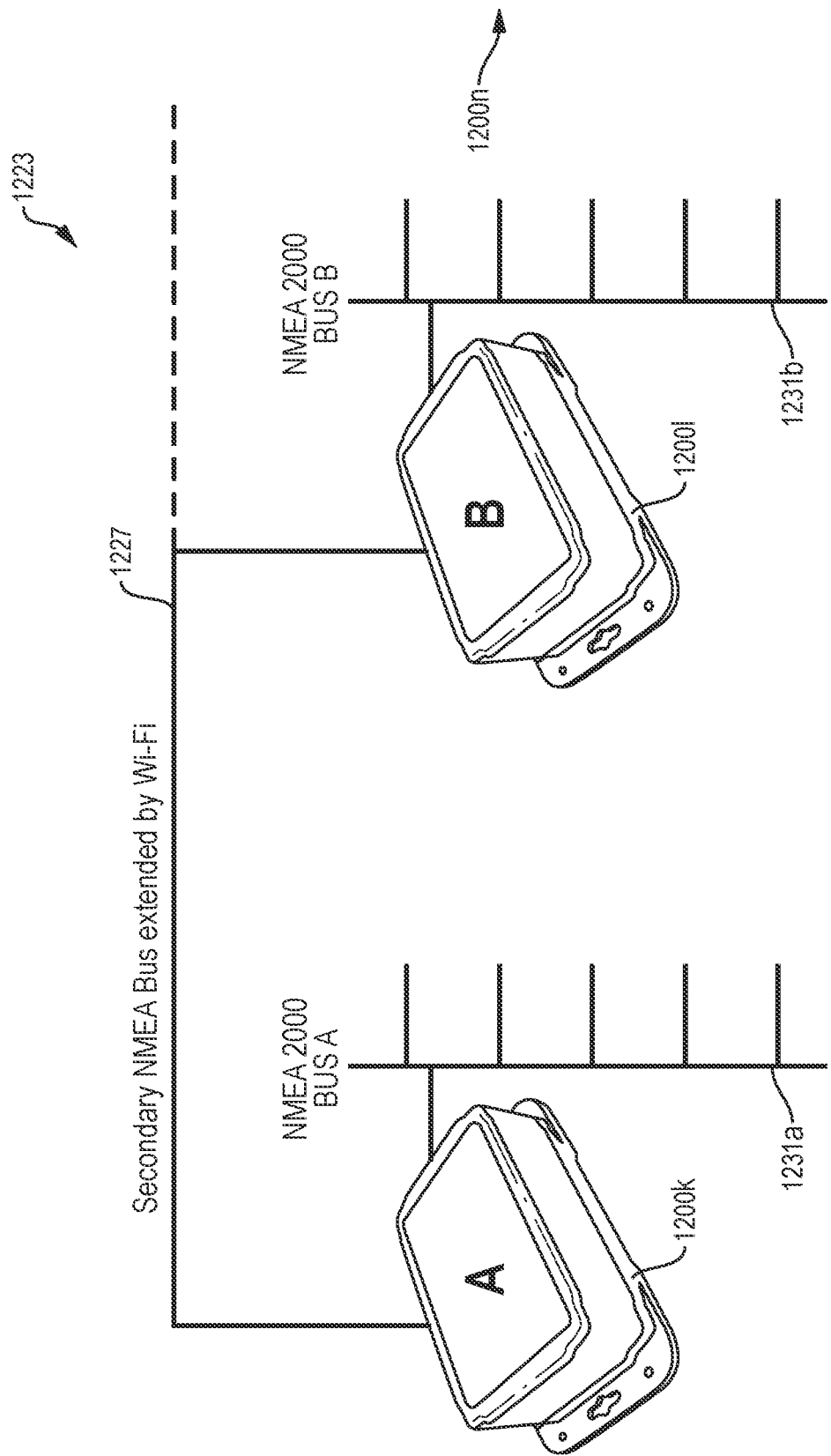

FIG. 12D shows an example configuration 1223 of an extended secondary NMEA 2000 bus 1227 implemented wirelessly. Secondary buses 1231a,b of two networking modules 1200k,l on a common subnet may be connected wirelessly or via Ethernet. Such a wireless connection methodology may be referred to as network extension 192. When two modules 1200k,l are linked using network extension 192, NMEA 2000 PGN messages may be available on secondary bus 1231a,b connections of all connected network devices. Network extension 192 may function between two modules 1200k,l that are configured to communicate, regardless of which module or modules are configured as a client. Using network extension 192, networking modules 1200k,l may be configured in a daisy chain, resulting in a merged secondary bus 1231 that functions as a single secondary bus. Such a daisy chain configuration may include more than two networking modules 1200n. An NMEA 2000 message filtering function 112 of a local networking module, as described hereinabove, may then be configured to control which PGNs are bridged to the primary NMEA 2000 bus 1229 of each networking module 1200n to which the network is extended, and which PGNs from the primary bus 1229 of the local networking module 1200k,l to bridge to the modules 12001,k,n to which the network is extended.

Figure 13:
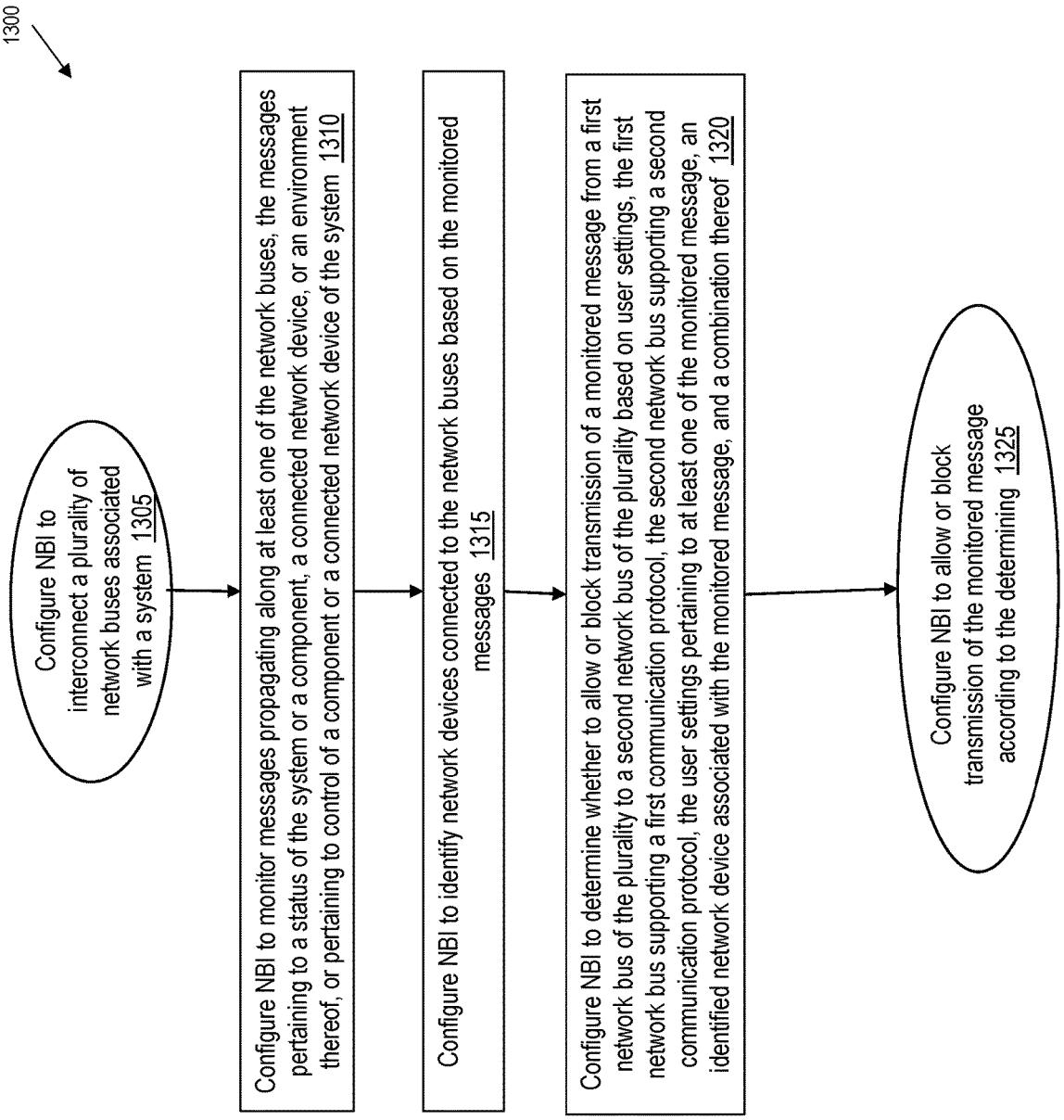
FIG. 13 is a flow diagram depicting an example embodiment of a method of managing electronic communication among various devices.

FIG. 13 shows a flow diagram of an embodiment of a method 1300 of managing communication among instrumentation and control devices associated with a system. According to the embodiment, the method 1300 includes configuring an NBI to interconnect 1305 a plurality of network buses associated with the system. The method of FIG. 13 includes further configuring the NBI to monitor 1310 messages propagating along at least one of the network buses. The messages may pertain to a status of the system of a component, a connected network device, or an environment thereof, or may pertain to control of a component or a connected network device of the system. The method of FIG. 13 includes further configuring the NBI to identify 1315 network devices connected to the network buses based on the monitored messages. The method of FIG. 13 includes further configuring the NBI to determine 1320 whether to allow or block transmission of a monitored message from a first network bus of the plurality to a second network bus of the plurality based on user settings. The first network bus may support a first network protocol, and the second network bus may support a second network protocol. The user settings may pertain to at least one of the monitored message, an identified network device associated with the monitored message, and a combination thereof. The method of FIG. 13 includes further configuring the NBI to allow or block 1325 transmission of the monitored message according to the determining.

Figure 14A:
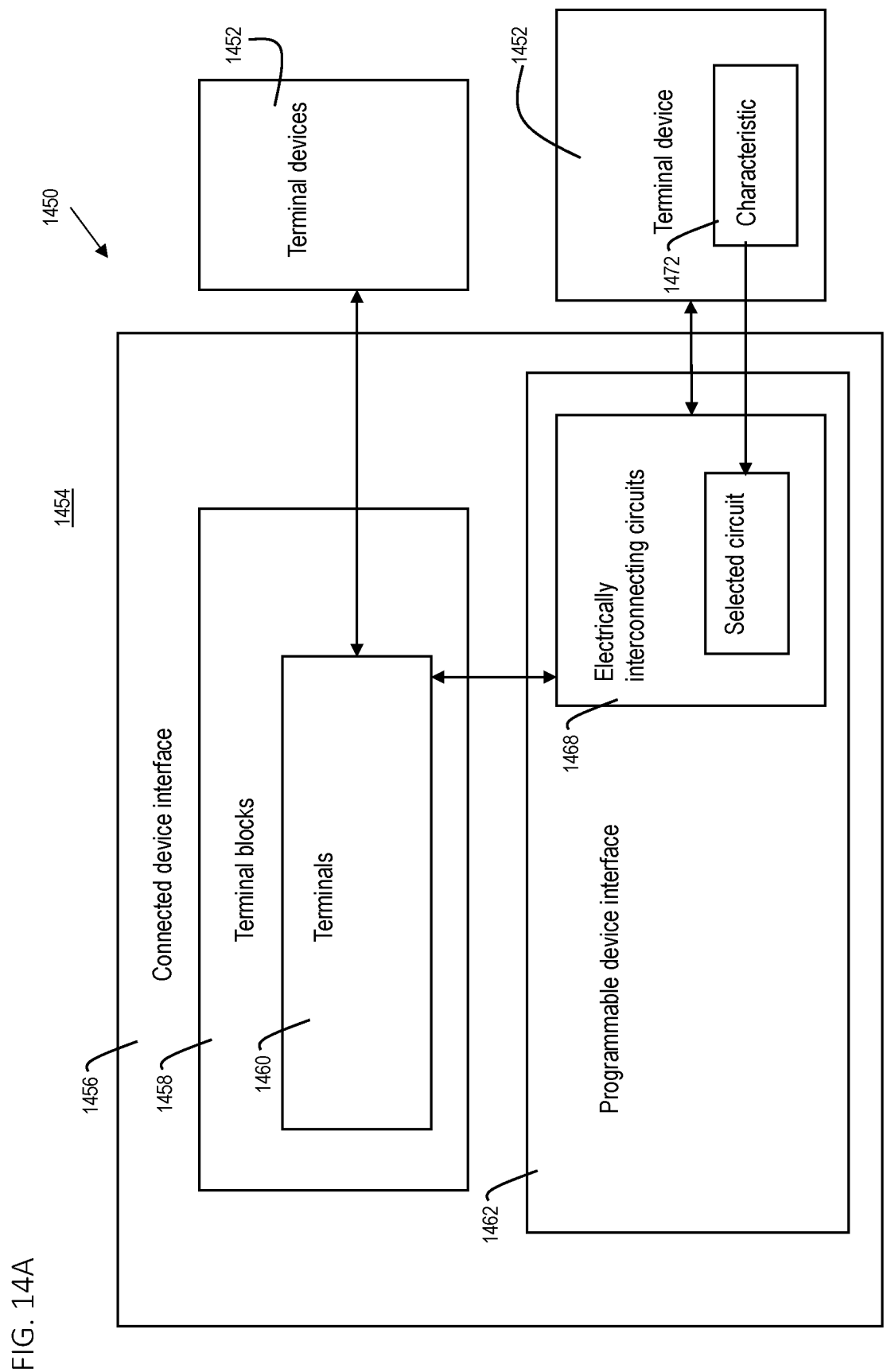
FIG. 14A is a schematic block diagram depicting an example embodiment of a switching interface for interconnecting various devices.

FIG. 14A is a schematic block diagram showing an example embodiment of a switching interface 1450 for interconnecting one or more terminal devices 1452 to a common device 1454. According to the embodiment, the switching interface 1450 includes a CDI 1456 including terminal blocks 1458. The terminal blocks 1458 include terminals 1460 that may be configured to electrically connect to one or more terminal devices 1452. The CDI 1456 of the embodiment 1450 further includes a PDI 1462 configured to connect a selected electrically interconnecting circuit 1464, of a plurality of electrically interconnecting circuits 1468, to a terminal 1460 of the terminal blocks 1458. The interconnecting circuit 1464 may be selected based on a characteristic 1472 of a terminal device 1452 being connected to the terminal 1460 of the CDI 1456.

Figure 14B:
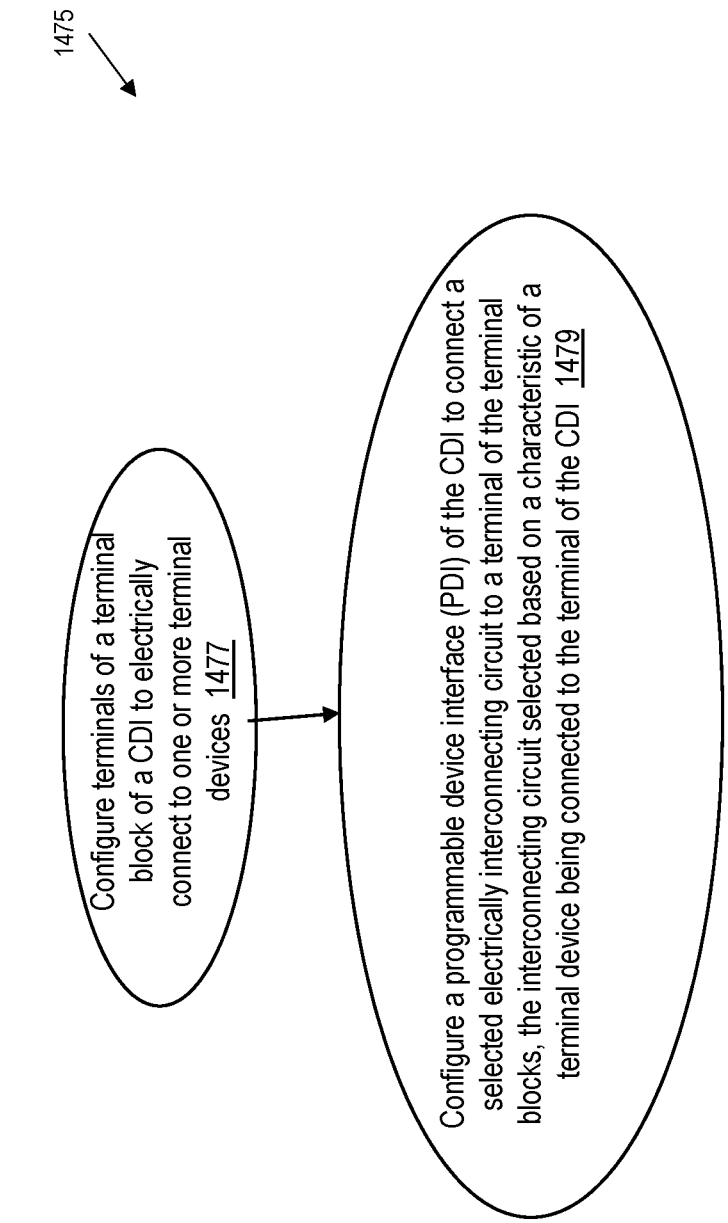
FIG. 14B is a flow diagram depicting an example embodiment of a method of interconnecting one or more terminal devices to a common device.

FIG. 14B is a flow diagram showing an example embodiment of a method 1475 of interconnecting one or more terminal devices to a common device. According to the embodiment, the method 1475 may include configuring terminals of a terminal block of a CDI to electrically connect 1477 to one or more terminal devices. The method in the embodiment further includes configuring a PDI of the CDI to connect 1479 a selected electrically interconnecting circuit to a terminal of the terminal blocks. The interconnecting circuit may be selected based on a characteristic of a terminal device being connected to the terminal of the CDI.

Figure 15:
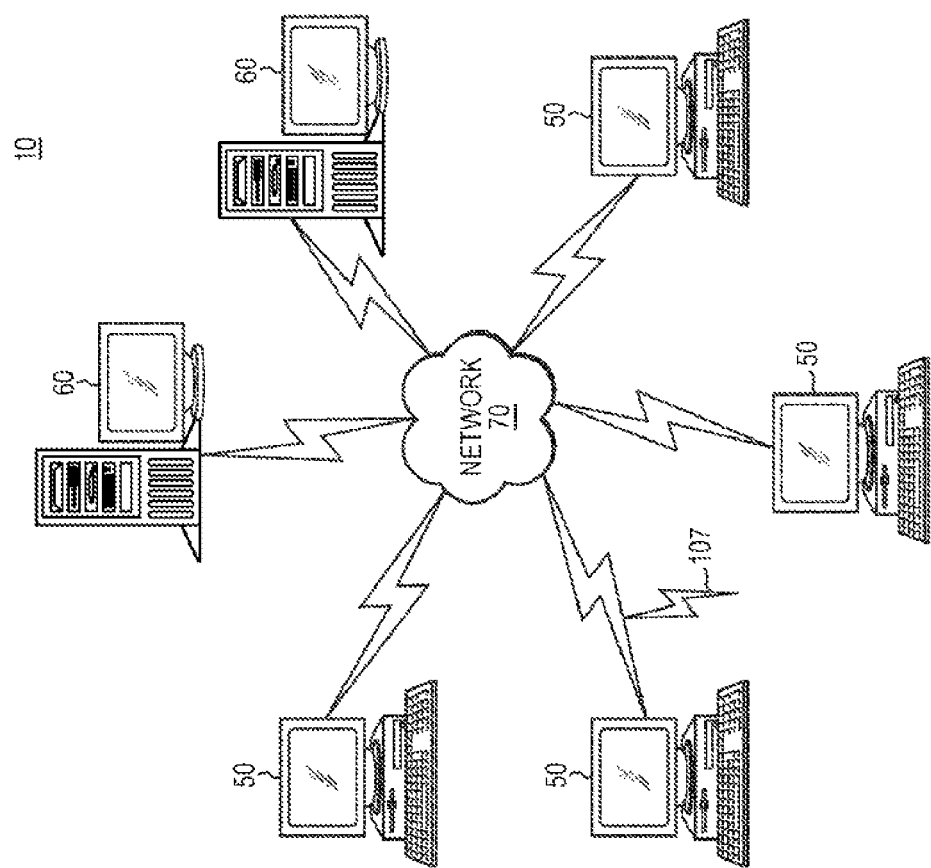
FIG. 15 illustrates an example computer network, over which, embodiments of the claimed systems and methods may operate.

FIG. 15 illustrates a computer network (or a computer system) 10 or similar digital processing environment, according to some embodiments of the present disclosure. Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, Near-Field Communication (NFC), etc.) to communicate with one another. Other electronic device/computer network architectures are suitable.

Client computers/devices 50 may be configured with a computing module (located at one or more of elements 50, 60, and/or 70). In some embodiments, a user may access the computing module executing on the server computers 60 from a user device, such a mobile device, a personal computer, or any computing device known to one skilled in the art without limitation. According to some embodiments, the client devices 50 and server computers 60 may be distributed across a computing module.

Server computers 60 may be configured as the computing modules which communicate with client devices 50 for providing access to (and/or accessing) databases that include measured data of a system, such as data pertaining to a status of a watercraft vessel or a component, a connected network device, or an environment thereof. The server computers 60 may not be separate server computers but part of cloud network 70. In some embodiments, the server computer (e.g., computing module) may enable management of communication among instrumentation and control devices associated with a system by allowing access to data located on the client 50, server 60, or network 70 (e.g., global computer network). The client (configuration module) 50 may communicate data including NMEA 2000 PGN messages, back to and/or from the server (computing module) 60. In some embodiments, the client 50 may include client applications or components executing on the client 50 for managing communication among instrumentation and control devices associated with a system, and the client 50 may communicate corresponding data to the server (e.g., computing module) 60.

Some embodiments of the computer system 10 may include a module for managing communication among instrumentation and control devices associated with a system. The computer system 10 may include a plurality of processors 84. The computer system 10 may also include a memory 90. The memory 90 may include: (i) computer code instructions stored thereon; and/or (ii) data including data pertaining to a status of a watercraft vessel or a component, a connected network device, or an environment thereof. The memory 90 may be operatively coupled to the plurality of processors 84 such that, when executed by the plurality of processors 84, the computer code instructions may cause the computer system 10 to implement a computing module (the computing module being located on, in, or implemented by any of elements 50, 60, 70 of FIG. 15 or elements 82, 84, 86, 90, 92, 94, 95 of FIG. 16) configured to perform one or more functions.

Figure 16:
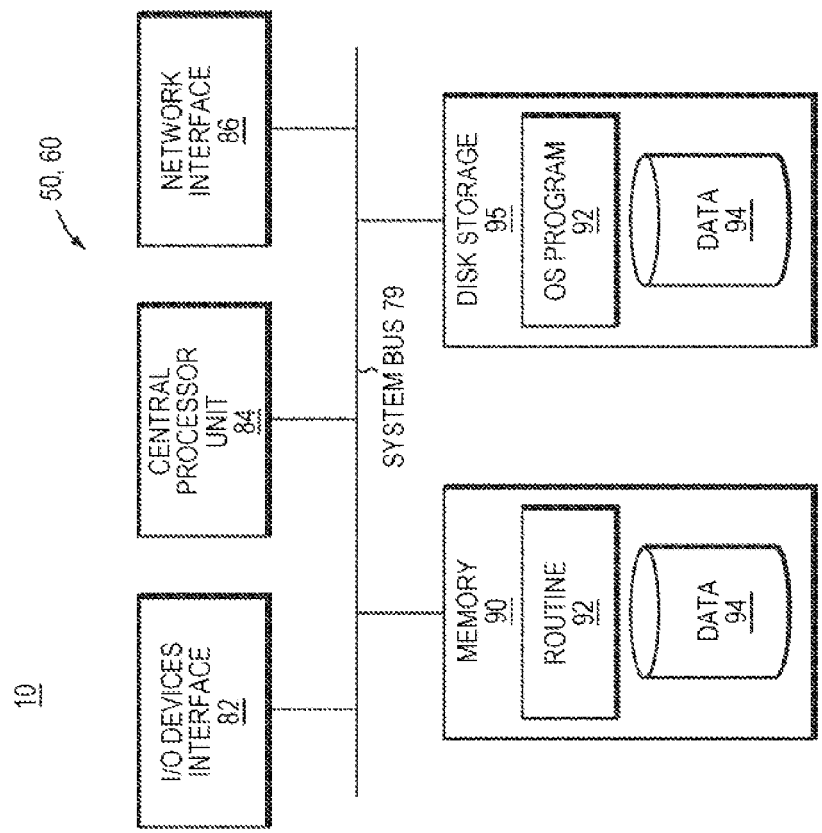
FIG. 16 is a system block diagram illustrating an example computer network, over which, embodiments of the claimed systems and methods may operate.

According to some embodiments, FIG. 16 is a diagram of an example internal structure of a computer (e.g., client processor/device 50 or server computers 60) in the computer system 10 of FIG. 15. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 15). Memory 90 provides volatile storage for computer software instructions 92 and data 94 used to implement some embodiments (e.g., NMEA 2000 PGN messages described herein). Disk storage 95 provides non-volatile storage for computer software instructions 92 and data 94 used to implement an embodiment of the present disclosure. A central processor unit 84 is also attached to the system bus 79 and provides for the execution of computer instructions. Disk storage 95 may herein be understood to include non-volatile solid-state or removable storage media, including memory cards such as, for example, SD cards.

In one embodiment, the processor routines 92 and data 94 are a computer program product (generally referenced 92), including a computer readable medium (e.g., a removable storage medium such as one or more DVD-ROM's, CD-ROM's, diskettes, tapes, non-volatile memory cards, etc.) that provides at least a portion of the software instructions for the present disclosure. The computer program product 92 can be installed by any suitable software installation procedure, as is well known in the art. In another embodiment, at least a portion of the software instructions may also be downloaded over a cable, communication and/or wireless connection. Other embodiments may include a computer program propagated signal product 107 (of FIG. 15) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92 of the present disclosure.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Embodiments or aspects thereof may be implemented in the form of hardware (including but not limited to hardware circuitry), firmware, or software. If implemented in software, the software may be stored on any non-transitory computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A module comprising a network bridging interface (NBI), the NBI configured to:
    interconnect a plurality of network buses associated with a system;
    monitor messages propagating along at least one of the network buses associated with the system;
    identify network devices coupled to the network buses based on the monitored messages;
    determine whether to allow or block transmission of a monitored message from a first network bus of the plurality to a second network bus of the plurality based on user settings, the first network bus supporting a first communication protocol, the second network bus supporting a second communication protocol, the user settings pertaining to at least one of (i) the monitored message, (ii) an identified network device associated with the monitored message, and (iii) a combination thereof;
    convert the monitored message from the first communication protocol to the second communication protocol in an event the first and second communication protocols are different; and
    allow or block transmission of the monitored message according to the determining.

2. The module of claim 1, wherein the system is at least one of a watercraft vessel, an industrial apparatus, and an agricultural apparatus.

3. The module of claim 1, further including a network router integrated with the NBI and configured to interconnect the plurality of network buses via a bridging interface that is a wired interface, a wireless interface, or a combination thereof.

4. The module of claim 3, wherein the network router is configured to establish a virtual network bus by enabling communication between network devices wirelessly connected to at least one gateway associated with the router.

5. The module of claim 1, wherein the first communication protocol is a given protocol, and the second communication protocol is the same given protocol.

6. The module of claim 5, wherein the given protocol is defined by National Marine Electronics Association (NMEA) 2000, or by another controller-area network (CAN)-bus-based network standard, or by NMEA OneNet.

7. The module of claim 1, wherein the first network bus is connected to the second network bus via a wireless interface or an Ethernet wired interface.

8. The module of claim 1, wherein at least one of the first and second communication protocols is defined by NMEA 2000, or by another controller-area network (CAN)-bus-based network standard or by NMEA OneNet, and at least one of the first and second communication protocols is an alternate protocol.

9. The module of claim 8, wherein the alternate protocol is defined by at least one of NMEA 0183 and Society of Automotive Engineers (SAE) J1939.

10. The module of claim 1, wherein the system is a watercraft vessel and wherein the NBI includes a gateway configured to convert the monitored message from NMEA 2000 to an alternate protocol, or from the alternate protocol to NMEA 2000.

11. The module of claim 1, further comprising a serial interface supporting a communication protocol defined by NMEA 0183, the serial interface connected to the at least one network bus via the NBI.

12. The module of claim 1, wherein a connected network device associated with the at least one network bus is at least one of a weather-monitoring device, a sonar device, a radar device, and a global-positioning system (GPS) device.

13. The module of claim 1, further comprising a connected device interface (CDI) including terminal blocks, the terminal blocks including terminals configured to electrically connect to one or more terminal devices associated with the system, the CDI being connected to the NBI internally to the module.

14. The module of claim 13, wherein the one or more terminal devices associated with the system include at least one of a thermocouple temperature sensor, a relay controller, and a run detector.

15. The module of claim 13, wherein the CDI includes a programmable device interface (PDI) configured to connect a selected electrically interconnecting circuit to a terminal of the terminal blocks, the interconnecting circuit selected based on a characteristic of a terminal device being connected to the terminal of the CDI.

16. The module of claim 15, wherein the terminal device being connected to the terminal is at least one of a voltage signal generating device, a current loop sensor, a thermistor temperature sensor, a thermocouple, a resistive sender, a switch, and a relay.

17. The module of claim 13, wherein the NBI is further configured to obtain measured data from a connected terminal device of the CDI, and to construct a data message according to the first or the second communication protocol, the data message containing a representation of the measured data.

18. The module of claim 17, wherein an element or a structure of the data message is based on a function of the connected terminal device within a context of the system.

19. The module of claim 17, wherein the NBI is configured to transmit the data message to a selected network device connected to the first or the second network bus, the transmitted data propagating along a network bus of the first and second network buses to which the selected network device is connected.

20. The module of claim 13, wherein the NBI is configured to obtain an operation message from a connected network device, to convert the operation message to an operation signal, and to relay the operation signal to the CDI, the CDI being configured to transmit the operation signal to a connected terminal device of the CDI.

21. The module of claim 1, further comprising a CDI and a user interface, the CDI including a PDI, the user interface configured to enable a user to inspect and configure connected network devices of the NBI and connected terminal devices of the CDI, monitor messages propagating along the network buses and specify user settings pertaining to allowing or blocking transmission thereof, and specify a type and a function of a terminal device being connected to a terminal of the PDI, the type influencing a selection of an electrically interconnecting circuit to connect to the terminal, the function influencing a selection of a message or a plurality of messages regarding the terminal device for the NBI to make available for transmission towards the first or the second network bus.

22. The module of claim 21, wherein the user interface is configured to allow a user to specify characteristics defining an alert, the characteristics including a threshold of a device associated with the module that, if crossed, automatically triggers an alert action based on a status of at least one characteristic of the characteristics defining the alert.

23. The module of claim 22, wherein the characteristics defining an alert include at least one of a parameter group number (PGN) value variable, a calculated variable, and a timer variable.

24. The module of claim 22, wherein the alert action includes at least one of displaying the alert, or a representation thereof, in the user interface, generating a message to report an alert message to a display device, and generating a message to control a binary device.

25. A method comprising:
interconnecting, via a network bridging interface (NBI), a plurality of network buses associated with a system;
monitoring, by the NBI, messages propagating along at least one of the network buses associated with the system;
identifying, by the NBI, network devices connected to the network buses based on the monitored messages;
determining, by the NBI, whether to allow or block transmission of a monitored message from a first network bus of the plurality to a second network bus of the plurality based on user settings, the first network bus supporting a first communication protocol, the second network bus supporting a second communication protocol, the user settings pertaining to at least one of (i) the monitored message, (ii) an identified network device associated with the monitored message, and (iii) a combination thereof;
converting, by the NBI, the monitored message from the first communication protocol to the second communication protocol in an event the first and second communication protocols are different; and
by the NBI, allowing or blocking transmission of the monitored message according to the determining, thereby managing communication among devices associated with the system.

26. The method of claim 25, wherein the system is at least one of a watercraft vessel, an industrial apparatus, and an agricultural apparatus.

27. The method of claim 25, further comprising, by a network router integrated with the NBI, mutually coupling the plurality of network buses via a bridging interface that is a wired interface, a wireless interface, or a combination thereof.

28. The method of claim 27, further comprising establishing, via the network router, a virtual network bus by enabling communication between network devices wirelessly connected to at least one gateway associated with the router.

29. The method of claim 25, wherein the first communication protocol is a given protocol, and the second communication protocol is the same given protocol.

30. The method of claim 29, wherein the given protocol is defined by National Marine Electronics Association (NMEA) 2000, or by another controller-area network (CAN)-bus-based network standard, or by NMEA OneNet.

31. The method of claim 25, wherein at least one of the first and second communication protocols is defined by NMEA 2000, or by another controller-area network (CAN)-bus-based network standard, or by NMEA OneNet, and at least one of the first and second communication protocols is an alternate protocol.

32. The method of claim 31, wherein the alternate protocol is defined by at least one of NMEA 0183 and Society of Automotive Engineers (SAE) J1939.

33. The method of claim 31, wherein the system is a watercraft vessel and wherein the method further comprises, by a gateway included with the NBI, converting the monitored message from NMEA 2000 to an alternate protocol, or from the alternate protocol to NMEA 2000.

34. The method of claim 25, further comprising, by a serial interface, supporting a communication protocol defined by NMEA 0183 to communicate with a connected NMEA 0183-enabled network device, the serial interface coupled to the at least one network bus via the NBI.

35. The method of claim 25, further comprising, by a terminal of a terminal block of a connected device interface (CDI), electrically coupling one or more terminal devices associated with the system, the CDI coupled to the NBI internally to the module.

36. The method of claim 35, further comprising, by a programmable device interface (PDI) of the CDI, coupling a selected electrically interconnecting circuit to a terminal of the terminal blocks, the interconnecting circuit selected based on a characteristic of a terminal device being connected to the terminal of the CDI.

37. The method of claim 35, further comprising, by the NBI, obtaining measured data from a connected terminal device of the CDI, and constructing a data message according to the first or the second communication protocol, the data message containing a representation of the measured data.

38. The method of claim 37, further comprising, by the NBI, transmitting the data message to a selected network device connected to the first or the second network bus, the transmitted data propagating along a network bus of the first and second network buses to which the selected network device is connected.

39. The method of claim 35, further comprising:
by the NBI, obtaining an operation message from a connected network device, converting the operation message to an operation signal, and relaying the operation signal to the CDI; and
by the CDI, transmitting the operation signal to a connected terminal device of the CDI.

40. The method of claim 25, further comprising, via a user interface, enabling a user to:
inspect and configure connected network devices of the NBI and connected terminal devices of a CDI;
monitor messages propagating along the network buses;
specify user settings pertaining to allowing or blocking transmission thereof; and
specify a type and a function of a terminal device being connected to a terminal of a PDI, the type influencing a selection of an electrically interconnecting circuit to connect to the terminal, the function influencing a selection of a message or a plurality of messages regarding the terminal device for the NBI to make available for transmission towards the first or the second network bus.

41. The method of claim 40, further comprising, by the user interface, allowing a user to specify characteristics defining an alert, the characteristics including a threshold of a device associated with the module that, if crossed, automatically triggers an alert action based on a status of at least one characteristic of the characteristic defining the alert.

42. The method of claim 41, wherein the alert action includes at least one of displaying the alert, or a representation thereof, in the user interface, generating a message to report an alert message to a display device, and generating a message to control a binary device.

43. An apparatus comprising:
means for interconnecting a plurality of network buses associated with a system;
means for monitoring messages propagating along at least one of the network buses associated with the system;
means for identifying network devices coupled to the network buses based on the monitored messages;
means for determining whether to allow or block transmission of a monitored message from a first network bus of the plurality to a second network bus of the plurality based on user settings, the first network bus supporting a first communication protocol, the second network bus supporting a second communication protocol, the user settings pertaining to at least one of (i) the monitored message, (ii) an identified network device associated with the monitored message, and (iii) a combination thereof;
means for converting the monitored message from the first communication protocol to the second communication protocol in an event the first and second communication protocols are different; and
means for allowing or blocking transmission of the monitored message according to the determining.

\* \* \* \* \*